United States Patent
Bolza-Schünemann

(10) Patent No.: US 12,358,013 B2
(45) Date of Patent: Jul. 15, 2025

(54) DEVICE FOR COATING A CARRIER SUBSTRATE WITH A POWDERED MATERIAL AND MACHINE FOR PRODUCING A PRODUCT STRAND WITH A DRY FILM APPLIED TO A CARRIER SUBSTRATE

(71) Applicant: KOENIG & BAUER AG, Würzburg (DE)

(72) Inventor: Claus Bolza-Schünemann, Lübeck (DE)

(73) Assignee: KOENIG & BAUER AG, Würzburg (DE)

( * ) Notice: Subject to any disclaimer, the term of this patent is extended or adjusted under 35 U.S.C. 154(b) by 0 days.

(21) Appl. No.: 18/846,437

(22) PCT Filed: Mar. 7, 2023

(86) PCT No.: PCT/EP2023/055670
§ 371 (c)(1),
(2) Date: Sep. 12, 2024

(87) PCT Pub. No.: WO2023/237238
PCT Pub. Date: Dec. 14, 2023

(65) Prior Publication Data
US 2025/0108400 A1    Apr. 3, 2025

(30) Foreign Application Priority Data

Jun. 8, 2022  (DE) .................... 10 2022 114 430.5
Sep. 20, 2022  (DE) .................... 10 2022 124 081.9

(51) Int. Cl.
*B05C 1/08*  (2006.01)
*B29C 43/24*  (2006.01)
(Continued)

(52) U.S. Cl.
CPC .......... *B05C 1/0834* (2013.01); *B05C 1/0865* (2013.01); *B29C 43/245* (2013.01);
(Continued)

(58) Field of Classification Search
None
See application file for complete search history.

(56) References Cited

U.S. PATENT DOCUMENTS

| 4,198,905 A | 4/1980 | Lehmann |
| 11,040,368 B2 | 6/2021 | Enokihara et al. |

(Continued)

FOREIGN PATENT DOCUMENTS

| DE | 2810507 A1 | 9/1979 |
| DE | 3912950 C1 | 3/1990 |

(Continued)

OTHER PUBLICATIONS

International Search Report of PCT/EP2023/055670 dated Sep. 2023.

*Primary Examiner* — Binu Thomas
(74) *Attorney, Agent, or Firm* — Mattingly & Malur, PC

(57) ABSTRACT

Examples include a device for coating a carrier substrate with a powdered material. The device includes an application unit having a first roller and a second roller which, at a nip thereof, form a first gap through which a powder mixture can be conveyed to form a dry film. A counter-pressure roller, together with the second roller or another roller arranged between the counter-pressure roller and the second roller, forms a second gap through which the carrier substrate to be coated can be guided for having the dry film applied to the carrier substrate. The first gap between the first and second rollers can be adjusted based on a position-based positioning drive by being set to a constant and/or defined gap width, and the second gap can be adjusted based on a (Continued)

force-based positioning drive, and can be set to a constant and/or defined contact force or linear force.

15 Claims, 20 Drawing Sheets

(51) Int. Cl.
    *H01M 4/04*         (2006.01)
    *H01M 4/139*      (2010.01)

(52) U.S. Cl.
    CPC ....... *H01M 4/0404* (2013.01); *H01M 4/0435* (2013.01); *H01M 4/139* (2013.01)

(56) References Cited

U.S. PATENT DOCUMENTS

| | | | |
|---|---|---|---|
| 11,990,599 | B2 | 5/2024 | Althues et al. |
| 2009/0325045 | A1 | 12/2009 | Miyahisa et al. |
| 2015/0224529 | A1 | 8/2015 | Hamabe et al. |
| 2018/0006292 | A1 | 1/2018 | Nakano et al. |
| 2018/0221908 | A1 | 8/2018 | Enokihara et al. |
| 2019/0036104 | A1 | 1/2019 | Hirukawa |
| 2020/0227722 | A1* | 7/2020 | Bogenstahl ............. B05C 11/02 |
| 2021/0320288 | A1* | 10/2021 | Althues ............... H01M 4/0404 |
| 2021/0394246 | A1* | 12/2021 | Terasawa ............... H01M 4/139 |
| 2022/0293952 | A1* | 9/2022 | Brown ................... H01M 4/139 |
| 2022/0399539 | A1* | 12/2022 | Westphal .............. B05C 1/0834 |
| 2023/0411589 | A1* | 12/2023 | Song ..................... H01M 4/139 |
| 2024/0326089 | A1* | 10/2024 | Busswinkel .......... B05C 1/0865 |
| 2024/0332486 | A1* | 10/2024 | Busswinkel .......... H01M 4/139 |

FOREIGN PATENT DOCUMENTS

| | | |
|---|---|---|
| DE | 102004040123 A1 | 3/2006 |
| DE | 102017208220 A | 11/2018 |
| DE | 102020214052 A1 | 5/2022 |
| EP | 2850679 A1 | 3/2015 |
| EP | 2737126 B1 | 1/2018 |
| EP | 3910710 A1 | 11/2021 |
| EP | 3996164 A1 | 5/2022 |
| JP | 2004123247 A | 4/2004 |
| JP | 5772427 B2 | 9/2015 |
| KR | 101747493 B1 | 6/2017 |
| KR | 102359521 B1 | 2/2022 |
| WO | 2001032312 A1 | 5/2001 |
| WO | 2020150254 A1 | 7/2020 |
| WO | 2021028619 A1 | 2/2021 |

* cited by examiner

DEVICE FOR COATING A CARRIER SUBSTRATE WITH A POWDERED MATERIAL AND MACHINE FOR PRODUCING A PRODUCT STRAND WITH A DRY FILM APPLIED TO A CARRIER SUBSTRATE

CROSS-REFERENCES TO RELATED APPLICATIONS

This application is the US national phase, under 35 USC § 371, of PCT/EP2023/055670, filed on Mar. 7, 2023, published as WO 2023/237238 A1 on Dec. 14, 2023, and claiming priority to DE 10 2022 114 430.5 filed on Jun. 8, 2022, and DE 10 2022 124 081.9, filed Sep. 20, 2022, and all of which are incorporated by reference herein in their entireties.

TECHNICAL FIELD

Some examples herein relate to a device for coating, in particular dry coating, a carrier substrate with a powdered material, in particular a powder composite or dry film, and to a machine for producing a product strand with a dry film formed on a carrier substrate, in particular a dry film formed of a powdered material. For example, the device for coating a carrier substrate with a powdered material includes at least one first application unit, which includes a first roller and a second roller which, in the nip between the outer cylindrical surfaces thereof, form a first gap which is used for forming the film and through which a dry powder mixture can be conveyed in order to form a first dry film. The device further includes a first counter-pressure roller which, together with the second roller, forms a second gap through which a carrier substrate to be coated can be guided and can have the dry film formed in the first gap applied to a first side. The second roller is configured to be heatable, and the first gap between the first and second rollers is adjustable based on a position-based positioning drive, and is settable to a constant and/or defined gap width.

BACKGROUND

A device and a method for coating a carrier substrate is known from DE 10 2017 208 220 A1, wherein a dry film is formed in a gap between a first and a second roller and, in one embodiment, is transferred in a gap by way of a further roller to the carrier substrate. The rollers are operated at a differential speed for forming fibrils.

US 2015/0224529 A1 discloses a device for coating an object to be coated with coating material, wherein the coating material contains, amongst others, 20 to 65 volume % water. The layer is formed between a first and a second roll, wherein the first roll has improved transfer properties for enhanced transfer, for example, a rougher surface, and the rolls can be operated at differing velocities.

In WO 2020/150254 A1, a film is generated by calendering a powder mixture and is wound onto a reel so as to be supplied as such to a further process in which it can be laminated onto a collector. In one embodiment, the powder mixture is deposited onto a belt and is guided thereon into the roller nip of two rolls.

JP 57 72 427 B2 relates to a powder rolling device for producing an electrode material from powder. In one embodiment, powder is conveyed by a central vibrating conveyor into a central region of a supply hopper and by two outer vibrating conveyors into the edge regions. In another embodiment, the feeding hopper has five sections.

WO 01/32312 A1 discloses a roller mill for grinding granular materials, in particular cereals, comprising a feed device having an opening, by which the grains can be transferred into a grinder formed by two rollers. The feed device comprises a vibratory drive for generating a vibratory motion of the feed device.

DE 10 2020 214 052 A1 relates to a process for calendering twice a substrate band, which was previously coated with active material, in two consecutive calendering nips, wherein the first gap and/or second gap are set based on an ascertained thickness, and the second gap is set in terms of a longitudinal profile for compensating for a potentially present convexity of the electrode band.

A metering device for metering powdered material into a first roller nip is known from DE 10 2004 040 123 A1, wherein the powder is conveyed by means of brush elements through openings of a sieve-like drum. Due to a discharge being homogeneous across the width, it is described that it is sufficient for the homogeneity of the formed layer to set the size of the roller nip. It is stated that it is no longer necessary to control the gap.

EP 2 737 126 B1 discloses a calender having calendering gaps formed between three rollers, wherein a line force in the nip of two rolls can be varied by changing the pressure.

A device for dry coating a current collector web with an active material layer is disclosed by KR 102 359 521 B1, wherein a first roller and a second roller are provided for each side of the web, between which an active material layer is formed, and wherein the respective active material layer is applied onto the current collector web at a nip point between the two second rollers. A first and a second unit for setting the roller spacing are provided, by which the respective distances between the first and second rollers can be set. The first and second units comprise a mechanical cylinder that is driven by a servo motor. Furthermore, a third unit for adjusting the roller nip formed between the second rollers is provided. It is stated that, in this way, the thickness of the electrode can be easily controlled by way of the gap width. In one embodiment, furthermore an air cylinder can be provided between the second rollers, by way of which the distance is kept constant.

DE 28 10 507 A1 relates to a calender for grinding particles, here in particular cocoa powder. The powder is guided through a nip between a first and second roller, guided over the surface of the second roller and over a third roller, and is finally guided onto a fourth roller, where the ground powder is removed by means of a squeegee. Hydrostatic pressure elements are provided in the roller shells, by way of which the deflections can be counteracted.

A method and a device for producing a collector foil coated with pasty material is disclosed in U.S. Ser. No. 11/040,368 B2, wherein a first gap is formed between a first and second roller, through which the pasty material is guided so as to form a film thereof, and wherein the second roller and a third roller form a gap through which the collector foil is passed so as to coat the same with the film. The film thickness formed after the first gap and the coating thickness resulting after the second gap can be ascertained by sensors. A temperature-induced change in the gap width is addressed by appropriately varying the radial position of the first or the second roller by way of respective mechanisms that engage on the roller.

WO 2021/028619 A1 discloses a device for producing a film on a substrate using one or more film formers and one or more applicators, wherein in each case two calendering rollers cooperate in a gap as film formers and as applicators, and wherein the film formation takes place in a first gap and the application onto the substrate takes place in a second gap. In one specific embodiment, it is provided to form a self-supporting film in a first roller gap between a first roller pair, to bring the film in contact with the carrier substrate via a diverting roller, and to subsequently compress the composite in a second roller gap between a further roller pair. In an embodiment differing therefrom, one of the rollers of the first roller pair cooperates with the other roller of the first roller pair for forming the first roller gap, and on the other hand cooperates with a further roller for forming the second gap, wherein the three rollers are arranged with the axes of rotation thereof in an angled arrangement with respect to one another.

EP 3 910 710 A1 discloses a machine and a method for producing an electrode for a battery using a slurry. To increase a recrystallization of the collector web, and thus an increase in the toughness, the collector web that is unwound from the reel changer is first heated to a temperature between 120° and 150° C. before it reaches, via further transport means, a coating device in which it is coated with an active material slurry. Downstream from the coating device, the coated web is guided through a dryer for drying the slurry before being guided between rollers of a rolling device and wound onto a winder. The application is carried out on one side and, in the form shown there, by a coating nozzle, but can, amongst others, also be carried out by a coating roller.

US 2018/0006292 A1 relates to a device and a method for producing an electrode, wherein a metal foil is cooled by a cooling unit before being coated with active material. The cooling unit is controlled by way of a temperature sensor arranged downstream from the cooling unit in the web path.

A machine is disclosed in KR 10-1747493 B1, by which an electrode web, which was previously coated with active material in regions, is unwound from a reel, provided with an insulator in uncoated regions by a gravure printing unit and, on the output side of the machine, is wound again onto a reel.

JP 2004123247 A relates to a method for controlling the web transport in a machine, in which a web is consecutively coated several times with a liquid.

EP 2 850 679 A1 relates to a solvent-free production of electrodes, wherein substrate to be coated is consecutively coated by a first and a second application device, in particular a spraying device. A respective heating device is provided between the application devices and downstream the second application device.

A method for producing an electrode is known from US 2019/0036104 A1, wherein a metal foil is first coated, on a first side, with a wet electrode material mixture containing binding agents by a first application device, subsequently dried, and then coated, on the other side, with the moist electrode material mixture by a second application device. To compensate for density differences caused by the material that is applied first passing twice through an application gap, a pressing device comprising two rollers is provided, of which the roller facing the first side is cooled to below the melting temperature of the binding agents and the roller facing the second side is heated to a temperature above the melting temperature.

EP 3 996 164 A1 relates to a compaction of an electrode web by a calender comprising two calendering gaps, wherein the first gap is compacted in accordance with a specified target thickness and the second gap is set in such a way that an irregularity of the thickness of the electrode web is compensated for.

US 2009/0325045 A1 relates to a machine for introducing discontinuities into the active material layer of an electrode web to be unwound from a reel, wherein a device for introducing the transversely extending discontinuities is provided in the web path. A vacuum system is provided downstream from the introduction of the discontinuities so as to eliminate active material residue still remaining on the carrier substrate.

SUMMARY

An object of some examples herein is to provide a device for coating, in particular dry coating, a carrier substrate with a powdered material, in particular a powder composite or dry film, and a machine for producing a product strand with a dry film formed on a carrier substrate, in particular a dry film formed of a powdered material.

The object is achieved in some examples by the device for coating a carrier substrate discussed above. For example, the second gap between the counter-pressure roller and the second roller of the first application unit can be adjusted based on a force-based positioning drive by being set to at least one of a constant and/or defined compression force or line force.

The advantages achievable by the invention are in particular that a carrier substrate thus coated, comprising an active material layer that is as even as possible and/or subject to few defects, can be continuously and reliably produced by means of the device or machine.

In an embodiment that is to be particularly preferred for the invention for a device for coating, in particular dry coating, an in particular web-format carrier substrate with a material layer forming, for example, a powder composite film and/or dry film, this device comprises at least one first application unit, which comprises a first roller and a second roller forming, in the nip between the outer cylindrical surfaces thereof, a first gap used for forming the film, through which an in particular solvent-free and/or dry powder mixture that is present, for example, in a filling or supply chamber formed and/or provided in the region of the wedge-shaped space above the gap between the first and second rollers can be conveyed so as form a first dry film, in particular by way of compression and/or using a compression force, and a first counter-pressure roller which, together with the second roller or a further roller arranged between the counter-pressure roller and the second roller, forms a second gap through which a carrier substrate to be coated can be guided and can have the dry film formed in the first gap applied thereto, in particular by way of pressing and/or using a contact pressure force.

According to the invention, the first gap between the first and second rollers can be adjusted based on a position-based positioning drive, that is, can be set to a constant and/or defined gap width, and the second gap between the counter-pressure roller and the second or an interposed further roller of the first application unit can be adjusted based on a force-based positioning drive, that is, can be set to a constant and/or defined compression force or line force.

The position-based adjustment of the relevant roller nip is directed at a defined gap width that is to be maintained at a constant level, and in particular is specified, or a relative position of the two rollers in the working position thereof, and the force-based adjustment is directed at a compression force or line force which is defined and/or to be maintained at a constant level, in particular specified, between the two rollers involved in the second gap. Accordingly, a position-based adjustment of a roller, frequently also referred to as "displacement-based adjustment", is directed at the positioning of the roller to be adjusted in terms of a specified position that is to be maintained, while a force-based adjustment of the roller to be adjusted is directed at a placement against another roller in terms of a specified compression force or line force that is to be maintained. The defined gap width or compression force is settable or is set within the meaning that this gap width or compression force, in contrast to the gap being passed over randomly, remains at the relevant setting until, for example, a newly defined setting is specified.

The position-based positioning drive is particularly advantageously a positioning drive where the gap width of the first gap can be set via position-based drive means or via at least one-sided stop means, which limit a placement position toward the nip and are settable in terms of the position thereof, and/or by way of which the component to be adjusted, here in particular the roller to be adjusted or for the mount thereof, can be moved into a defined position, in an advantageous embodiment in that an adjustment path, at least toward the relevant side, is limited by a stop, which is preferably adjustable, for example by way of drive means, and which defines the end position and against which the component to be adjusted in terms of the position is placed or can be placed by means of a drive means.

A force-based positioning drive can, in particular, be a positioning drive by way of which a line force that is set or to be set between the two involved rollers is or can be maintained at a constant level, even if the dry film thickness fluctuates, by, for example automatic or controlled, repositioning of at least one of the two rollers. In contrast to a repositioning that is controlled via a control loop, automatic repositioning can be a repositioning that is carried out by the drive means itself and without readjustment via an additional control loop.

In a particularly advantageous refinement, the first gap between the first and second rollers of the same application unit and/or the second gap between the second or an interposed further roller of the relevant application unit and the counter-pressure roller cooperating with this second or further roller can be selectively adjusted in a position-based or force-based manner based on a combined positioning drive, that is, for example, in one operating mode can be set for a defined position of one of the two rollers and/or for a constant gap width, and in another operating mode can be set for a defined and/or constant compression force or line force, and in particular can be maintained at a constant level with this gap width or compression force.

In particular, one of the rollers that is involved in the relevant second gap can be mounted in a combined actuating mechanism so as to be selectively adjustable in a position-based or force-based manner and/or the relevant first and/or second gaps can be selectively settable for a constant and/or defined gap width or for a constant and/or defined compression force or line force.

Such a combined positioning drive can, for example with respect to a particularly robust design, be formed by a force-based positioning drive comprising an actuating mechanism, in the adjustment path of which a stop, which, for example, can be positioned via drive means, can be selectively introduced so as to limit the position. As an alternative, the combined positioning drive could, for example in a mechanically less complex embodiment, be formed by a positioning drive that comprises, as the drive means, a motor that is selectively closed loop position-controlled or open loop position-controlled or closed loop moment-controlled or open loop moment-controlled.

In an embodiment of an application unit that is particularly suited for the invention, the application unit comprises a powder feed device for feeding a powdered material, wherein a filling and/or supply chamber is formed and/or provided in the region of the wedge-shaped space above the gap between the first and second rollers, to which powdered material can be fed via a powder feed device.

In a first advantageous variant embodiment of an application stage, which, for example, comprises an above-described device or is formed by such a device, application units comprising a respective roller, for example, a laminating roller, are provided on both sides of the substrate path, which in a nip between the outer cylindrical surfaces thereof form a two-sided application or laminating gap. The two laminating rollers forming the gap between one another act with respect to one another as counter-pressure rollers. As a result, the dry films formed in the respective application unit can be applied to the carrier substrate which is guided between these laminating rollers.

In another advantageous variant embodiment for an application stage, a dry film can be produced by a respective application unit, regardless of the production of the respective other, on both sides of the carrier substrate in the same machine. This can take place, for example, by a device for coating, in particular dry coating, a web-format carrier substrate with a powder composite film, comprising at least one first application unit by way of which a dry powder mixture can first be processed to a dry film, and thereafter this dry film can be applied to a first side of the carrier substrate in an application or laminating gap between a laminating roller of the first application unit and a first counter-pressure roller, and wherein a second application unit is provided in the substrate path to the first application unit, by way of which a dry powder mixture can first be processed to a second dry film and applied to the other side of the carrier substrate, wherein the second application unit comprises a second counter-pressure roller, which differs from the first counter-pressure roller and/or from the laminating roller of the first application unit and which, by way of a laminating roller of the second application unit, forms a second application or laminating gap, in which the second dry film can be applied to a second side of a carrier substrate that is guided through the second laminating gap.

A particularly preferred device for feeding powdered material into an above-described roller gap comprises a dispensing device, which comprises a vibrating conveyor and by which powdered material to be conveyed into the roller nip can be dispensed over a dispensing width, viewed parallel to the roller gap, wherein, downstream from the dispensing device and upstream from the roller gap in the conveying path of the powdered material, a conveying device formed by a conveyor belt is provided, by way of which powdered material can be fed directly or indirectly to the roller gap or an insertion aid provided thereabove, directly or by way of one or more further conveying devices, over a feed width extending transversely to the conveying device.

As an alternative or in addition, a particularly preferred device for feeding powdered material into a roller nip comprises a dispensing device by which powdered material to be conveyed into the roller nip can be dispensed to a conveying device, wherein a removal device, which extends horizontally over at least a conveying width and the distance of which relative to the conveying device can be set, is provided above the conveying device in the conveying direction between the point at which material is fed to the conveying device and a dispensing point to a further conveying device or into the roller gap or into an insertion aid provided thereabove.

As an alternative or in addition to one or more of the above-described embodiments, a particularly preferred device for feeding powdered materials into a roller nip comprises a powder feed device by which powdered material can be fed to the roller gap or an insertion aid provided thereabove on a feed width extending transversely to the conveying direction, wherein the powdered material emerging from the powder feed device downstream can be fed to the roller gap or the insertion aid provided thereabove via a drop section, and wherein a sensor system comprising a deflecting element arranged in the drop path, which is functionally connected to a sensor, designed as a force transducer, for picking up the force exerted by the stream of powder on the deflecting element, is provided at the drop section of the stream of powder that emerges from the powder feed device and is to be fed to the roller gap or the insertion aid arranged thereabove. As an alternative, a sensor system that is directed at the drop path of the stream of powder emerging from the powder feed device and to be fed to the roller gap or the insertion aid arranged thereabove can be provided at the drop section.

In an advantageous refinement, a device for determining a density of a material layer that is conveyed on an outer cylindrical surface of the roller is provided, which comprises a removal device, which can be or is placed against the outer cylindrical surface for removing at least a part of the material layer at a point of the circumference of the roller on at least a part of the usable working width during the rotation, a weighing unit, on which at least a part of the removed material layer can be collected and by which the mass thereof can be determined, and a measuring device, by way of which a layer thickness of the material layer conveyed on the roller can be determined at at least one point. In a particularly advantageous embodiment, additionally a sensor system that is directed at the outer cylindrical surface of the roller is provided, by which a width of an edge strip to be removed or a progression of the width or at least of the side edge can be ascertained.

So as to determine the density of the material layer conveyed on an outer cylindrical surface of a roller, in an advantageous refinement the roller carrying the material layer on the outer cylindrical surface thereof is rotated about the axis of rotation thereof, the material layer is removed from the outer cylindrical surface over at least a part of the width thereof during the rotation by a removal device across an angular region at a point of the circumference between where the material layer is received and where it is transferred downstream to a further roller or to a carrier substrate, a mass of the part of the material layer which is removed across the angular region is ascertained by way of weighing, a layer thickness of the material layer is ascertained by way of a measuring device, preferably even before the removal, a surface area of the material layer removed or to be removed in the angular region on the roller is determined, and finally, using the surface area, the mass, and the layer thickness or the ascertained values thereof, a value for the density of the material layer conveyed on the roller is obtained. In a particularly advantageous embodiment, the material layer is only removed for this purpose over a part of the width in the form of a material strip, in particular in the form of an edge strip.

A preferred device for coating a carrier substrate with a material layer, comprising at least one application unit by which powdered material can first be processed to a material layer by applying a compression force, and thereafter this material layer can be applied to a first side of a carrier substrate, in particular by way of pressing and/or using a contact pressure force, wherein a first roller and a second roller of the application unit are arranged so as to form a first roller gap in the nip between the outer cylindrical surfaces thereof, through which the powdered material can be conveyed for forming the dry film, preferably comprises a measuring device, in particular in the form of an above-described device for determining a density, by way of which a density of the material layer that is conveyed on an outer cylindrical surface of the second or a further downstream roller of the application unit can be determined.

In an advantageous embodiment of a machine for coating a web-format carrier substrate on at least one of the sides thereof with a dry film formed of a powder mixture, which comprises a device for coating, for example in an above-described embodiment, or an above-described application stage, this machine comprises a substrate unwinder by which the web-format carrier substrate can be fed to the machine on the input-side, the application stage by which at least one dry film can be produced from the powder mixture and be applied to at least one side of the carrier substrate at at least one application gap through which the carrier substrate passes, and a roll winder in which the carrier material provided on at least one side with the dry film can be wound onto a reel in the form of a product strand.

In a particularly advantageous embodiment of the machine, a dry film can be produced on both sides of the carrier substrate in the same machine.

Independently of this, but advantageously in conjunction with the option of double-sided coating, in an advantageous embodiment of the machine a thermal pretreatment station is arranged upstream from the application stage in the first substrate path section, by which the carrier substrate can be heated to above the ambient temperature and/or a cooling unit is arranged upstream in the second substrate path section, by which a product strand that is guided through can be cooled.

In an advantageous refinement, a single-piece or multi-piece pretreatment station is provided in the substrate path in a first substrate path section, which is upstream in relation to the application stage, by which superficial impurities and/or electric charge carriers are or can be removed from the carrier substrate on one side or both sides in a contact-less or contacting method, and/or a measuring station, by which the material thickness of the carrier material can be checked for the thickness thereof and/or homogeneity of the thickness and/or for impurities.

As an alternative or in addition, in an advantageous embodiment of the machine, downstream from the device for coating or the application stage and upstream from the roll winder, a calendering unit including a calendering gap is provided, by which the carrier substrate, which is provided at least on one side with the dry film, can be guided through in the form of a product strand, by applying pressure and/or an increased temperature, and, for example, the dry film can thereby be further compacted. For example, two rollers, for example calendering rollers, are provided, of which at least one can be heated and/or between which a compression with an adjustable line force of, for example, at least 500 N/mm can be applied.

In this way, the product can, for example, be produced inline, which ensures particularly good adhesion and/or ensures that a product can be provided without damage. This first is carried out, for example, by additional heat and/or pressure treatment, the second is carried out, for example, by controlling the temperature, in particular by cooling prior to being collected in the bundle, in particular the reel.

Taken alone or additionally together with one or more of the above-described advantageous variant embodiments, in a further advantageous embodiment of the machine in each case at least one positively driven roller, in particular a draw roller, and/or in each case at least one measuring roller for ascertaining the web tension are provided, both in a first substrate path segment situated between the location at which the unwinding from the substrate reel in the substrate unwinder takes place until the entry into the only or first application gap of the application stage, and in a second substrate path segment situated between the location at which the carrier substrate web emerges from the only or downstream last application gap of the application stage and the reel winder, however situated between the two calendering rollers before the entry in the calendering gap if a calendering unit is separately provided in the substrate path.

Controlled web guidance creates particularly favorable conditions for a stable operation and for a constant material application. Instead or in addition, furthermore, stable operating conditions can be ensured by measuring the temperature on the input-side of the application and/or prior to the winding operation, in particular with integration into a control loop related to this temperature, and/or defect-free utilization in the later product can be ensured by an inspection with defect marking.

BRIEF DESCRIPTION OF THE DRAWINGS

Exemplary embodiments of the invention are illustrated in the drawings and will be described in greater detail below. The figures show.

DETAILED DESCRIPTION

Figure 1:
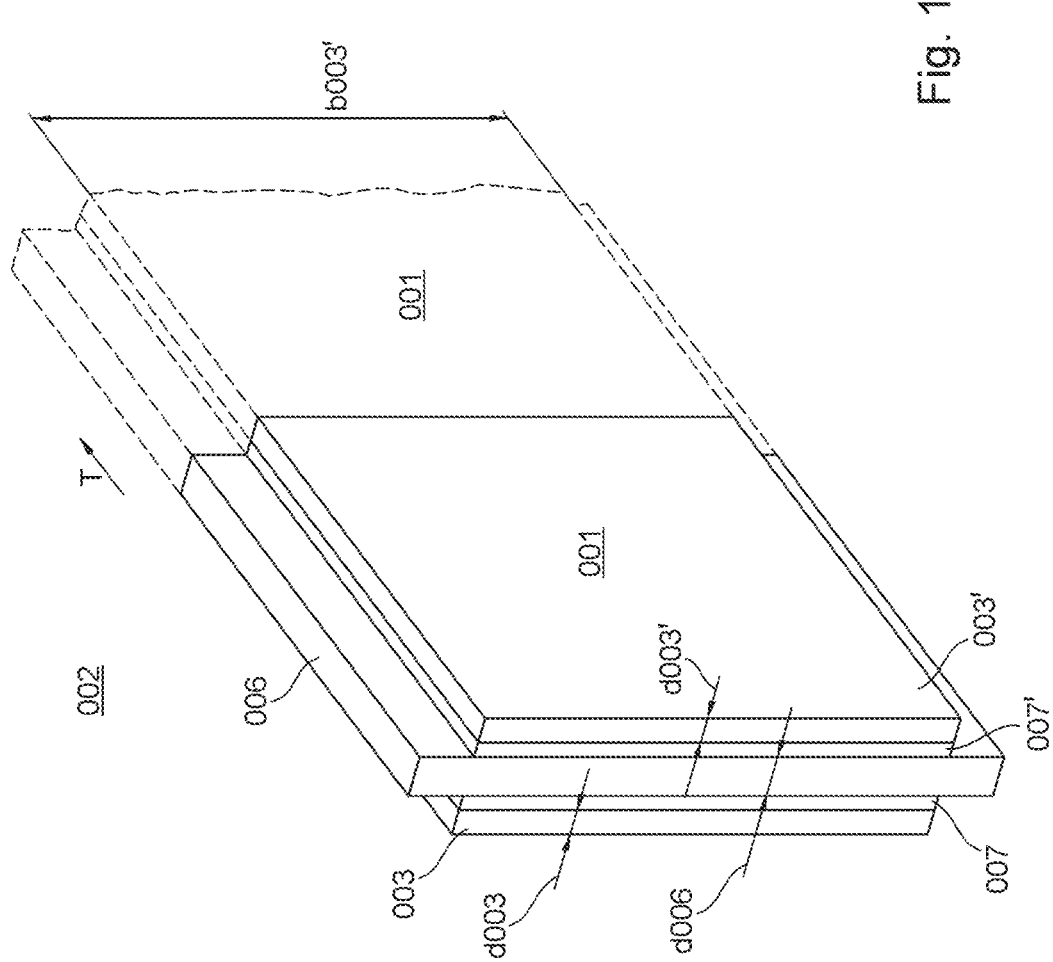
FIG. 1 a schematic representation of a product to be produced.

The devices or machines described hereafter relate to the production of electrode units 001 of electrochemical storage systems as they are used, in particular, in batteries or rechargeable batteries, such as lithium-sulfur, sodium-ion or in particular lithium-ion batteries, as well as in solid-state batteries.

A product 001; 002 to be produced by a machine described below can, for example, be formed by a, for example web-format, intermediate product 002 that is still to be cut, for example a product strand 002 designed as an electrode strand 002, or by sheet-format end products 001 that have already been cut in the machine, for example as product sections 001 formed as electrode units 001, electrodes 001 for short.

For producing such products 001; 002 having a material layer 003; 003', in particular active material layer 003; 003', which is applied to one side or both sides on a carrier substrate 006, preferably a carrier substrate web 006, for example a current collector substrate 006 formed by, for example, a current collector foil 006, preferably applied in the form of a dry film 003; 003', a device 100; 100\* for coating, coating device 100; 100\* for short, in particular for dry coating a, in particular web-format, for example above-described, carrier substrate 006 with an above-described material layer 003; 003', preferably a dry film 003; 003', in particular a powder composite film 003 is provided, which comprises at least one first application unit 101, by which powdered, preferably dry, material 004; 004', in particular a preferably solvent-free and/or dry powder mixture 004; 004' can first be processed to a dry film 003, in particular by way of compression and/or using a compression force, and thereafter this dry film 003; 003' can be applied to a first side of the carrier substrate 006, in particular by way of pressing and/or using a contact pressure force. A dry film 003; 003' to be applied is to have, for example, a thickness of 20 μm to 240 μm, preferably of 40 μm to 100 μm, for example after the application and compression.

An above-described powder mixture 004; 004', which is in particular present as dry powder, comprises, in particular for the production of electrode units 001 for lithium-ion batteries or rechargeable batteries, for example more than ninety percent by weight of an active material, such as one or more of the lithium compounds: lithium iron phosphate, lithium manganese oxide, nickel-rich lithium nickel manganese cobalt oxide, lithium nickel cobalt aluminum oxide, lithium cobalt oxide, lithium manganese nickel oxide and/or lithium titanate, few, for example three, percent by weight of a conductive additive, for example graphite or so-called CNTS, that is, multi-walled carbon nanotubes, and few, for example two, percent by weight of a plastic that is effective as binding agent in the later powder composite, for example polytetrafluoroethylene (PTFE).

The carrier substrate 006 at the same time, for example, represents the current-collecting layer of the electrode unit 001 and is formed, for example, by electrically conductive material designed in the form of a film, non-woven fabric or woven fabric, for example a metal. It is made, for example, of aluminum or copper, in particular for the production of electrode units 001 for lithium-ion batteries or rechargeable batteries and/or, for example, has a thickness d006 of 5 to 16 μm. If an anode is produced, it is made in particular of copper having, for example, a thickness d006 of, for example, in the range of 5 to 13 μm, and if a cathode is produced, it is made in particular of aluminum having, for example, a thickness d006 in the range of 7 to 16 μm.

In a preferred embodiment, the carrier substrate 006, at least in the surface region to be coated with the dry film 003; 003', has a superficial coating with a cohesion-supporting or cohesion-inducing agent 007; 007', for example a binder 007; 007', a primer 007; 007' or an adhesive 007; 007'. Such an agent 007; 007' can be formed by a thermoplastic or reactive binder or primer and can, for example, comprise a thermoplastic component and/or have a thickness d007 of only few μm, for example no more than 5 μm, in particular no more than 3 μm.

A thickness d003; d003' of the active material layer 003; 003' of the product 001; 002, that is, of the electrode unit 001 or of the electrode strand 002, is, for example, no more than 240 μm, in particular no more than 150 μm, preferably at most 100 μm, and/or is, for example, at least 20 μm, in particular at least 30 μm, preferably at least 40 μm.

An overall thickness of the product 001; 002 coated, for example, on both sides, is, for example, up to 500 μm, in particular up to 320 μm, preferably up to 220 μm and/or at least 50 μm, in particular at least 70 μm, preferably at least 90 μm.

To ensure an effective manufacturing process, preferably web-format carrier material 006 is processed to an above-described end or intermediate product which, for example, has a width of at least 500 mm, in particular at least 600 mm, in a particularly advantageous embodiment even at least 1,200 mm. The carrier material 006 is, for example, not coated over the entire width with the dry film 003; 003', but only up to an omitted edge region in which the surface of the metallic conducting carrier material 006 remains clear and accessible, for example for the purpose of being connected to cables.

Figure 2:
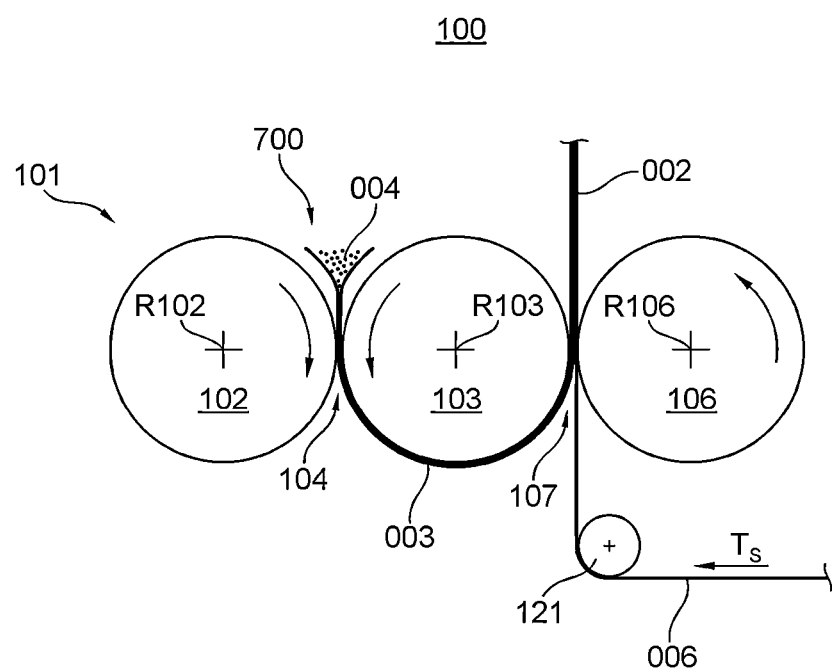
FIG. 2 a schematic diagram for the generation and the application of a dry film.
Figure 3:
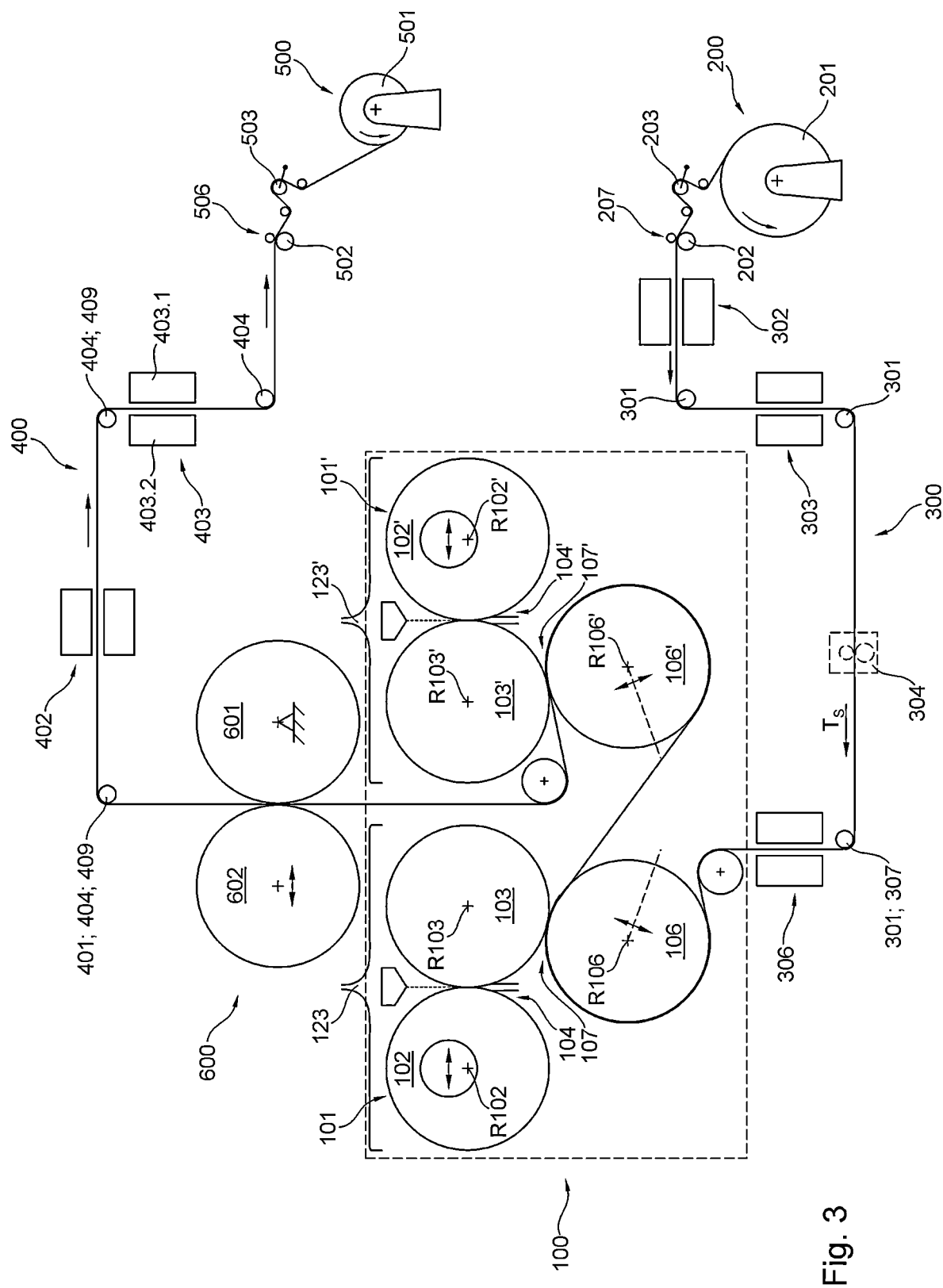
FIG. 3 an exemplary embodiment of a machine for producing a multi-layer product including a dry film that is applied to a carrier substrate with an application stage according to one embodiment of a first group of exemplary embodiments.
Figure 4:
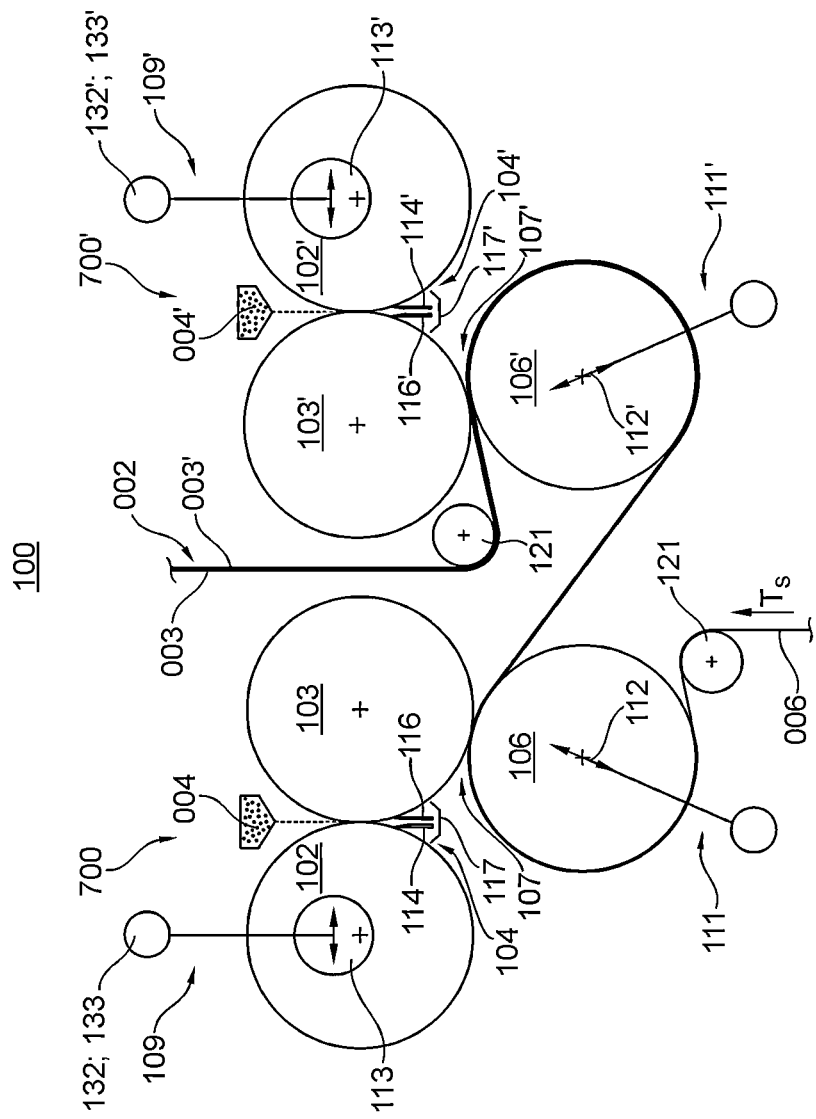
FIG. 4 an enlarged view of the application stage of the first embodiment from FIG. 3.

For the above-described production of a dry film 003, a first roller 102, in particular a metering roller 102, and a second roller 103, in particular a laminating roller 103 of the first application unit 101, are provided so as to form, in the nip between the outer cylindrical surfaces thereof, a first gap 104, in particular a first film-forming gap 104, through which, for the purpose of forming the dry film 003, the powder mixture 004 which is conveyed into the nip, for example by a device for feeding powdered material 700, a powder feed device 700 for short, can be conveyed (see, for example, FIG. 2). An inside width of the first gap 104 at the narrowest point thereof determines the thickness of the dry film 003, which may still be larger compared to the thickness in the later product 001; 002, even before the same passes an application point at which it is applied, in particular under pressure, to the carrier substrate 006.

The application point here is preferably formed directly by a nip of the second roller 103, which in this case is effective as a laminating roller 103, with a roller 106; 103 that is effective as a counter-pressure roller 106; 103' or by a roller which cooperates with the second roller directly or indirectly via one or more further rollers and which is effective as a laminating roller with a roller 106; 103 that is effective as a counter-pressure roller 106; 103' (not shown here). The second or further roller effective as the laminating roller 003 and the roller 106; 103 effective as the counter-pressure roller 106; 103 form, in the nip between the outer cylindrical surfaces thereof, a second gap 107, in particular an application gap 107, hereafter also, for example, referred to as a laminating gap 107, through which the carrier substrate 006 can be guided to which, in particular from the side facing away from the counter-pressure roller 106; 103, the dry film 003 which is formed via the first film-forming gap 104 and, for example, is at least 40 μm thick, for example between 50 μm and 200 μm, in particular 60 to 120 μm thick, can be applied.

In a preferred embodiment, the application stage 100; 100* comprises a second application unit 101' (see, for example, FIG. 3 to FIG. 13), by which likewise a, in particular solvent-free and/or dry, powder mixture 004', which is conveyed, for example, by a second device for feeding powdered material 700', powder feed device 700' for short, into the nip, can first be processed to a second dry film 003'; 003, in particular by way of compression and/or using a compression force, and thereafter this second dry film 003'; 003 can be applied to the other, second side of the carrier substrate 006, in particular by way of pressing and/or using a contact pressure force. This can generally be the same powder mixture 004' or a powder mixture that differs from the first powder mixture 004'.

A first roller 102', in particular metering roller 102', and a second roller 103', in particular laminating roller 103', are also preferably provided in the second application unit 101' so as to form, in the nip between the outer cylindrical surfaces thereof, a first gap 104', in particular a second film-forming gap 104', through which the powder mixture 004' can be conveyed for forming the second dry film 003'.

Here as well, the second roller 003' of the second application unit 101' directly, or a roller (not shown here) which cooperates with the second roller 103' directly or indirectly via one or more further rollers and is effective as a laminating roller, in the nip between the outer cylindrical surfaces, can form a gap 107'; gap 107 with a roller 106'; 103 that is effective as the counter-pressure roller 106'; 103, through which the carrier substrate 006 can be guided and have the second dry film 003' formed via the second film-forming gap 104'; 104 applied thereto, in particular on the second side facing away from the second counter-pressure roller 106'; 103.

In a first group of exemplary embodiments for the coating device 100 (see, for example, FIG. 3 to FIG. 7), a second gap 107' is formed by a second application gap 107', for example laminating gap 107', which differs from the first application or laminating gap 107', with a second roller 106', which is in particular effective as a counter-pressure roller 106 and effective as a second counter-pressure roller 106' that differs from the first counter-pressure roller 106 and/or from the laminating roller 103 of the first application unit 101, through which the carrier substrate 006 can be guided and have the second dry film 003' formed via the second film-forming gap 104' applied thereto, in particular on the second side facing away from the second counter-pressure roller 106'. In this embodiment, two independent application units 101; 101' are provided for the two sides of the carrier substrate 106. It is thus possible to set conditions in the relevant laminating gap 107; 107' for the particular job which independently differ from one another. For example, a different compression force or line force and/or possibly temperature can be set.

For such an embodiment, it is possible, for example with respect to a large wrap, for the metering roller 102; 102', the laminating roller 103; 103' and the counter-pressure roller 106; 106' forming the laminating gap 107; 107' with the latter to be arranged in the respective application unit 101; 101' in a first variant embodiment with respect to one another in such a way that the planes connecting the axes of rotation R102; R103; R106; R102'; R103'; R106' of the respective adjacent rollers 102; 103; 106; 102'; 103'; 106' intersect at an angle α, which is, for example, between 40° and 130°, in particular between 70° and 110°, preferably between 80° and 100°. A large wrap can cause a better heat transfer from a possibly temperature-controlled counter-pressure roller 106; 106' and/or improved, for example flutter-free, run-up and run-off (see, for example, FIG. 3 to FIG. 5).

The particular counter-pressure roller 106; 106' can thus, for example, be arranged beneath the laminating roller 103; 103' in such a way that the plane connecting the axes of rotation R103; R106; R103' of the two rollers 103; 103'; 106; 106' deviates from the vertical by no more than ±30°, in particular no more than ±15°. In the process, the compression force in the laminating gap and gravitation act predominantly in the same direction.

In a second variant embodiment, which is advantageous, for example, with respect to the effective forces and load directions, the metering roller 102; 102', the laminating roller 103; 103' and the counter-pressure roller 106; 106' forming the laminating gap 107; 107' with the latter are arranged, for example, in such a way with respect to one another in the respective application unit 101; 101' that the planes connecting the axes of rotation R102; R103; R106; R102'; R103'; R106' of the rollers 102; 103; 106; 102'; 103'; 106', which are in each case adjacent in pairs, intersect at the most at an acute angle α that is no more than 20° degrees, in particular 0°, so that the axes of rotation R102; R103; R106; R102'; R103' of the three rollers 102; 103; 106; 102'; 103'; 106' of the same application unit 101; 101' are located in the same plane. This makes the arrangement very rigid since the forces and counter-forces are at least predominantly directed against one another.

Figure 7:
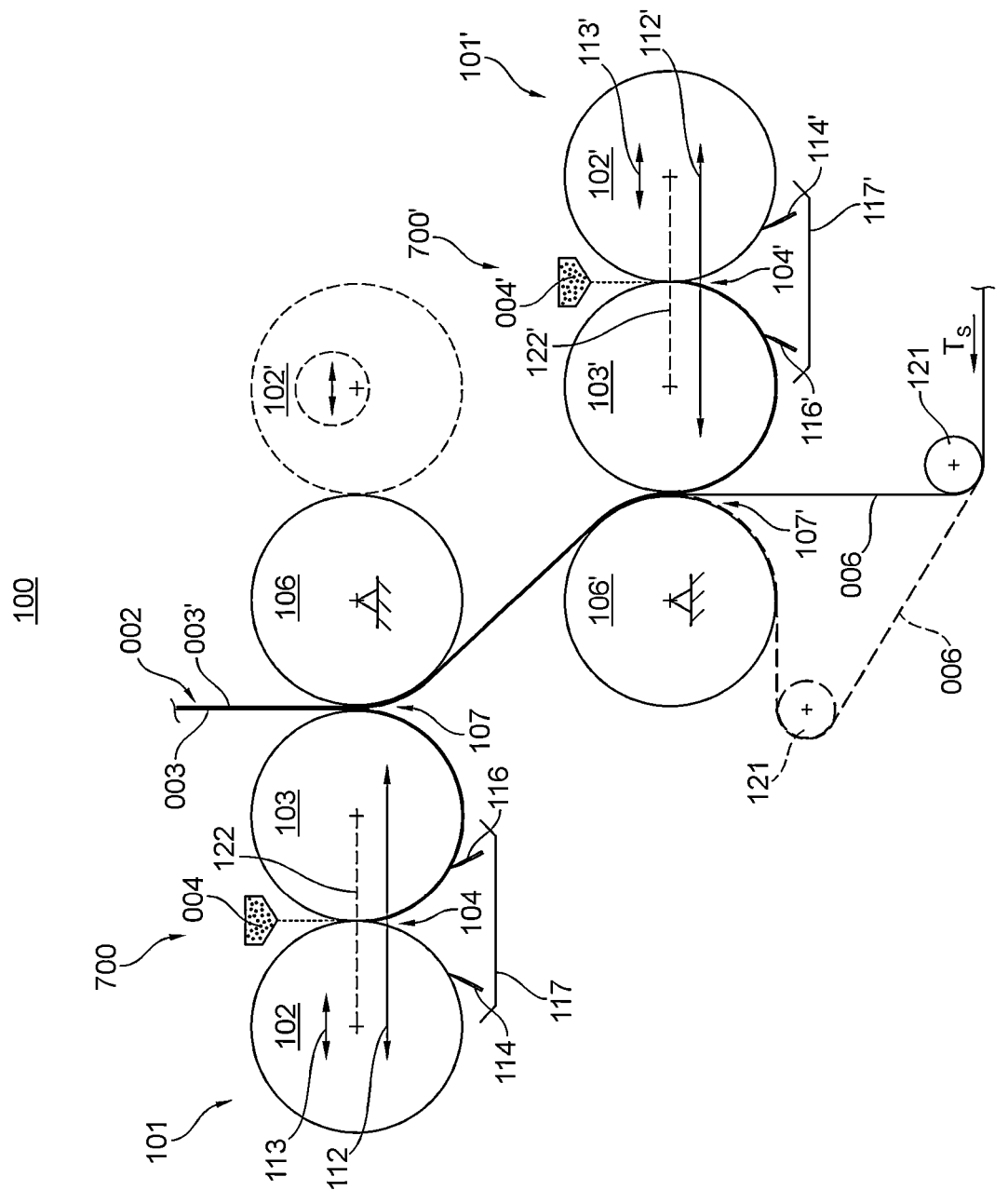
FIG. 7 a further alternative embodiment of the embodiment of a first group of exemplary embodiments.

The two application units 101; 101' are located with the laminating rollers 103; 103' thereof on different sides of the substrate path and can be arranged on top of one another in such a way that the two laminating gaps 107; 107' in one embodiment are located vertically directly on top of one another (see, for example, FIG. 6) or in another embodiment are horizontally offset from one another, in particular by at least half a laminating roller diameter and no more than one and a half laminating roller diameter (see, for example, FIG. 7). Based on FIG. 7, a substrate guidance that can also be applied to other embodiments is indicated by way of example by a dotted line, by way of which a larger wrap angle, and thus better heat transfer and/or more stable run-up can be implemented. For this purpose, the substrate path is or is being deflected by an additional substrate guide element 121 in such a way that the transport direction $T_S$ during the run-up on the succeeding roller 106; 106' runs at least 45° inclined with respect to the transport direction $T_S$ of the exiting substrate 006.

Figure 5:
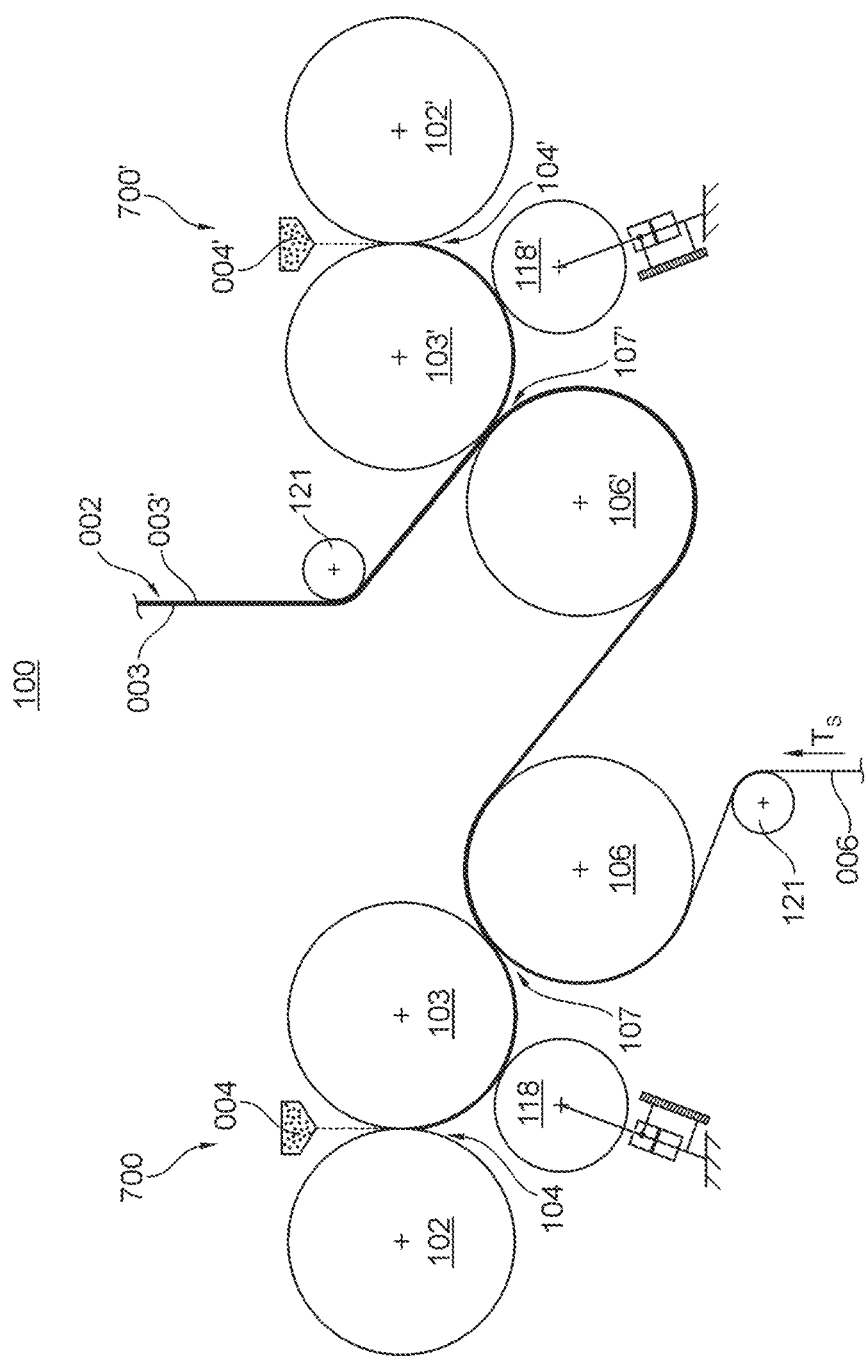
FIG. 5 an alternative embodiment of one embodiment of the first group of exemplary embodiments.
Figure 6:
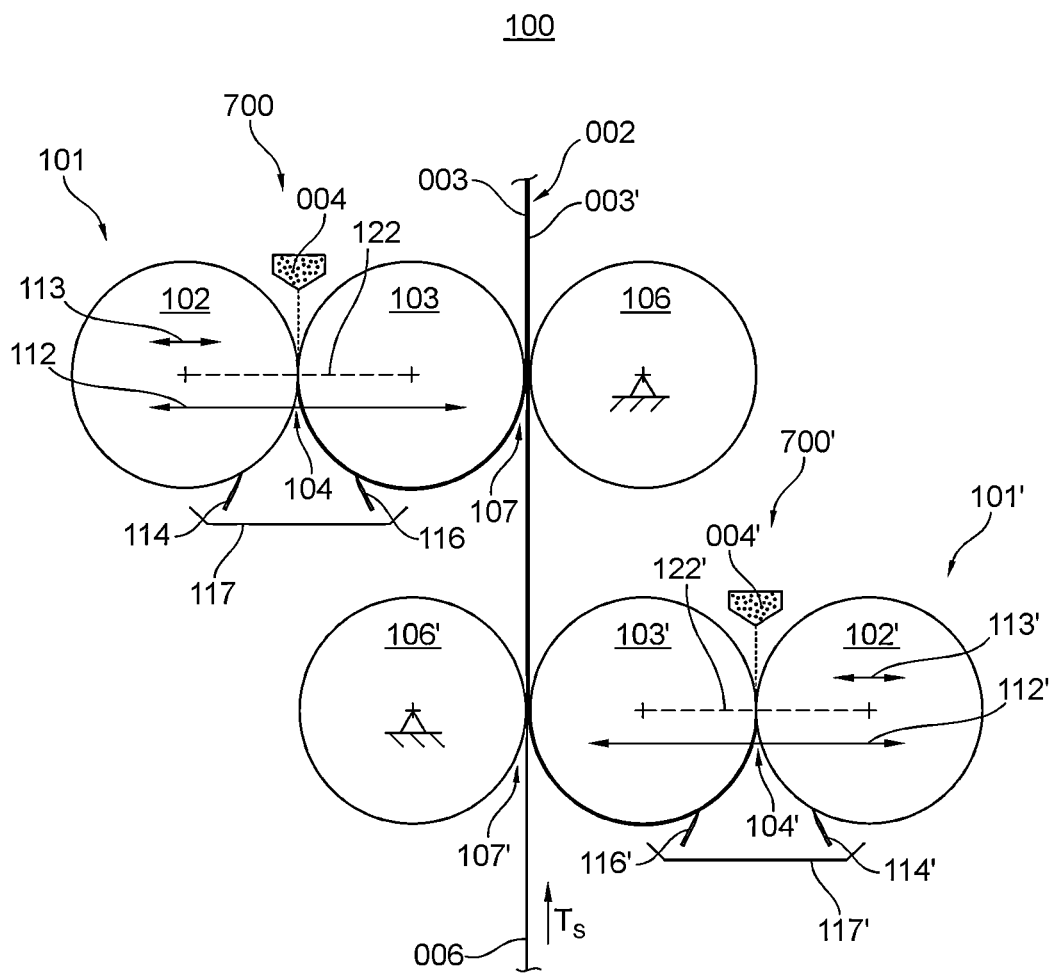
FIG. 6 a further alternative embodiment of the embodiment of a first group of exemplary embodiments.

In addition to the metering roller 102; 102', the second roller 103; 103' or a roller that cooperates with the second roller directly or indirectly via one or more further rollers and is effective as a laminating roller, a further roller 118; 118' (see, for example, by way of example for all embodiments of the first group in FIG. 5) can be provided in an advantageous refinement, which in a circumferential section, which during normal operation, that is, during production operation, guides the dry film 003; 003', between the metering gap 104; 104' and laminating gap 107; 107', the laminating roller 103; 103' in the form of a calendering roller 118; 118' can be placed against a dry film 003; 003' that is to be guided or is guided on the laminating roller 103; 103'.

For the above-described embodiments, variant embodiments and specific embodiments, it is possible, in a first configuration of the roller mount, for the laminating roller 103; 103' of the respective application unit 101; 101' to be mounted so as to be stationary, during normal operation, with the axis of rotation R103; R103' thereof, even though it may be adjustable in the position thereof, and for the metering roller 102; 102' and the counter-pressure roller 106; 106' in each case to be mounted so as to be adjustable in a direction having at least one movement component toward the assigned laminating roller 103; 103' and/or away therefrom by way of respective positioning drives 109; 109'; 111; 111'. Here and hereafter, the term of a positioning drive 109; 109'; 111; 111' shall be understood to mean the entirety of the means that effectuate and/or enable the direct or indirect adjustment of a roller 102; 102'; 103; 103'; 106; 106', which hereafter are also referred to as positioning means 109; 109'; 111; 111', and encompasses at least one positioning mechanism 112; 112'; 113; 113' guiding the roller 102; 102'; 103; 103'; 106; 106' along a positioning movement as well as one or more drive means 132; 132'; 133; 133' effectuating the adjustment.

For placing the respective metering roller 102; 102' against the second roller 103; 103', a position-based positioning drive 109; 109' or positioning means 109; 109' is provided in a first design for a position-based adjustment, that is, a positioning drive 109; 109' or positioning means 109; 109' by way of which the component to be adjusted can be moved into a defined position.

Such a position-based positioning drive 109; 109' can be implemented, for example, by a drive means 132; 133, for example drive motor, itself being able to assume a defined and specifiable position, such as is possible, for example, for a closed loop position-controlled servo drive or motor, or by an adjustment path, at least toward the relevant side, being delimited, for example, by stop means that can be adjusted by positioning and/or drive means, for example an adjustable stop, which defines the end position and against which the component to be adjusted in terms of the position is placed or can be placed by means of a, for example, force-based or not positionally accurate drive means 133; 133'. The roller 102; 102' is mounted, for example, in or at a positioning mechanism 112; 112'; 113; 113' which is formed by a bearing mechanism 112; 112'; 113; 113' implementing the adjustment path, for example, in a positionally accurate manner. Such a mechanism is advantageously provided, for example, by a bearing 113; 113' comprising an eccentric, for example a triple ring bearing 113; 113', in particular for small adjustment paths at large forces. With respect to, for example, a position that is parallel to the adjustment direction and thus more direct in terms of the adjustment path, however, a linear bearing 112; 112' extending in the adjustment direction may also be advantageous instead.

For adjusting the respective counter-pressure roller 106; 106', a force-based positioning drive 111; 111' or positioning means 111; 111' is or are provided in this first advantageous design for a force-based adjustment, that is, a positioning drive 111; 111' or positioning means 111; 111' by way of which a placement with a defined force against the abutment can be implemented.

Such a force-based positioning drive 111; 111', which is in particular provided on at least one side, can be implemented, for example, in that a drive means 132; 132', for example a drive motor 132; 132', itself can apply a defined and specifiable force, such as is possible, for example, for a closed loop moment-controllable or open loop moment-controllable, in particular closed loop torque-controllable or open-loop torque-controllable servo drive or motor, or in that the roller to be adjusted can be placed against the other roller 103; 103' with an adjustment force toward the relevant side by a drive means 132; 132'; 133; 133' actuatable by means of a pressure means, for example by a pneumatically or hydraulically actuated cylinder-piston system, wherein the pressure of the drive means 132; 132'; 133; 133' is preferably adjustable. The counter-pressure roller 106; 106' is mounted, for example, in or at a positioning mechanism 112; 112'; 113; 113', which is formed by a bearing mechanism 112; 112' that implements the adjustment force in a force-based manner, that is, without additional mechanical delimitation of the adjustment path. This can advantageously be formed, for example, by a bearing mechanism 112; 112' designed as a linear bearing 112; 112', at least on one side, but preferably on both sides.

In a second design, however, the metering roller 102; 102' can conversely be adjustable in a force-based manner, and the counter-pressure roller 106; 106' can be adjustable in a position-based manner. For this purpose, what was described above must be appropriately transferred and applied.

In a third design, however, both rollers 102; 102'; 106; 106' can be adjustable in a force-based manner, and in a fourth design both rollers 102; 102'; 106; 106' can be adjustable in a position-based manner. For this purpose, what was described above must be appropriately transferred and applied.

In a particularly advantageous fifth design, a combined positioning mechanism 112; 113; 112'; 113' and/or a combined positioning drive 109; 109'; 111; 111' or combined positioning means 109; 109'; 111; 111' are provided for adjusting at least the metering roller 102; 102' and/or at least for adjusting the counter-pressure roller 106; 106', which selectively allows a position-based adjustment of the relevant roller 102; 102'; 106; 106' or a force-based adjustment.

Such a combined positioning drive 109; 109'; 111; 111' is formed, for example, by a force-based positioning drive 111; 111' comprising a positioning mechanism 112; 112'; 113; 113', in the adjustment path of which selectively a stop, which can be positioned, for example, by drive and/or positioning means, can be introduced for limiting the position. As an alternative, a positioning drive 109; 109'; 111; 111' which comprises, as drive means 132; 132'; 133; 133', a selective closed loop position-controlled or open loop position-controlled or closed loop moment-controlled or open loop moment-controlled motor, in particular servo motor, is also advantageous.

In a second configuration for the roller mounting, the counter-pressure roller 106; 106' of the respective application unit 101; 101' can be mounted so as to be stationary, during normal operation, with the axis of rotation R106; R106' thereof, even though it may be adjustable, and the laminating rollers 103; 103', with the respective assigned metering roller 102; 102', can be mounted so as to be adjustable in pairs in a direction having at least one movement component toward the assigned counter-pressure roller 106; 106' and/or away therefrom by way of respective shared bearing mechanisms 112; 112' and/or positioning drives 111; 111', and additionally the respective metering rollers 102; 102' can be mounted so as to be adjustable in a direction having at least one movement component toward the respective assigned laminating roller 103; 103' and/or away therefrom by way of bearing mechanisms 112; 112'; 113; 113' and/or positioning drives 109; 109'; 111; 111'.

In a first advantageous design, a position-based positioning drive 109; 109' within the above meaning, for example a bearing mechanism 112; 112'; 113; 113' formed by a triple ring bearing 113; 113' or by a linear bearing 112; 112'; 113'; 113' can be provided for this purpose, for example on one side or both sides, for adjusting the respective metering roller 102; 102'. A force-based positioning drive 111; 111' within the above meaning can be provided for adjusting the laminating rollers 103; 103'; in pairs with the respective assigned metering roller 102; 102'.

In a second configuration, however, the metering roller 102; 102' can conversely be adjustable in a force-based manner, and the roller pair 103, 102; 103'; 102' can be adjustable in a position-based manner. For this purpose, what was described above must be appropriately transferred and applied.

In a third configuration, however, the metering roller 102; 102' and the roller pair 103, 102; 103'; 102' can be adjustable in a force-based manner, and in a fourth configuration the metering roller 102; 102' and the roller pair 103, 102; 103'; 102' can be adjustable in a position-based manner. For this purpose, what was described above must be appropriately transferred and applied.

In a particularly advantageous fifth configuration, a combined positioning mechanism 112; 113; 112'; 113' is provided for adjusting at least the metering roller 102; 102' and/or at least for adjusting the roller pair 103; 102; 103'; 102' within the above meaning and/or in the above design, which selectively allows a position-based or force-based adjustment of the pair toward the counter-pressure roller 106; 106'; 103'; 103.

In a second group of exemplary embodiments for the coating device 100\* (see, for example, FIG. 8 to FIG. 12, FIG. 15, and FIG. 16), the second roller 003' of the second application unit 101' or a roller of the second application unit 101' cooperating with the second roller 103' directly or indirectly via one or more further rollers, together with the second or further roller 103 of the first application unit 101 effective as the laminating roller 103, in a nip between the outer cylindrical surfaces thereof, form a shared gap 107 that is effective as a two-sided laminating gap 107, wherein the two laminating rollers 103; 103' forming the gap 107 between each other are effective with respect to one another as counter-pressure rollers 103'; 103. The carrier substrate 006 can be guided through the latter and has the respective dry film 003'; 003' formed by way of the first and second film-forming gaps 104; 104' applied thereto, in particular on both sides. Such an arrangement of two application units

101; 101' cooperating for the simultaneous two-sided application is also referred to hereafter as a double application unit 101, 101'.

The planes formed in the respective application unit 101; 101' by the axes of rotation R102; R103; R102'; R103' of the metering roller 102; 102' and the laminating roller 103; 103', for example, intersect at the most at an acute angle α, which, for example, is no more than 20° degrees, advantageously no more than 5°, in particular 0°, so that in the last case the axes of rotation R102; R103; R106; R102'; R103' of the rollers 102; 103; 106; 102'; 103'; 106' of the two application units 101; 101' cooperating in a two-sided laminating gap 107 are located in the same plane or extend parallel to, but vertically offset from one another.

Figure 8:
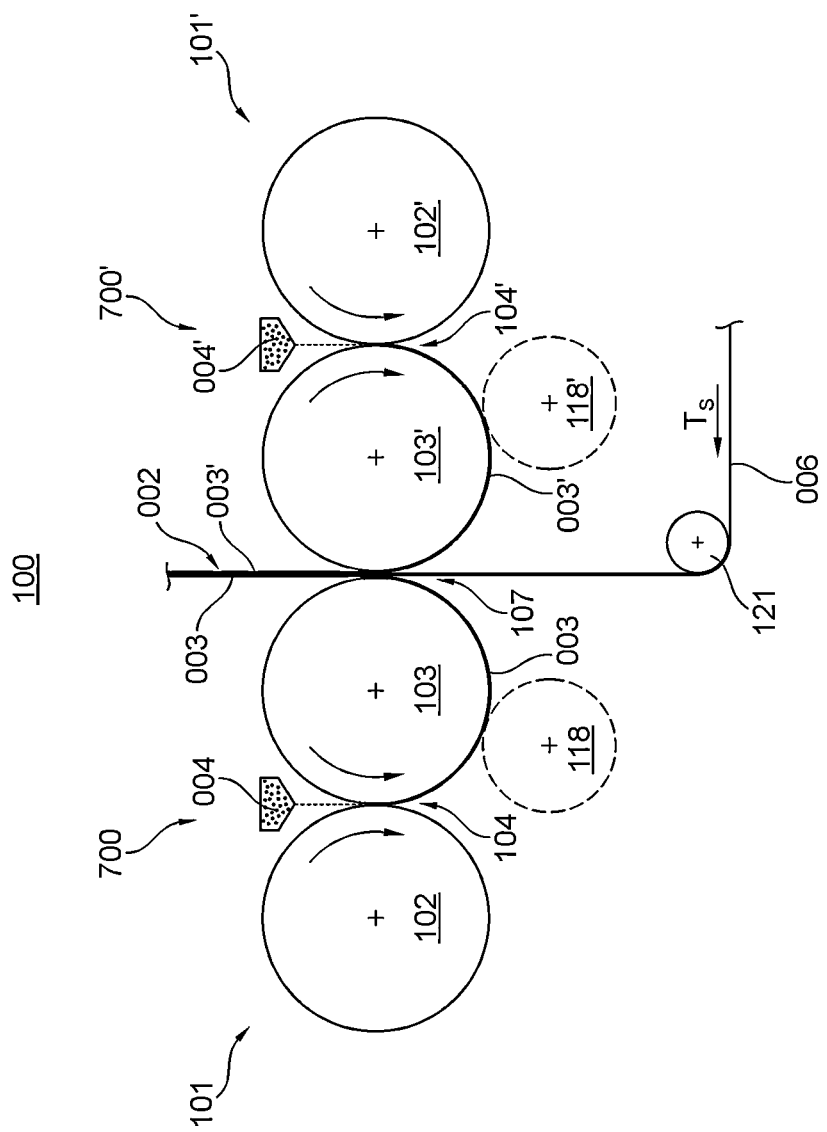
FIG. 8 a schematic diagram of one embodiment of a second group of exemplary embodiments.

In a first variant embodiment, the two planes extend in a shared horizontal plane or horizontally, but vertically offset from one another (see, for example, FIG. 8).

In a second advantageous variant embodiment, for example with respect to a smaller wrap, the two planes extend in a shared plane that is inclined to the horizontal or in two planes that are inclined to the horizontal, but offset vertically from one another. The shared plane is, or the two offset planes are, for example, inclined to the horizontal by an acute angle β of 2° to 15°, in particular 3° to 10°(see, for example, FIG. 9).

Figure 9:
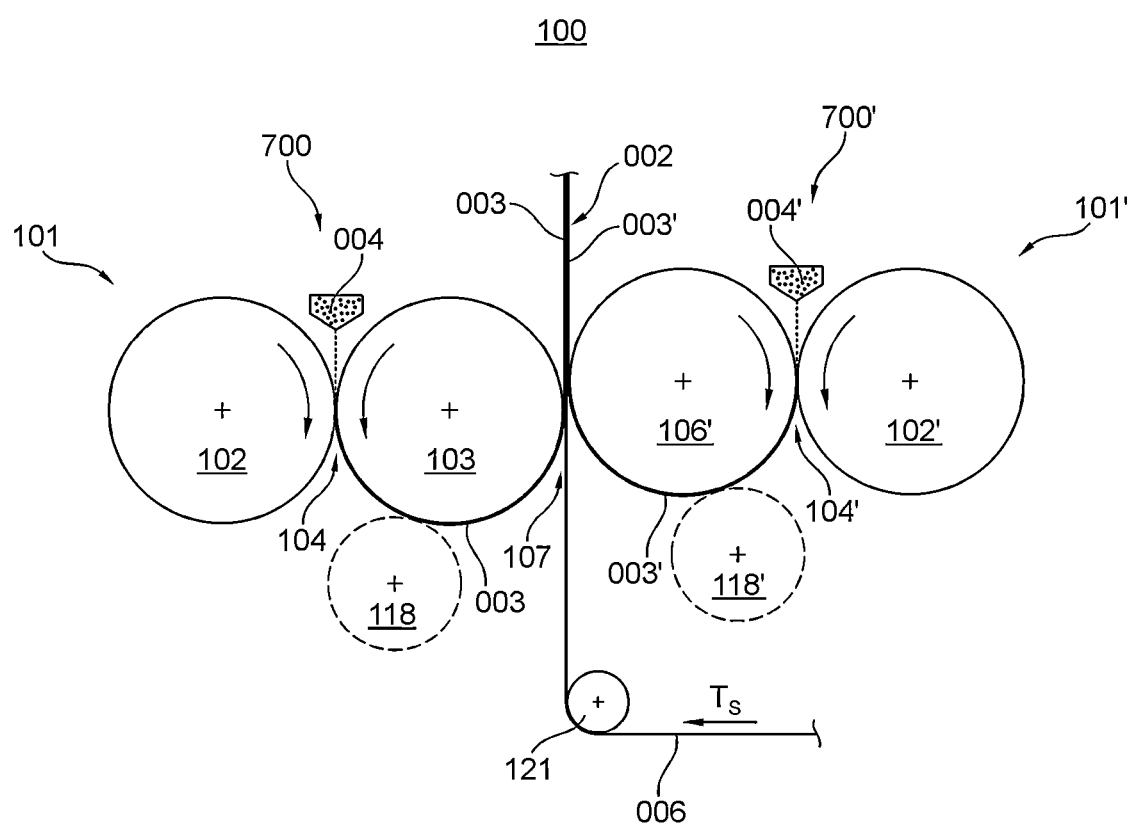
FIG. 9 a schematic diagram of a further embodiment of a second group of exemplary embodiments.
Figure 10:
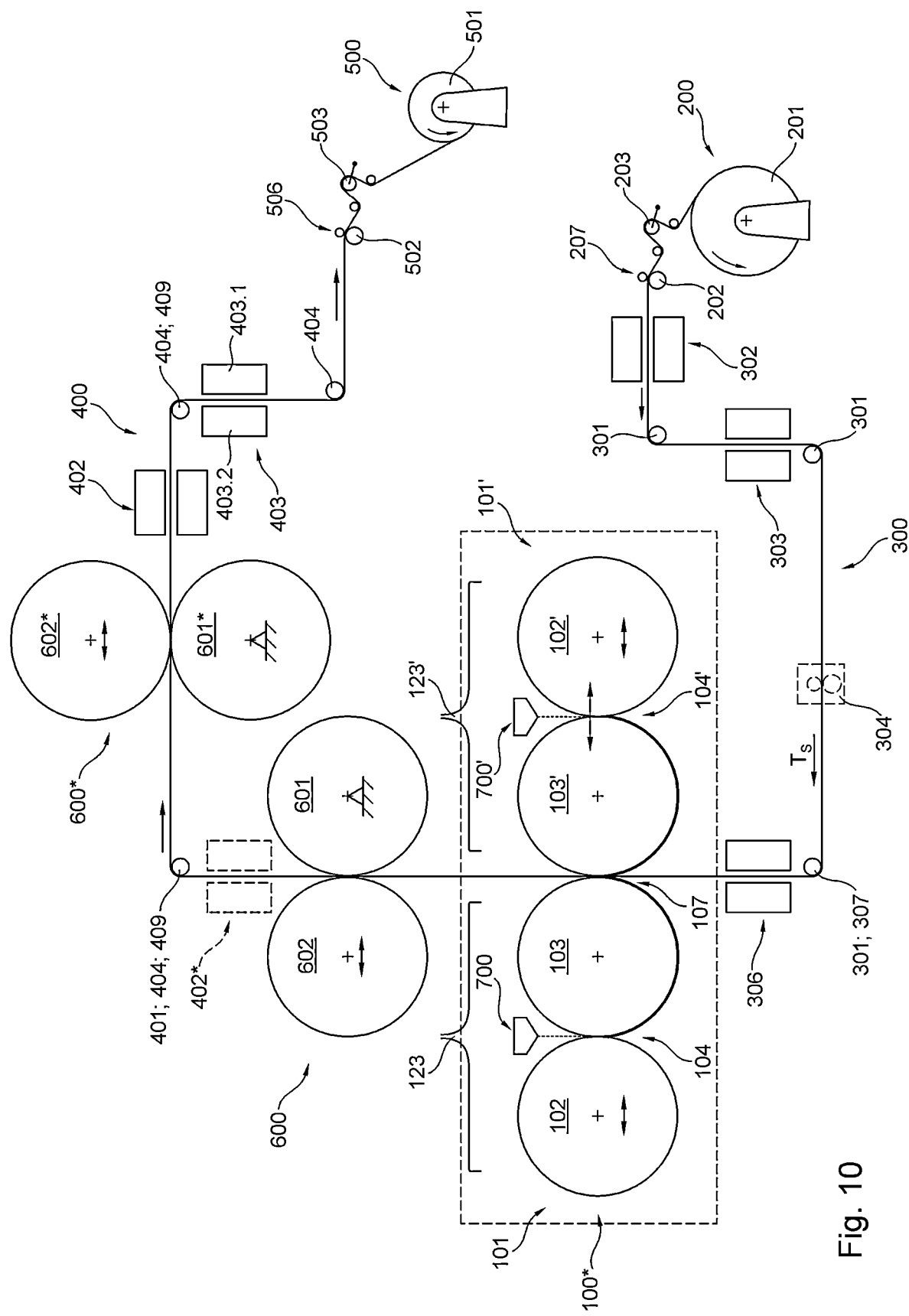
FIG. 10 an exemplary embodiment of a machine for producing a multi-layer product including a dry film that is applied to a carrier substrate with an application stage according to one embodiment of the second group of exemplary embodiments.
Figure 11:
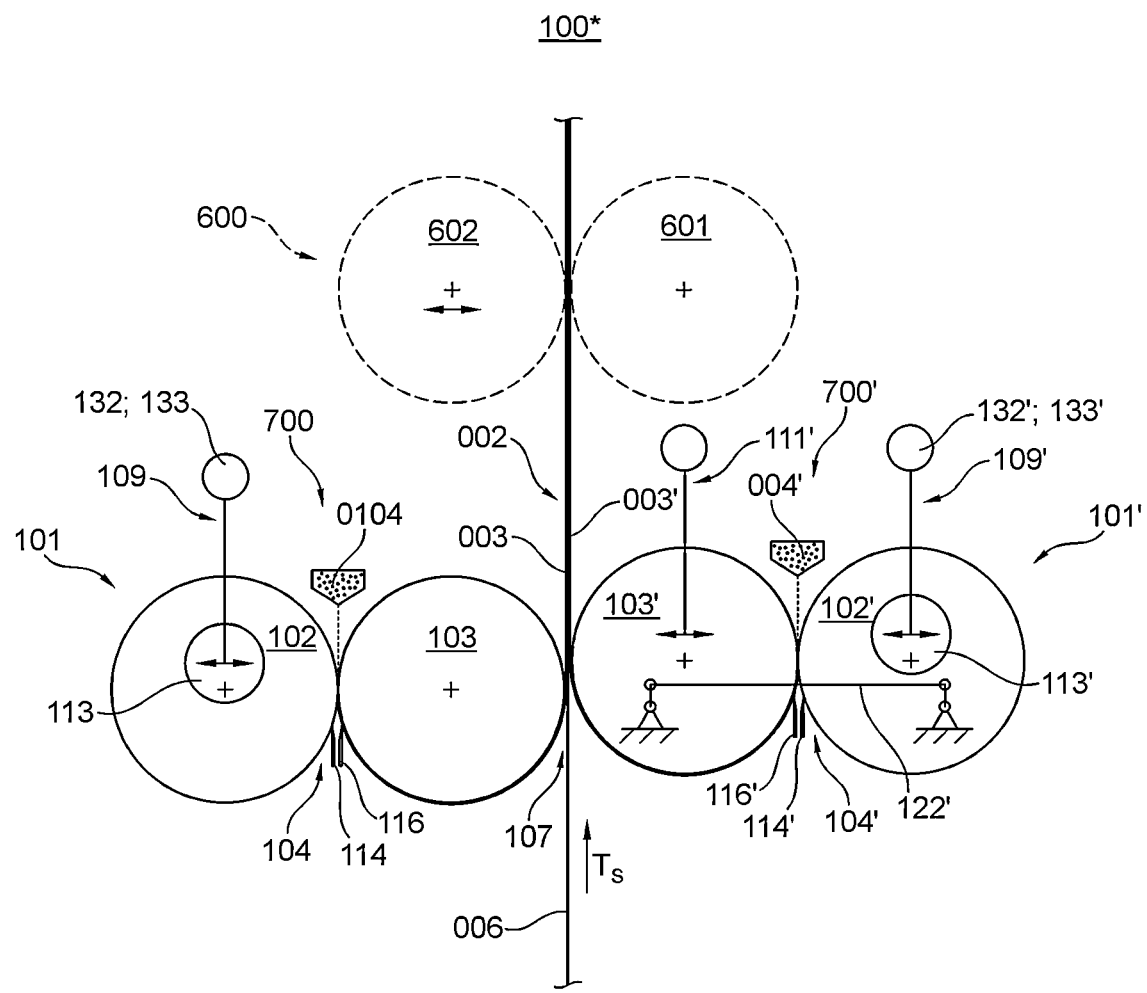
FIG. 11 an enlarged view of the application stage from FIG. 10 with the coupling of two rollers in pairs in a first design.

In addition to the respective metering roller 102; 102' and the second roller 103; 103', in an advantageous refinement a further roller 118; 118' in the above-described form of a calendering roller 118; 118' can also be provided here (see, for example, by way of example dotted for all embodiments of the second group in FIG. 8 and FIG. 9).

For the above-described variant embodiments and specific embodiments, in a first configuration of the roller mounting, a first of the two laminating rollers 103 or a further roller, effective as a laminating roller, of a first of the two application units 101 can be mounted so as to be stationary, during normal operation, with the axis of rotation R103 thereof, even though it may be adjustable, while the second of the laminating rollers 103' or a further roller, effective as a second laminating roller, together with the assigned metering roller 102; 102' are mounted so as to be adjustable in pairs in a direction having at least one movement component toward the assigned counter-pressure roller 106; 106' and/or away therefrom by way of a shared bearing mechanism 112; 112' and/or a shared positioning drive 109; 109'; 111; 111', and additionally the respective metering rollers 102; 102' are mounted so as to be adjustable in a direction having at least one movement component toward the respective assigned laminating roller 103; 103' or further roller and/or away therefrom by way of bearing mechanisms 112; 112'; 113; 113' and/or positioning drives 109; 109'; 111; 111'. If one or more further rollers are present between the metering roller 102; 102' and the roller effective as a laminating roller, these are, for example, also adjustable together in a direction having at least one movement component toward the assigned counter-pressure roller 106; 106' and/or away therefrom by way of the shared bearing mechanism 112; 112' and/or the shared positioning drive 109; 109'; 111; 111'.

For the adjustment of the respective metering roller 102; 102', a position-based positioning drive 109; 109' within the above meaning and/or in an above-described embodiment is provided in a first advantageous configuration. For the adjustment of the second laminating roller 103' in pairs with the assigned metering roller 102', a force-based positioning drive 111; 111' can be provided for a force-based adjustment within the above meaning and/or in an above-described embodiment.

In a second configuration, however, the metering roller 102; 102' can conversely be adjustable in a force-based manner, and the roller pair 103, 102; 103', 102' can be adjustable in a position-based manner. For this purpose as well, what was described above must be appropriately transferred and applied.

In a third design, however, both rollers 102; 102'; 106; 106' can be adjustable in a force-based manner, and in a fourth design both rollers 102; 102'; 106; 106' can be adjustable in a position-based manner. For this purpose, what was described above must be appropriately transferred and applied.

In an advantageous fifth configuration, a combined positioning mechanism 112; 113; 112'; 113' is provided for adjusting at least the metering roller 102; 102' and/or at least for adjusting the roller pair 103; 102; 103'; 102' within the above meaning and/or in the above design, which selectively allows a position-based adjustment of the pair against the laminating roller 103'; 103 effective as a counter-pressure roller 103'; 103 via a position-based actuator 109; 109' and a force-based adjustment via a force-based actuator 111; 111'.

For all embodiments of the two groups of exemplary embodiments comprising jointly adjustable rollers 103'; 102'; 103; 102, these can be mounted on both sides in carriers 122'; 122, in particular in side parts of a subframe, which, in turn, are mounted by way of bearing mechanisms 112; 112'; 113'; 113 formed by linear bearings 112; 112'; 113'; 113 in a frame receiving the application units 101; 101'.

Figure 12:
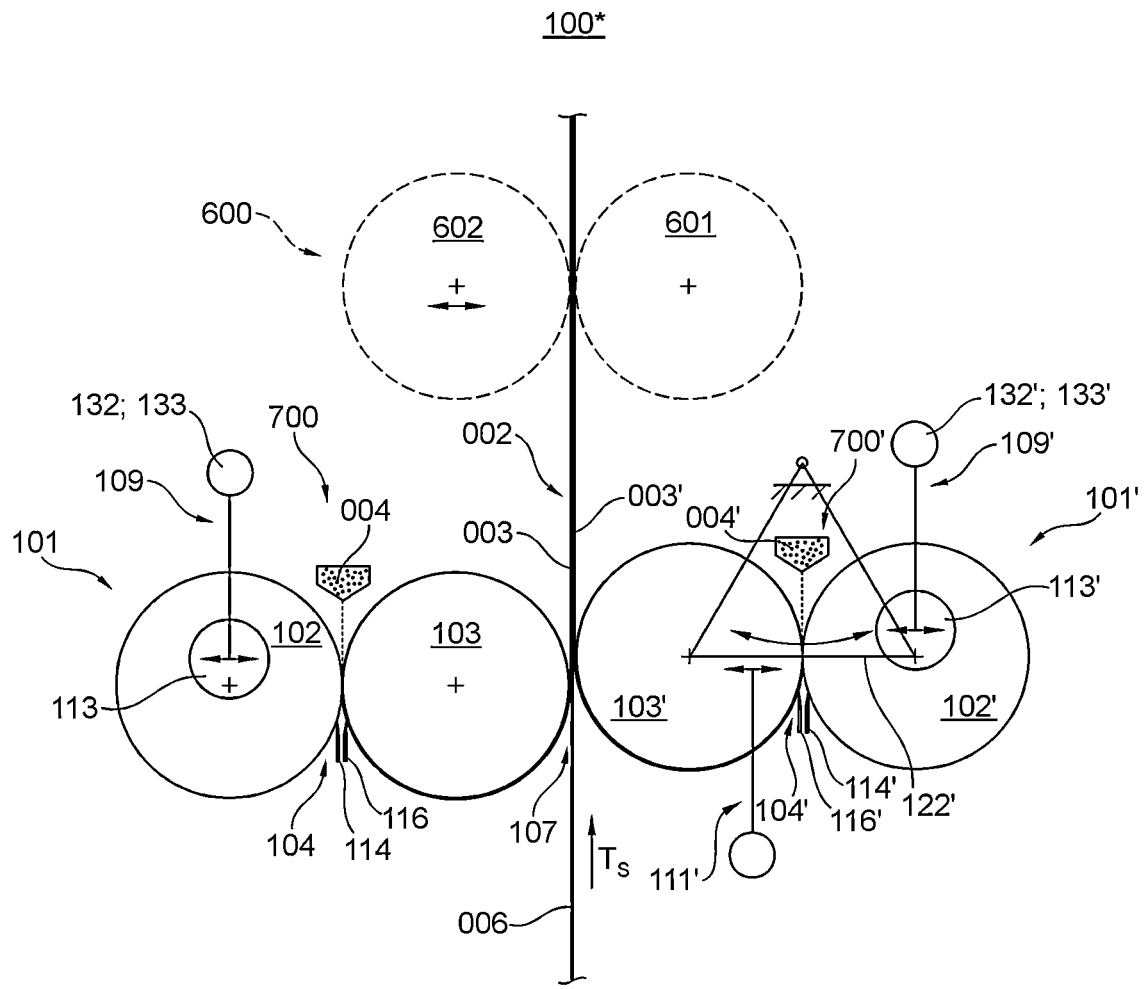
FIG. 12 an enlarged view of the application stage from FIG. 10 with the coupling of two rollers in pairs in a second design.
Figure 13:
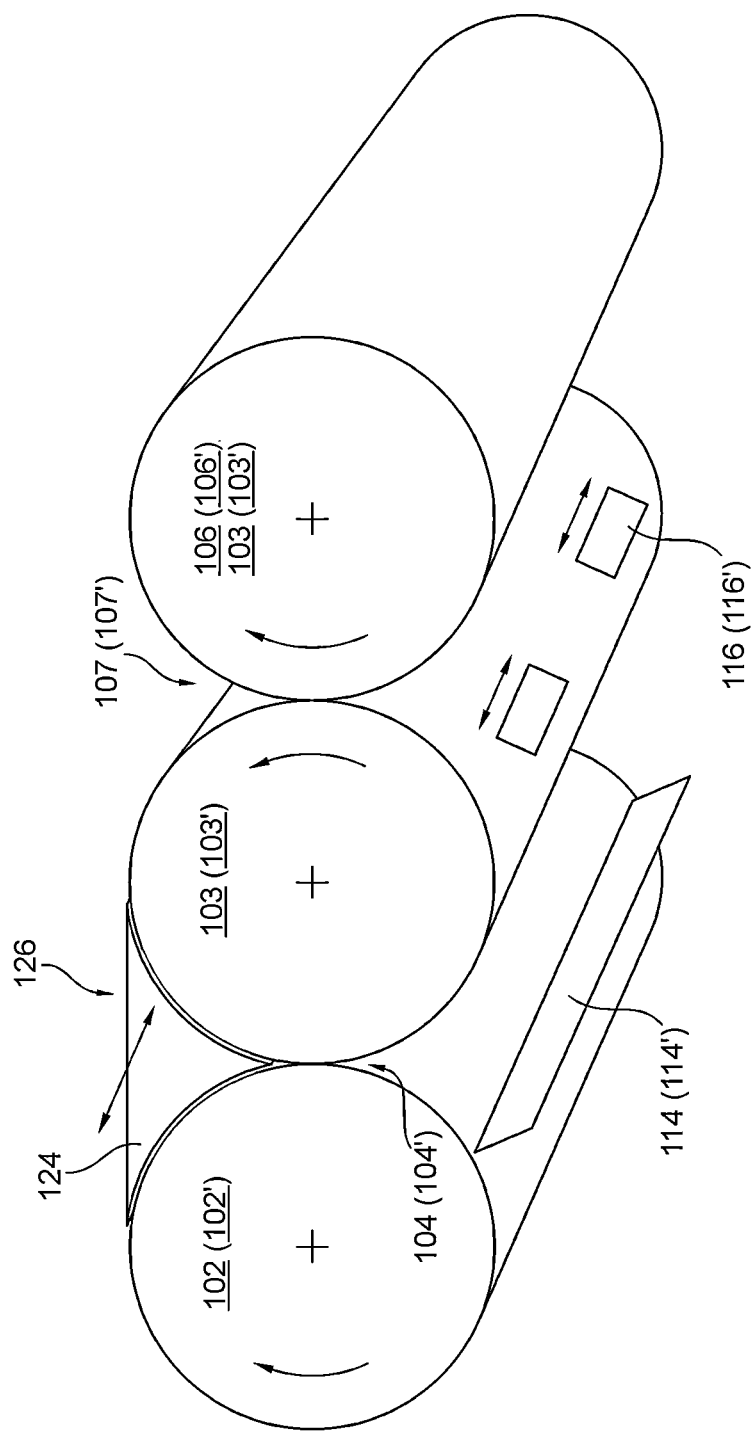
FIG. 13 a representation obliquely from beneath with removal devices.
Figure 14:
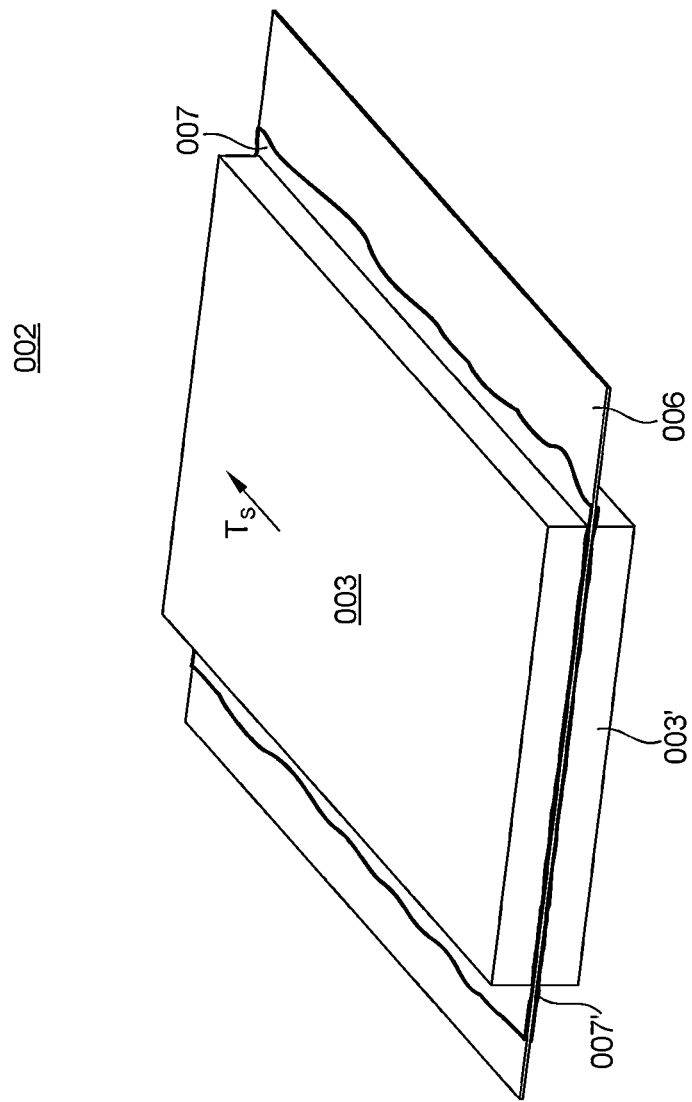
FIG. 14 an oblique view of a product section a slight lateral primer protrusion.

As an alternative, the two jointly adjustable rollers 102; 103; 102'; 103', however, can be mounted on both sides in carriers, in particular in side parts of a subframe, which, in turn, are mounted so as to be pivotable about a pivot axis that is parallel to the axis of rotation of the first laminating roller 103; 103' mounted in a stationary manner (see, for example, FIG. 12).

As was already mentioned, at least one further roller, which is effective as a laminating roller and, together with the counter-pressure roller 106; 103', forms the laminating gap 107; 107', can be provided in a respective application unit 101; 101' between the second roller 103; 103' and the nip point for the counter-pressure roller 106; 103'.

For all embodiments of the two groups of exemplary embodiments, in a particularly advantageous refinement a removal device 114; 114', which is comprised, for example, by a material removal unit 127; 127' and, for cleaning purposes, can be selectively placed against and be removed from the outer cylindrical surface of the first roller 102; 102', in particular a cleaning squeegee 114; 114', is provided in the respective application unit 101; 101'. This removal device extends, for example, at least over the width of the cylindrical roller surface which is effective for forming the film.

Instead or advantageously in addition, the material removal unit 127; 127' in the respective application unit 101; 101', viewed axially parallel to the second roller 103; 103', comprises spaced apart from one another two axially parallel adjustable removal devices 116; 116', which can be placed against or removed from the second roller 103; 103', in particular a side edge squeegee 116; 116', by which a dry film 003; 003' that is conveyed over the second roller 103; 103' can be removed in the region of the lateral edges thereof and, for example, be transferred into a collecting device 117; 117'. This removal serves, for example, as a so-called trimming of the edge, to preserve a straight edge and/or a desired width b003' of the dry film 003; 003'. The collected amount can, for example, be returned to the infeed of the powder mixture 004; 004'. Such a removal device 116; 116' can also be used to remove an edge strip 008; 008', which is used, for example, during the determination of a density p of the material layer 003; 003', such as is set out below, for example, in conjunction with FIG. 20, for example.

For cleaning purposes, a removal device 129; 129' that can be placed against and removed from the outer cylindrical surface of the second roller 103; 103', in particular a cleaning squeegee 129; 129', can also advantageously be provided, which, for example, extends at least over the width of the cylindrical roller surface, which is effective for forming the film, and possibly an extraction or collecting device, which is not shown.

For feeding or introducing the powder mixture 004; 004' into the first gap 104; 104', an above-described powder feed device 700; 700' for feeding a powdered material is provided, wherein a filling and/or supply chamber 126 having a width extending in the axial direction of the second roller 103; 103' is formed and/or provided in the region of the wedge-shaped space above the gap 104; 104' between the first and second rollers 102; 103; 102'; 103'.

In a particularly advantageous design, two boundaries 124, which are spaced apart from one another axially parallel to the first roller 102; 102' and are adjustable in the axially parallel direction, in particular side shields 124, are provided in the application unit 101; 101' above the first gap 104; 104', which each seal off a region of the upper wedge-shaped space formed between the outer cylindrical surfaces of the first and second rollers 102; 103; 102'; 103' toward the two end faces of the application unit 101; 101', and in this way form an interposed filling and/or supply chamber 126, which preferably can be varied in terms of the width, for receiving the powder mixture 004; 004'. Depending on the desired width and/or position of the dry film 003; 003', the filling and/or supply chamber 126 can thus be varied or be variable on at least one side, preferably on both sides, in terms of the position of the lateral boundary 124 thereof. As an alternative to a filling and/or supply chamber 126 that is directly delimited by the outer cylindrical surfaces in the lower region, generally a filling and/or supply chamber 126 in the form of a filling or supply hopper could also be provided, at least where this does not contradict other design features of the application unit 101; 101' or of the powder feed unit 700; 700', for example in a manner comparable to an insertion aid described below, directly in or above the wedge-shaped space.

For all above-described embodiments, variants, configurations, specific embodiments or designs, the bearing mechanism 112; 112'; 113; 113' and/or the positioning drive 109; 109'; 111; 111' of the first roller 102; 102' is preferably designed in such a way that a gap width for the first gap 104; 104', during normal operation, can be set to a variable inside width at the narrowest point of at least 15 µm, advantageously of at least 30 µm, in particular of at least 50 µm, and/or that the gap width of the first gap 104; 104' can at least be set by way of above-described position-based drive means 132; 132' and/or by way of at least one-sided stop means which delimit a contact position toward the nip point and the positions of which are adjustable, that is, for example an above-described adjustable or positionable stop.

As an alternative or in addition, the bearing mechanism 112; 112'; 113; 113' and/or the positioning drive 109; 109'; 111; 111' are advantageously designed to set and/or apply, in the first gap 104; 104' at least in the region of the width thereof contributing to the film formation, a line force of, for example, at least 500 N/mm, advantageously at least 700 N/mm, preferably a line force ranging between 500 N/mm and 3000 N/mm, between the rollers 102; 102'; 103; 103' forming the first gap 104; 104'.

As mentioned above, a combined positioning mechanism 112; 113; 112'; 113' can be provided for placing the metering roller 102; 102' against the second roller 103; 103', for example in an above embodiment and/or within the above meaning, which selectively, for example in one operating mode, allows a position-based adjustment by way of a position-based positioning drive 109; 109' and, for example in a second operating mode, allows a force-based adjustment by way of a force-based positioning drive 111; 111'.

For all above-described embodiments, variants, configurations, specific embodiments or designs and, for example, independently of the above-described implementation of the coating device 100; 100* comprising individual application units 101; 101' with respective counter-pressure rollers 106; 106' or comprising combined application units 101; 101' with counter-pressure rollers 103'; 103 that are effective with respect to one another, in a particularly advantageous embodiment the metering gap 104; 104' between the first and second rollers 102; 102'; 103; 103' can be adjusted based on a position-based positioning drive 109; 109' within the above meaning, that is, for example can be set to a constant and/or defined gap width, for example can be positioned toward a specified gap width or can be controlled, for example, by open loop control or can be controlled, for example, by closed loop control, wherein the position-based adjustment is in particular directed at a defined relative position or gap width of the two rollers 102; 103'; 102' 103, which is to be maintained at a constant level, in the working position thereof, and/or the laminating gap 107; 107' between the second roller 103; 103' and the counter-pressure roller 106; 106'; 103'; 103 can be adjusted within the above meaning based on a force-based positioning drive 111; 111', that is, for example, can be set to a constant and/or defined compression force or line force, for example with respect to a specified or desired adjustment force via, for example, a pressure control valve or, for example, can be controlled by open-loop control via a controlled system comprising such a pressure control valve or, for example, can be controlled by closed-loop control via a controlled system comprising such a pressure control valve, wherein the force-based adjustment is in particular directed at a compression force or line force, which is defined and/or to be maintained at a constant level, between the two rollers 106; 106'; 103'; 103 involved in the second gap. It shall be noted only for clarification purposes that the line force or compression force effective between the two rollers involved in the gap, in particular, does not act directly, but via the material that is guided through the gap, in the case of the film-forming gap 104; 104' thus, for example, via the powdered material 004; 004', and in the case of the laminating gap 107; 107' via the product strand 002 comprising the dry film 007 on one side or both sides.

Without limiting the above-described specific exemplary embodiments, generally any of the two rollers 102; 102'; 103; 103'; 106; 106' involved in the relevant gap 104; 104'; 107; 107' can be mounted so as to be adjustable by the corresponding positioning drive 109; 109'; 111; 111' and/or at corresponding positioning mechanisms 112; 112'; 113; 113' within the above meaning. This also applies to embodiments in which a roller 102; 102'; 103; 103'; 106; 106' that is involved in the relevant gap 104; 104'; 107; 107', together with another roller 102; 102'; 103; 103'; 106; 106' that is not involved in this gap 104; 104'; 107; 107', are mounted so as to be jointly adjustable in this manner.

Likewise, for example, independently of the above-described implementation of the coating device 100; 100" comprising individual application units 101; 101' with respective counter-pressure rollers 106; 106' or comprising combined application units 101; 101' with counter-pressure rollers 103'; 103 that are effective with respect to one another, in a particularly advantageous embodiment with respect to the optimal adjustability the metering gap 104; 104' between the first and second rollers 102; 102'; 103; 103' of the same application unit 101; 101' and/or the laminating gap 107; 107' between the second roller 103; 103' and the cooperating counter-pressure roller 106; 106'; 103'; 103, is designed so as to be adjustable, for example not just merely in a position-based or force-based manner but, based on a combined positioning drive 109; 109'; 111; 111' selectively, in particular within the above meaning, in a position-based manner, for example so as to be positionable in terms of the gap width, so as to be controllable by, for example, open loop control or so as to be controllable, for example, by closed loop control, that is, so as to be adjustable in, for example, one operating mode to a constant and/or defined relative position of the two rollers and/or a constant and/or defined gap width, or so as to be adjustable in, for example, another operating mode in a force-based manner, for example so as to be controllable by open-loop control in terms of the adjustment force via, for example, a pressure control valve or, for example, a controlled system comprising, for example, such a pressure control valve or, for example, so as to be controllable by closed-loop control via a controlled system comprising such a pressure control valve, that is, is designed so as to be settable in, for example, another operating mode toward a defined and/or constant compression force or line force, for example, so as to be controllable by open loop control with respect to a specified or desired adjustment force via, for example, a pressure control valve or, for example, via a controlled system comprising, for example, such a pressure control valve or, for example, so as to be controllable by closed loop control via, for example, a controlled system comprising such a pressure control valve. In particular, a roller 102; 102'; 103; 103'; 106; 106' that is involved in the relevant gap 104; 104'; 107; 107' is mounted in a combined positioning mechanism 112; 113; 112'; 113' so as to be selectively adjustable in a position-based or force-based manner and/or the relevant gap 104; 104'; 107; 107' can be selectively set within the above meaning to a constant and/or defined gap width or toward a constant and/or defined compression force or line force. Without limiting the above-described specific exemplary embodiments, here as well generally any of the two rollers 102; 102'; 103; 103'; 106; 106' involved in the relevant gap 104; 104'; 107; 107' can be adjustable in this manner by the corresponding combined positioning drive 109; 109'; 111; 111' and/or can be accordingly mounted at corresponding combined positioning mechanisms 112; 112'; 113; 113' within the above meaning. This also applies to embodiments in which a roller 102; 102'; 103; 103'; 106; 106' that is involved in the relevant gap 104; 104'; 107; 107', together with another roller 102; 102'; 103; 103'; 106; 106' that is not involved in this gap 104; 104'; 107; 107', are mounted so as to be jointly adjustable in this manner.

In an advantageous embodiment, the combined positioning drive 109; 109'; 111; 111' is formed by a force-based positioning drive 111; 111' comprising a positioning mechanism 113; 113'; 112; 112', in the adjustment path of which selectively a stop, which can be positioned, for example, by way of drive or positioning means, can be introduced for limiting the position.

For the adjustment, the first roller 102; 102' can be mounted so as to be adjustable in a direction having at least one movement component toward the respective assigned second roller 103; 103' and/or away therefrom by way of a bearing mechanism 113; 113'; 112; 112' and/or a, for example position-based or force-based or selectively position-based or force-based positioning drive 109; 109'; 111; 111'. In addition or instead, the counter-pressure roller 106; 106'; 103'; 103 can be mounted so as to be adjustable in a direction having at least one movement component toward the second or an interposed further roller 103; 103' and/or away therefrom by way of a bearing mechanism 113; 113'; 112; 112' and/or a, for example position-based or force-based or selectively position-based or force-based positioning drive 109; 109'; 111; 111'.

As an alternative, the first roller 103; 103', together with the assigned second roller 102; 102', can be mounted so as to be movable in pairs in a direction having at least one movement component toward the assigned counter-pressure roller 106; 106' and/or away therefrom by way of a shared bearing mechanism 112; 112'; 113; 113' and/or a shared, for example, position-based or force-based or selectively position-based or force-based positioning drive 109; 109'; 111; 111', and additionally the respective first roller 102; 102' can be mounted so as to be adjustable in a direction having at least one movement component toward the respective assigned second roller 103; 103' and/or away therefrom by way of a bearing mechanism 113; 113'; 112; 112' and/or a, for example, position-based or force-based or selectively position-based or force-based positioning drive 109; 109'; 111; 111'.

For all above-described embodiments, variants, configurations, specific embodiments or designs, the first roller 102; 102' and the second roller 103; 103' forming the first gap 104; 104' therewith can be driven or are driven mechanically independently of one another during normal operation in opposite directions and at differing circumferential speeds and/or by differing drive motors, in particular at least speed-controllable, by closed-loop or open-loop control, servo motors.

In the process, the first roller 102; 102' is operated at a lower speed, wherein the first roller 102; 102', in particular the metering roller 102; 102', and the assigned second roller 103; 103', in particular the laminating roller 103; 103', during normal operation, can be operated or are operated, for example, at a ratio V102(102'):V103(103') of the circumferential speed of the first to the second roller 102, 102'; 103; 103' which is in a range of 1:5 to 3:5, in particular 1:4.

During normal operation, the rollers 103; 106; 103'; 106' forming the second gap 107; 107' with one another are preferably drivable or driven mechanically independently of one another at the same circumferential speed by a shared drive motor, in particular servo motor, or preferably by differing drive motors, in particular servo motors.

In an advantageous embodiment, the drive motors that are mechanically independent of one another can be operated via an electronic, in particular virtual master axis by a drive controller.

Of particular advantage is a refinement in which the first roller 102; 102', in the region of the outer cylindrical surface thereof contributing to the film formation, has a stronger material-repellent surface with respect to the powder mixture and/or a less strongly adhesively acting outer cylindrical surface than the second roller 103; 103' in the region of the outer cylindrical surface contributing to the film formation.

At least the second roller 102; 102'; 103; 103' can have a polished and/or chrome-plated or ceramic-coated surface, at least in the region of the outer cylindrical surface contributing to the film formation. The first roller 102; 102' can have a structured or material-repellent surface, at least in the region of the outer cylindrical surface contributing to the film formation.

For all above-described embodiments, variants, configurations, specific embodiments or designs, the first and/or the second rollers 102; 102'; 103; 103' can be temperature-controlled, in particular heated, preferably in such a way that the outer cylindrical surface thereof can be heated, for example at an ambient temperature of 25° C., to at least 80° C., advantageously to at least 100° C., preferably to at least 120° C.

Instead or preferably in addition, the roller 106; 106' of the first group of exemplary embodiments which is only effective as a counter-pressure roller 106; 106'; 103' 103 is temperature-controllable, in particular heatable, preferably in such a way that the outer cylindrical surface thereof can be heated, for example at an ambient temperature of 25° C., to at least 80° C., advantageously to at least 100° C., preferably to at least 120° C.

For all above-described embodiments, variants, configurations, specific embodiments or designs, in an advantageous embodiment the two application units 101; 101' can be mounted together with one or more substrate guide elements 121, which may be arranged directly upstream, downstream or therebetween, in a shared frame, for example, two end-face side walls of the same frame. In this way, a compact and/or inherently rigid and/or defined arrangement of the application units 101; 101' can be provided in a laminating subassembly 100; 100\* designed as a unit 100; 100\*, for example laminating unit 100: 100\*.

If, for example, a calendering unit 600; 600\*, which is described below, for example, and also referred to as a calender 600; 600\*, is provided in the substrate path, for example directly, downstream from the laminating unit 100; 100\*, in an advantageous refinement rollers 601; 601'; 602; 602\* comprised by the calendering unit 600; 600\* can likewise be mounted in this frame 603 or, in an advantageous variant, for example, as a separate unit 600; 600\*, for example calendering subassembly 600; 600\*, in side walls of a dedicated frame 603 that is arranged directly on and/or above the frame 128 carrying the application units 101; 101'.

Figure 15:
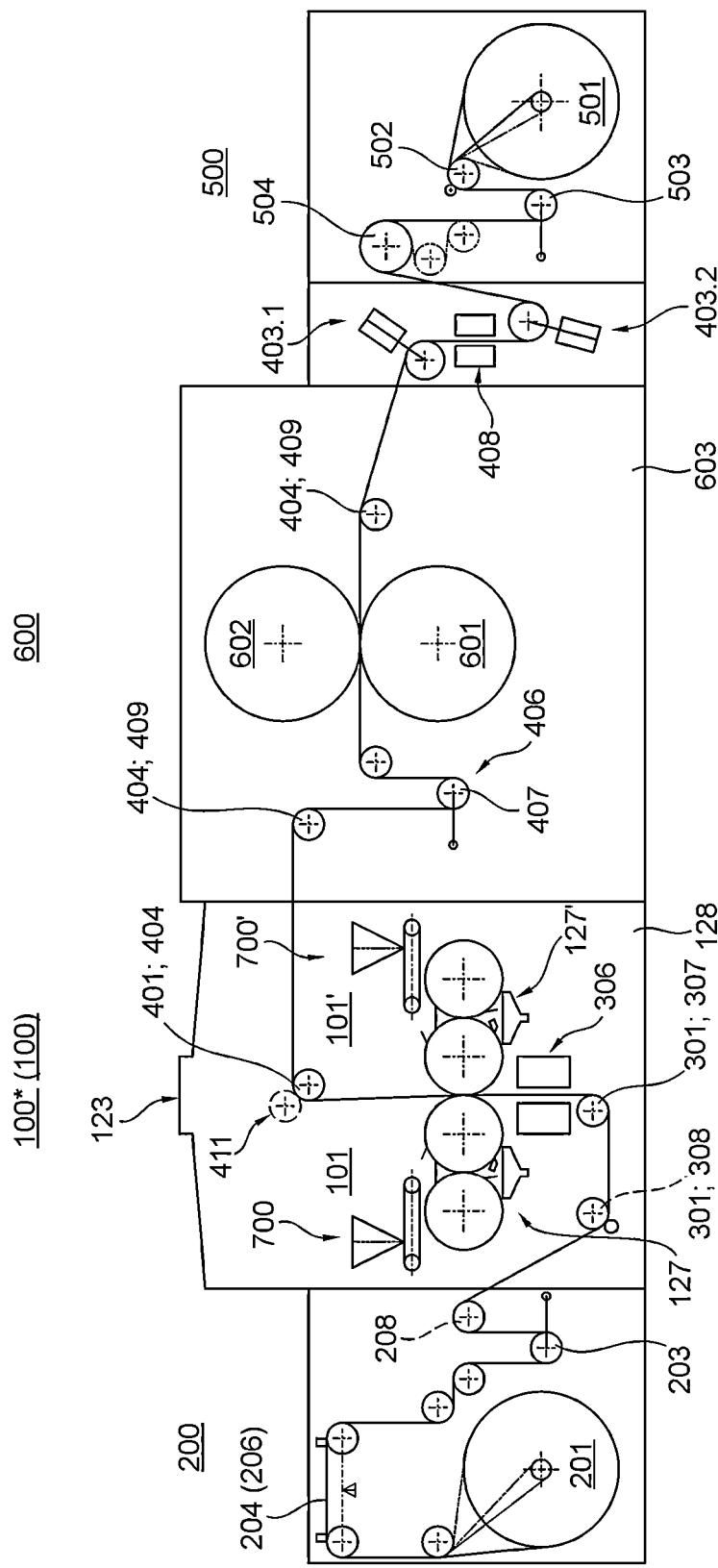
FIG. 15 another exemplary embodiment of a machine for producing a multi-layer product including a dry film that is applied to a carrier substrate with an application stage according to one embodiment of the second group of exemplary embodiments.
Figure 16:
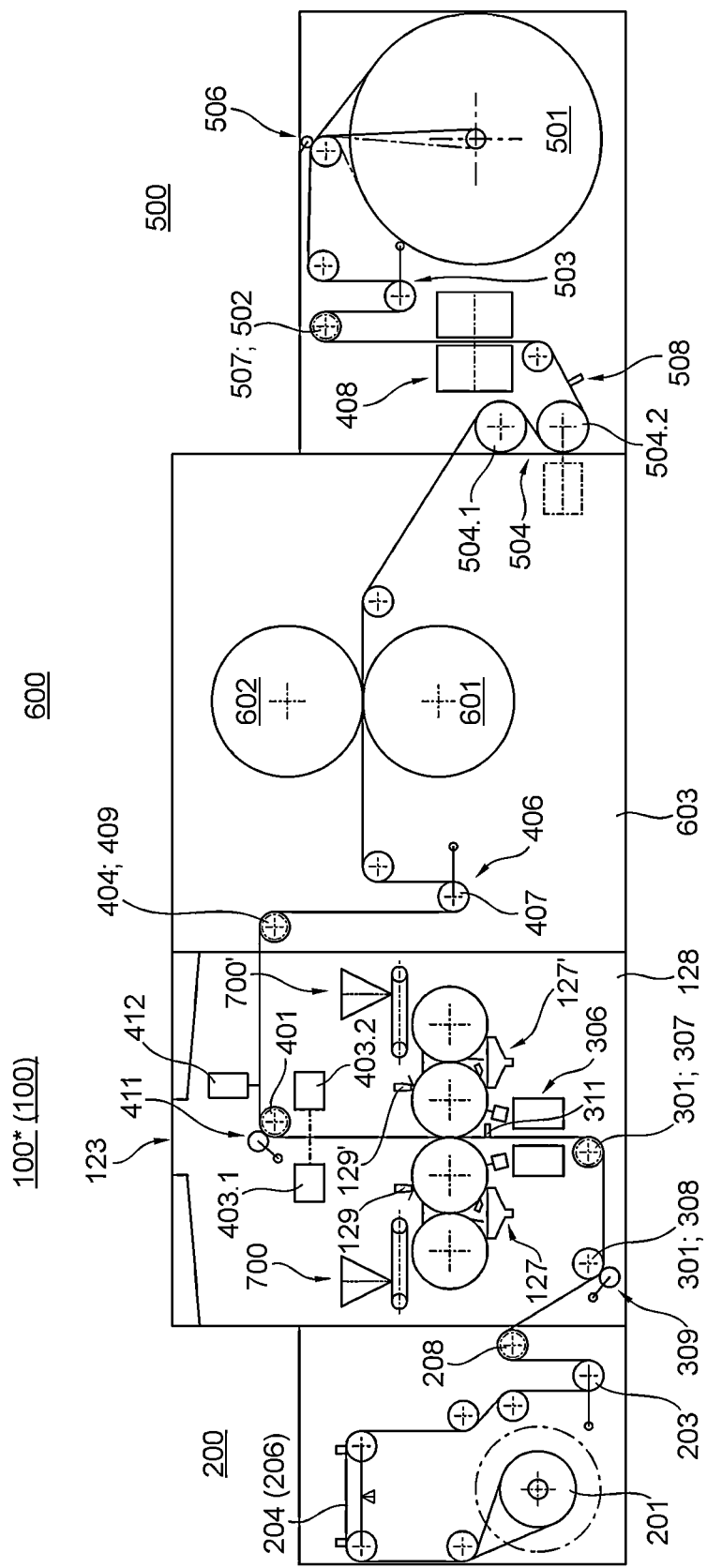
FIG. 16 another exemplary embodiment of a machine for producing a multi-layer product including a dry film that is applied to a carrier substrate with an application stage according to one embodiment of the second group of exemplary embodiments.

In an embodiment of the machine shown, for example, in FIG. 15 and FIG. 16, which may have a slightly longer design, in which, however, the risk of transmitting vibrations between the units 100; 100\*; 600; 600\*, in particular at least the laminating subassembly 100; 100\* and the calendering subassembly 600; 600\*, for example, is decreased, the laminating subassembly 100; 100\* and the calendering unit 600 provided there are provided horizontally next to one another, preferably even in dedicated frames 128; 603, which, for example, are separated from one another in terms of vibration. In a variant of FIG. 15 and/or FIG. 16, which is not shown, the calendering unit 600; 600\* can also be dispensed with.

For all above-described embodiments, variants, configurations, specific embodiments or designs, the positioning drive 109; 109'; 111; 111' and/or the bearing mechanism 112; 112'; 113; 113' comprised thereby at least of the rollers 103; 103'; 106; 106' forming the second gap 107; 107' are preferably designed to form, during normal operation, a gap width b107 of at least 15 μm, advantageously of at least 30 μm, in particular of at least 50 μm, at the narrowest point and/or, in particular at least within boundaries defining the maximum adjustment path, to form a gap width arising between the two rollers 103; 106; 103'; 106' via a product strand 002; 002' to be formed and/or a compression force or line force caused by at least one positioning mechanism 112; 112' and/or at least one positioning drive 109; 109', and/or to set and/or apply, in the second gap 107; 107' at least in the region of the width contributing to the film formation, a line force of, for example, at least 500 N/mm, advantageously at least 700 N/mm, preferably a line force between 500 N/mm and 3000 N/mm, between the rollers 103; 103'; 106; 106' forming the second gap 107; 107', and/or to enable keeping a desired line force constant, even if the dry film thickness fluctuates, by repositioning at least one of the two rollers 103; 106; 103'; 106', for example automatically or in a controlled manner. In contrast to a repositioning that is controlled via a control loop, automatic repositioning is, for example, a repositioning that occurs by the drive means itself and without readjustment via an additional control loop.

For all above-described embodiments, variants, configurations, specific embodiments or designs, in a particularly advantageous refinement an extraction unit 123; 123', by which potentially leaking gases or developing fumes can be extracted, is provided above the respective application unit 101; 101' or the application units 101; 101'.

The rollers 102; 102'; 103; 103'; 106; 106' of the above-described application units 101; 101' are preferably designed with a width in the range of 400 mm to 800 mm, in particular of 500 mm to 700 mm which can be used for firm formation and/or for application.

Even though, generally, an arbitrarily designed device for feeding powdered material 700; 700' can be provided, by which powder mixture 004 can be fed to the application unit 101; 101' into the first gap 104; 104' formed between the first and second rollers, particularly preferably a feed unit 700; 700' is provided by which a defined and/or controllable stream of powder mixture 004 can be fed evenly across the entire dispensing width to the gap 104; 104' directly or via an insertion aid 711 that is provided above the roller gap 104; 104', for example in the form of a funnel-shaped pan 711. In this regard, particularly advantageous embodiments or variant embodiments for the device for feeding powdered material 700; 700' are set out hereafter in various respects, which can be provided alone or advantageously in conjunction with any embodiment or design of the described application units 101; 101' and/or coating devices 100; 100\* and/or machine configurations. The devices for feeding powdered material 700; 700' shown in the figures with respect to the designs of the application units 101; 101' and/or coating devices 100; 100\* and/or machine configurations can merely be schematically understood and be formed by one of the following embodiments.

In a preferred embodiment, the device for feeding the powdered material 700; 700' can comprise a dispensing device 701 which controls and/or defines the amount to be dispensed, which, for example, is designed in the form of a metering device 701 or at least comprises a metering unit 704; 721. A dispensing device 701 designed as a metering device 701 or comprising a metering unit 704; 721 can generally be arbitrarily designed in a wide variety of ways so as to be able to dispense a controlled stream of material 004; 004' in the above-described manner. In a preferred embodiment, the stream of powdered material 004; 004' can be dispensed by means of the dispensing device 701 to a conveying device 702 following downstream, for example a linear conveyor 702 that is preferably designed as a conveyor belt 702. Using this conveying device 702, the powdered material 004; 004' can be conveyed downstream, for example on a conveying width extending transversely to the conveying direction T$_P$, in the form of bulk powder or a powder layer and can, on the output side, be fed directly to the nip 104; 104' or the possibly provided insertion aid 711, preferably directly or possibly indirectly, for example via one or more further conveying devices, over a feed width extending transversely to the conveying direction T$_P$. The conveying device 702, in particular a roller 705 around which the conveyor belt 702 is wrapped, for example a diverting roller 705, in particular a drive roller 705, can preferably be varied in terms of the conveying speed and, for example, be driven by a drive means 712 that can be varied in terms of the speed, for example a drive motor 712, in particular a servo motor 712. So as to promote the transport, the surface of a conveying device 702 designed as a conveyor belt 702 can preferably be rough and/or can have a downwardly sloping inclination in the conveying direction T$_P$. The feed width here corresponds exactly or at least approximately, that is, with a maximum deviation of, for example, ±10%, to a supply width of a filling and/or supply chamber 123 which is delimited on both sides in terms of the width and receives the material 004; 004' in the roller gap 104; 104' directly or in an insertion aid possibly provided thereabove.

In a particularly advantageous embodiment, for example with respect to a defined and/or more uniform infeed into the conveyor line of the powder feed device 700; 700', the powder feed device 700; 700' comprises a dispensing device 701; 701', which is designed in the form of a metering device 701; 701' and which comprises a linear conveyor 704 as a metering unit 704, relating in particular to the conveying speed, which is preferably designed as a vibrating conveyor 704, which is or can in particular be operated electromagnetically, and by which powdered material 004; 004' can be dispensed in a metered fashion to a conveying device 702 that follows downstream, for example a linear conveyor 702, in particular a conveyor belt 702 following downstream. The dispensing or transfer onto the conveyor belt 702 is not just carried out in a localized manner at a narrowly delimited spot, but in sections or continuously across a dispensing width that, at least in the operating position, for example, preferably corresponds exactly or at least approximately, that is, with a maximum deviation of, for example, ±10%, to the feed width that is ultimately relevant for the infeed into the nip 104; 104'. Preferably, for example for the adaptation to different product formats or for correction purposes, the dispensing width for the dispensing of the material 004; 004' by the metering device 701 or the transfer onto the conveyor belt 704, viewed transversely to the conveying direction T$_P$, can be set, for example manually or advantageously remotely controlled by drive means, in the width and/or the lateral position. In addition, lateral boundaries 717, for example side guides 717, are provided, for example on the vibrating table 706, which can, for example, be displaced transversely to the conveying direction T$_P$ manually or, in a more automated configuration, remotely controlled by drive means. As a result, no significant change to the width of the stream is required on the downstream conveying device 702, which otherwise could possibly have an interfering influence on the height profile extending in width.

In an advantageous refinement, a conveying width on the conveyor belt can, for example also for the above-described reasons, be settable in the width and/or lateral position. For this purpose, lateral boundaries 716, for example side guides 716, which can be displaced transversely to the conveying direction T$_P$, for example manually or, in a more automated configuration, remotely controlled by drive means, are provided, which can be varied in terms of the lateral position by way of a corresponding mechanism, for example a respective threaded spindle or threaded spindle sections. The dispensing width, at least in the operating position, for example preferably corresponds exactly or at least approximately, that is, with a maximum deviation of, for example, ±5%, to the feed width that is ultimately relevant and desired for the infeed into the nip 104; 104'. The dispensing and conveying widths can be adjustable in the width mechanically independently of one another, mechanically coupled with one another or coupled in terms of control.

The stream of powder of the dispensing device 701 designed or effective as a metering unit 701 or of the at least one metering unit 704; 721 can preferably be finely adjusted in such a way that a constant and/or controllable, in particular with an accuracy in the dispensed amount having a deviation of no more than 3%, in particular no more than 2% from the target dispensed amount, stream of powder mixture 004 can be dispensed to a or the subsequent downstream conveying device 702, which can in particular be operated at a constant and/or controlled speed, in particular to the conveyor belt 702, in the relevant range for the specific dispensing rate, that is, the dispensing rate based on the width.

Figure 17:
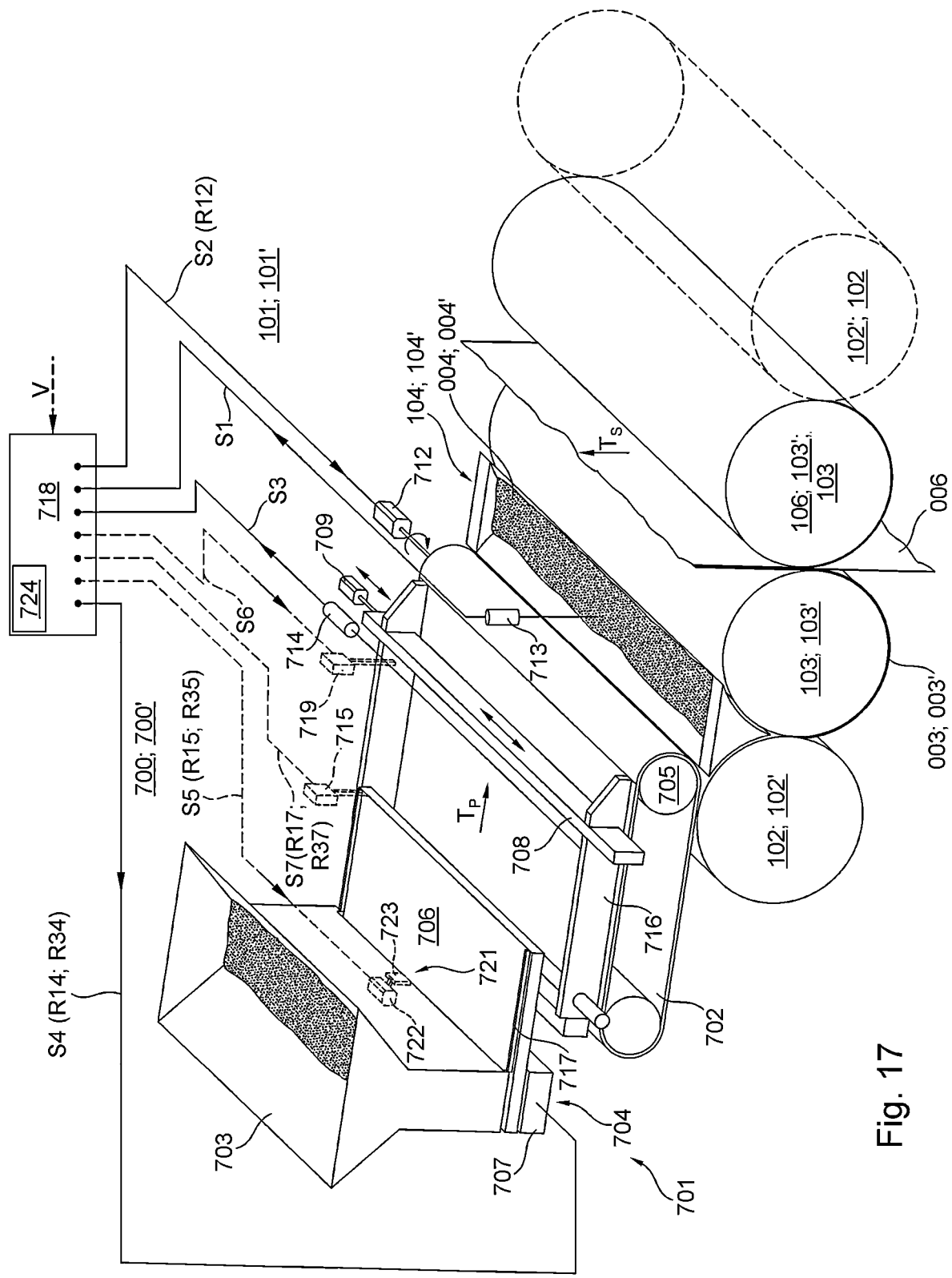
FIG. 17 a schematically represented application unit with a first embodiment of a device for feeding powdered material into the roller gap.

In a particularly advantageous embodiment, which, for example, is apparent in FIG. 17, for example with respect to a defined and/or more even transport in at least a first part of the conveyor line of the powder feed device 700; 700', an above-described, preferably electromagnetic, linear conveyor 704, which in particular is designed as a vibrating conveyor 704, is provided as a first or only metering unit 704. This conveyor, in the width extending in the axial direction of the rollers 102, 103; 102'; 103', extends, for example, across a dispensing width that, for example, preferably exactly or at least approximately, that is, for example, with a maximum deviation of ±5%, corresponds to the feed width that is ultimately relevant and desired for the infeed into the nip 104; 104'. The dispensing width is preferably settable. An outlet, extending in sections or continuously across an outlet width, of a provision device 703, for example of a supply line 703 or, as shown, for example, in FIG. 17, of a supply reservoir 703 via which powdered material can be dispensed to the linear conveyor 704, ends above this vibrating conveyor 704. A provision device 703 designed as a supply reservoir 703 can, for example, be formed, for example in at least the lower part, as a reservoir tapering in a funnel-shaped manner, for example, in the form of a supply hopper 703, and can be fillable, for example, manually or via a system of lines. It can advantageously comprise a fluidizing device, such as a device for blowing in a gaseous medium, in particular air. In the shown and advantageous embodiment, the metering unit 701 comprises the vibrating conveyor 704 as well as a provision device 703, which keeps material 004; 004' available at least to a certain extent, and can form a unit that here, for example, is also referred to as a metering unit comprising a vibratory drive 701, or a metering jogger 701 for short, and that, for example, represents an assembly and can be referred to as such, which can be filled from a reservoir, for example manually or via a feed line.

The vibrating conveyor 704 comprises, for example, a vibrating table 706 and a drive means 707 driving the same, in particular a vibratory or jogging drive 707 driving the same, which is in particular electromagnetically excited, wherein the terms vibratory or jogging drive 707 here shall be understood to be synonymous with one another and to mean a drive device 707 driving a jogging or vibrating device. Preferably, the vibrating frequency and/or vibrating amplitude of the vibratory or jogging drive 707 or a control unit controlling this vibrating drive 707 can be varied and/or the vibrating table 706 can be set manually or by means of a drive means 715, for example positioning drive 715, with respect to the descending gradient thereof, viewed in the conveying direction $T_P$.

In addition to the above-described metering unit 704 formed by a vibrating conveyor 704, a metering unit 721 which varies the dispensed stream at the outlet, and thus the stream transferred onto the conveying device 702, can be provided in a, for example, with respect to a particularly well-definable feed stream, and/or, for example, for premetering. Such a metering unit can be provided, for example, by a positioning mechanism 721, which is only schematically depicted in FIG. 17, by way of which, for example, a distance between the outlet and the upper side of the linear conveyor 704 can be varied by means of assigned drive means 722, for example, by way of one or more servo motors 722; 722.x, in conjunction with a metering unit 721 relating to the transfer level onto the conveying device 702, and/or, for example, a free flow cross-section out of or into the provision device 703 can be varied in conjunction with a metering unit 721 relating to the dispensed stream at the outlet.

A controllable positioning mechanism 721, which varies the outlet cross-section by way of one or more assigned drive means 722; 722.x, for example one or more servo motors 722, can be assigned to or arranged upstream from the outlet of the provision device 703 as a metering unit 721 relating to the dispensed stream at the outlet. Such a positioning mechanism can comprise, as the positioner 723 which is only shown symbolically and by way of example in FIG. 17, a flap 723, which extends across the outlet width and is actuated by the drive means 722, or a slide 723, or by several positioners 723.x, which are arranged next to one another across the outlet width and adjustable independently of one another by several drive means 722.x, such as, for example, flap or slide segments 723.x (see, for example, by way of example in FIG. 18 and FIG. 19). If several positioners 723.x that can be adjusted by drive means 722.x are present, the flow cross-section or dispensed stream can be varied and/or individually corrected across the dispensing width.

One or more assigned drive means 722; 722.x, for example, one or more servo motors 722, which vary the distance between the outlet of the provision device 703 and the upper side of the linear conveyor 704, in particular raise or lower the provision device 703 or the part comprising the outlet, via a corresponding positioning mechanism 723, for example a gear, can be provided as a metering unit 721 that is provided in addition or instead and relates to the transfer level onto the conveying device 702.

Generally independently of the embodiment of the dispensing device 701 comprising a metering unit 704 designed as a vibrating conveyor 704 and independently of the presence and/or of the embodiment of an above-described further metering unit 721, preferably, however, in conjunction with a metering unit 704 designed as a vibrating conveyor 704 and/or, for example, at least one above-described further metering unit 721, in a particularly advantageous embodiment of the powder feed device 700; 700', for example with respect to a more even material stream, a removal device 708, which extends horizontally across at least the conveying width and the distance of which with respect to the upper side of the linear conveyor 704 can be set, is provided above the or a linear conveyor 702 that is arranged downstream from the dispensing device 701 in the conveying direction $T_P$ between the point at which the material is fed onto the linear conveyor 702 and a point at which it is transferred to the roller gap 104; 104' or the possibly provided insertion aid 711, or possibly to a further downstream conveying device.

Such a removal device 708 can be used to establish or implement a desired and uniform layer height of the material 004; 004' to be conveyed on the linear conveyor 702 or conveyor belt 702 across the conveying width, assuming parallelism exists between the underside of the removal device 708 and the upper side of the linear conveyor 704 on at least the effective length. If material 004; 004' is applied over the entire conveying width upstream from the removal device 708 in a thickness that at least corresponds to the distance between the Removal device 708 and the upper side of the linear conveyor 704, a material stream having a uniform layer thickness of the powdered material 004; 004' which is defined via the position of the removal device 708 is ensured downstream from the removal device 708.

In a particularly advantageous configuration, the removal device 708 is designed as a removal squeegee 708, which can preferably vibrate transversely to the conveying direction $T_P$ and which, during operation, for example, carries out an oscillating or vibrating back-and-forth movement. For this purpose, the removal squeegee 708 is mounted, for example, so as to be axially movable and driven in an oscillating or oscillatable manner by a drive means 709, for example a drive motor 709. This drive motor 709 can be designed directly as a linear motor or as a rotatory motor driving the removal squeegee 708 via an oscillating drive. In an advantageous refinement, the removal device 708 is settable in terms of the distance with respect to the conveying device 702 by a drive means 719, which, for example, is only schematically depicted in FIG. 17, for example a positioning drive 719, for example via a signal connection S6 in a remotely controlled manner.

In an alternative configuration, a roller rotatable or rotating counter to the conveying direction $T_P$ on the underside thereof, in particular a so-called roller squeegee, can be provided as the removal device 708. In a refinement, this roller can additionally be oscillatable in the above-described manner by way of corresponding drive means and a corresponding mount.

In a particularly advantageous embodiment of a powder feed device 700; 700', which can be applied, for example, to all embodiments, designs and variants of the powder feed device 700; 700' set out here, at least one sensor system comprising a preferably contactlessly operating sensor 713; 714 is provided, which, for example, supplies a piece of information about a vertical position of a powder layer surface and/or which, for example, is based on a contactless measuring principle, for example using sound waves or electromagnetic radiation, and/or which, together with an open-loop and/or closed-loop control device 724 connected via a signal connection S1; S3, in particular comprising a control logic or electronic control circuit comprised by the open-loop and/or closed-loop control device 724, and comprising a drive means 712; 722; 707 assigned to the or a metering or conveying device 702; 704; 721 for varying the dispensing or conveying rate, forms a control loop R11; R14; R15; R17; R34; R35; R37 via a respective signal connection S2; S4; S5; S7.

In a particularly advantageous embodiment that can be applied to all embodiments, designs and variants of the powder feed device 700; 700' set out here, a sensor system, in particular a fill level sensor system, is provided as a sensor system that supplies a piece of information about a height of a powder layer, which is provided with a sensor 713 supplying a piece of information about the fill level in the roller gap 104; 104' or in the insertion aid 711, a fill level sensor 713 for short, which, in particular from above, is directed into the wedge-shaped space of the roller gap 104; 104' or into the interior of an insertion aid 711 that may be provided above the roller gap 104; 104' onto the powder layer, in particular powder layer surface, and in this way provides a piece of information corresponding to a fill level in the roller gap 104; 104 or in the insertion aid 711, at at least the point being observed.

An advantageously provided control loop R11; R14; R15; R17 comprises an above-described fill level sensor system comprising the sensor 713 for detecting a piece of information representing a fill level of powdered material 004; 004' in the roller gap 104; 104 or in the insertion aid 711. In such a control loop R1; R1', the sensor 713 supplying the information about the fill level in the roller gap 104; 104' or in the insertion aid 711 is, for example, connected, in terms of signaling, to a control logic or circuit comprised by an above-described open-loop and/or closed-loop control device 724, which, in turn, has a signal connection S2; S4; S5; S7 to the control means of one or more drive means 712; 722; 715; 707 of one or more above-described conveying devices and/or metering units 702; 704; 721 for varying the conveying and/or dispensing and/or transfer rate of powdered material 004; 004'.

In an advantageous embodiment, in particular for phases of changing machine speeds, such as a starting phase, a control loop R12 relating to the conveying speed of the conveying device 702 is provided, for example, in which the fill level sensor system has a signal connection to a drive means 712 driving the conveying device 702, here, for example, the dispensing device 701 driving the conveyor belt 702, via the open-loop and/or closed-loop control device 724 or a control logic or circuit comprised thereby and accordingly configured for forming a control loop R12 relating to the conveying rate. The conveying speed is controlled by the relevant drive means 712 for this purpose, for example, based on the fill level, for example in the manner that the conveying speed is increased when a defined minimum threshold is fallen short of, and the conveying speed is decreased when a defined maximum threshold is exceeded.

Instead of the fill level-dependent variation or in addition thereto, a control correlating with a variable V representing the machine speed via a stored relationship can serve as the basis for driving the conveying device 702, by way of which the conveying device 702 is operated more quickly, for example, when the machine speed is increasing and is operated more slowly when the machine speed is decreasing. The above-described fill level-dependent regulation can serve as the basis for this control.

Instead of or in addition to an above-described control loop R12 relating to the conveying rate and/or the machine speed-dependent control of the conveying device 702, in an advantageous embodiment a control loop R15; R14; R17 relating to the dispensing device 701, in particular the dispensing rate of the dispensing device 701 onto the conveying device 702, can be provided, in which the fill level sensor system has a signal connection S4; S5; S7 to one or more of the drive means 722; 722.x; 707; 715 comprised by the dispensing device 701 for metering purposes via the open-loop and/or closed-loop control device 724 or an accordingly configured control logic or control circuit comprised thereby, for example, in a control loop R15 relating to the dispensing device 701, has a signal connection to drive means 722; 722.x of the positioning mechanism 721 arranged upstream of or assigned to the outlet and/or, in another control loop R14 relating to the dispensing device 701, has a signal connection to the vibratory drive 707 and/or, in another control loop R117 relating to the dispensing device 701, has a signal connection to the positioning drive 715 for the table slope. The described control loops R15; R14; R17 relating to the dispensing device 701 can be provided individually, in pairs or collectively, wherein, if several such control loops R15; R14; R17 are provided, preferably a cascading or prioritization of individual control algorithms is provided.

An underlying regulation of the dispensing device 701 for the fill level sensor system, in particular of the control loop R15; R14; R17 or of the control loops R15; R14; R17 relating to the dispensing rate of the dispensing device 701 onto the conveying device 702 by the relevant driving means 722; 722.x; 707; 715 for this purpose takes place, for example, based on the fill level, for example in the manner that the dispensing rate is increased when a defined minimum threshold for the fill level is fallen short of, and the dispensing rate is decreased when a defined maximum threshold is exceeded.

Instead of the fill level-dependent variation of the dispensing rate or preferably in addition thereto, a control correlating with a variable V representing the machine speed can serve as the basis for the metering by the metering unit 701, by which the metering unit 701 or one or more metering units 704; 721 comprised thereby, for example, increases the dispensing rate by the metering unit 701 or one or more metering devices comprised by the metering unit 701, for example when the machine speed is increasing, by appropriately activating one or more of the above-described drive means 722; 722.x; 707; 715 and lowers the dispensing rate when the machine speed is decreasing. This control can correlate with the above-described machine speed-dependent control of the conveying device 702 and/or can serve as a basis for the above-described fill level-dependent control of the dispensing device 701.

In a refinement of the embodiment comprising the removal device 708, the feed rate can additionally also be varied, for example pre-set, by varying the distance of the removal device 708 via an assigned drive means 719, manually or remotely controlled via a signal connection S6 or possibly a control loop (R16) which is not explicitly set out here.

Generally independently of, but advantageously in conjunction with an above-described fill level sensor system and/or one or more above-described control loops R12; R14; R15; R17 (R16) forming the basis for the fill level, in an advantageous embodiment, which in particular comprises a linear conveyor 702, for example, a sensor system supplying a piece of information about the vertical level of the powder layer surface on the conveying device 702, a layer level sensor system for short, is provided as an alternative or further sensor system supplying pieces of information about the vertical position of a powder layer surface. This sensor system comprises a sensor 714 that supplies a piece of information about the layer height or at least the level of the powder layer surface on the conveying device 702 and preferably operates contactlessly, for example a level sensor 714, which, for example, is directed, for example as an optical or ultrasonic sensor, from one side at the profile of the powder layer and supplies at least one piece of information about the vertical position of at least a highest elevation of the powder layer across the conveying width transversely to the conveying direction $T_P$. In the case of a stable vertical position of the conveying device 702 during normal operation here, the level of the powder layer surface denotes a resulting powder layer thickness.

In a simple case, the sensor 714, for example, only monitors when a certain level of a highest elevation is exceeded or fallen short of, and the result is used for control purposes, for example. The process of simply monitoring a certain height for when it is exceeded or fallen short of can be implemented, for example, by a single-beam photoelectric sensor or a linearly operating ultrasonic sensor. In a more complex embodiment, which, however, results in more extensive information, it is also possible for the sensor system to provide a piece of information about the vertical position of a highest elevation that is currently present across the conveying width, at least in a certain range. For example, a sensor system extending in the vertical direction over a certain height, such as a light barrier or an ultrasonic sensor with vertical resolution, can be used.

Generally independently of, but advantageously in conjunction with one or more above-described control loops R12; R15; R14 or R17 forming the basis for the fill level and/or an above-described speed-dependent control, a control loop R35; R34; R37, which comprises an above-described layer level sensor system comprising an above-described layer level sensor 714, is provided in an advantageous embodiment of a device comprising the removal device 708. This is connected, in terms of signaling, in such a control loop R35; R34; R37 to a control logic or control circuit comprised by an above-described open-loop and/or closed-loop control device 724 which, in turn, has a signal connection to the control means of one or more drive means 707; 722; 715 of one or more above-described metering units 704; 721 for varying the dispensing rate of the metering device 701. A control of the metering device 701 with respect to the dispensing rate or of a metering unit 704; 721 comprised thereby by the relevant drive means 707; 722; 715 is carried out, for example, based on the level, that is, as a function of the information supplied by the layer level sensor system, for example in the manner that the dispensing rate dispensed by the dispensing device 701 or transferred onto the conveying device 702 is increased when a defined minimum threshold for the level of the surface or a target value is fallen short of, for example by more than a permissible tolerance, and the dispensing rate is decreased when a defined maximum threshold or the target value is exceeded, for example by more than a permissible tolerance, by way of at least one control loop R35; R34; R37 comprising the layer level sensor 714.

Instead of or in addition to an above-described control loop R12 relating to the conveying rate and/or the machine speed-dependent control of the conveying device 702 and/or a control loop R15; R14; R17 relating to the dispensing device 701, in particular the dispensing rate of the dispensing device 701 onto the conveying device 702 based on the fill level, in an advantageous embodiment a control loop R35; R34; R37 relating to the dispensing device 701, in particular the dispensing rate of the dispensing device 701 onto the conveying device 702 based on the layer level, can be provided, in which the layer level sensor system has a signal connection to one or more drive means 722; 722.x; 707; 715 comprised by the dispensing device 701 for metering purposes by way of the open-loop and/or closed-loop control device 724 or a control logic or control circuit comprised thereby and accordingly configured, for example in a control loop R35 relating to the dispensing device 701 has a signal connection to a drive means 722; 722.x of the positioning mechanism 721 arranged upstream of or assigned to the outlet and/or in another control loop R34 relating to the dispensing device 701 has a signal connection to the vibratory drive 707 and/or in another control loop R37 relating to the dispensing device 701 has a signal connection to the positioning drive 715 for the table slope. The described control loops R35; R34; R37 relating to the dispensing device 701 can be provided individually, in pairs or collectively, wherein, if several such control loops R35; R34; R37 are provided, preferably a cascading or prioritization of individual control algorithms is provided.

A powder feed device 700; 700' comprising a metering device 701, in particular a metering device 701 comprising a metering unit with a vibratory drive 702, and a downstream conveying device 702, in particular a linear conveyor 702, is advantageously operated as follows.

The dispensing device 701, which is in particular designed as a metering device 701, is initially and during operation filled as needed with powdered material 004; 004' to be processed, and the material is dispensed from the metering device 701 in a metered fashion to the conveying device 702, in particular by jogging. In a particularly advantageous refinement, using an above-described removal device 708, slightly more, for example up to 10%, preferably only up to 5% more material 004; 004' is dispensed to the conveying device 702 than is in fact removed, which is then removed or held back to a certain, in particular settable height, by way of the preferably oscillating removal device for providing a uniform material layer. The dispensing rate of the dispensing device 701 to the conveying device 702 can be controlled, for example, by way of an above-described control loop R35; R34; R37 comprising the level sensor 14 at the conveying device 702, for example in such a way that the detected level always corresponds at least to the set distance in relation to the conveying device 702, advantageously even exceeds it.

The powdered material 004; 004' conveyed on the conveying device 702 and preferably guided through beneath the removal device 708 in the above-described manner is conveyed by the conveying device 702 into the gap 104; 104' or an insertion aid 711 possibly provided thereabove directly or possibly via a further conveying device.

In an advantageous embodiment, the conveying device 702 and possibly a following further conveying device can be controlled in the above-described manner by way of an above-described control loop R12 comprising a fill level sensor 713, which monitors the fill level in the gap 104; 104' or in the insertion aid 711.

In an advantageous refinement, the dispensing width of the dispensing device 701 and/or the conveying width of the conveying device 702 is set manually or preferably remotely controlled via corresponding drive means for a format change in the product 001; 002 to be produced.

So as to vary a maximum material supply, for example, beyond a metering by the dispensing device 701 or as an alternative thereto, the distance between the removal device 708 and the conveying device 702 can be varied in an advantageous embodiment.

Figure 18:
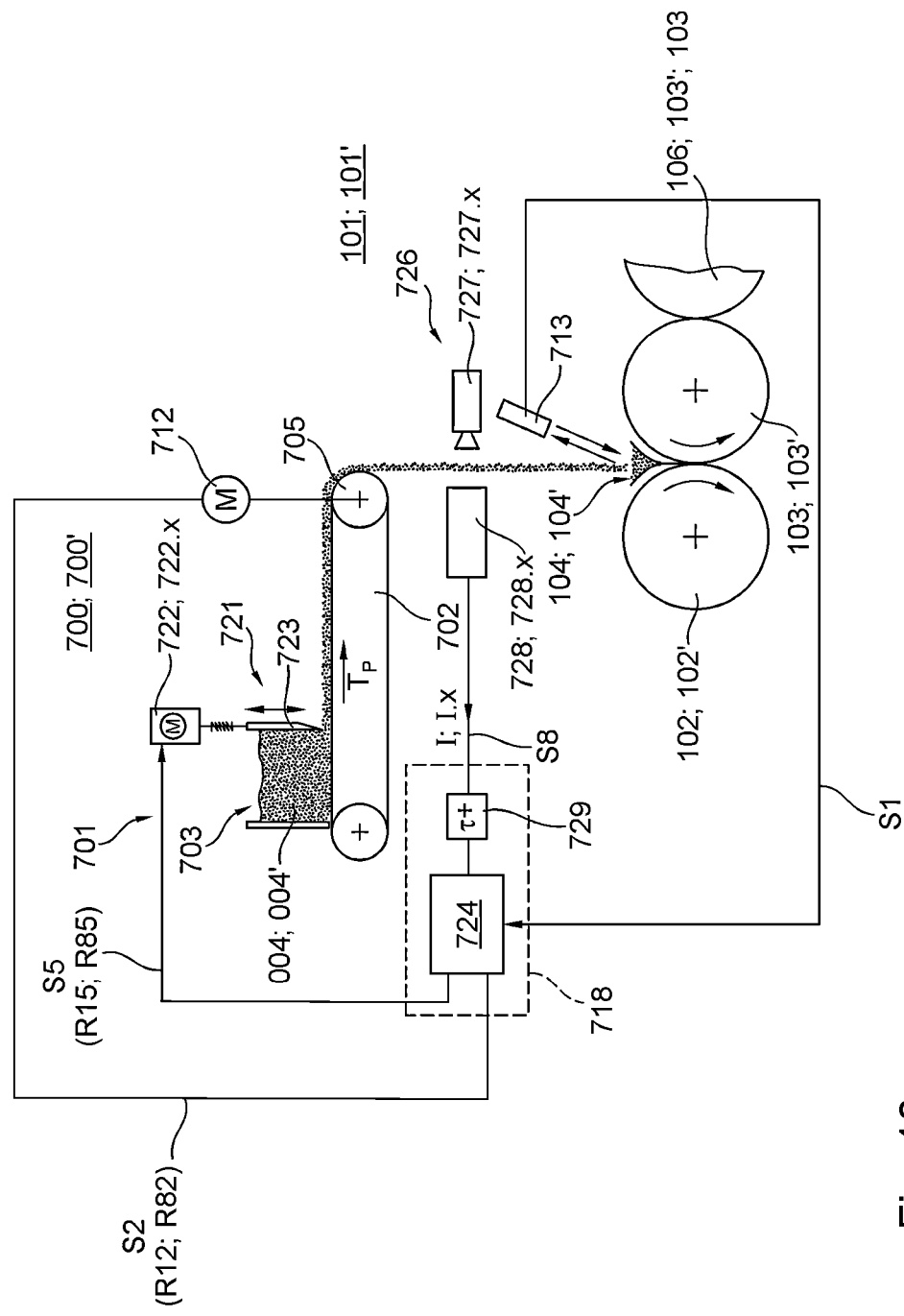
FIG. 18 a schematically represented application unit comprising a sensor system provided in the drop path in a first embodiment.
Figure 19:
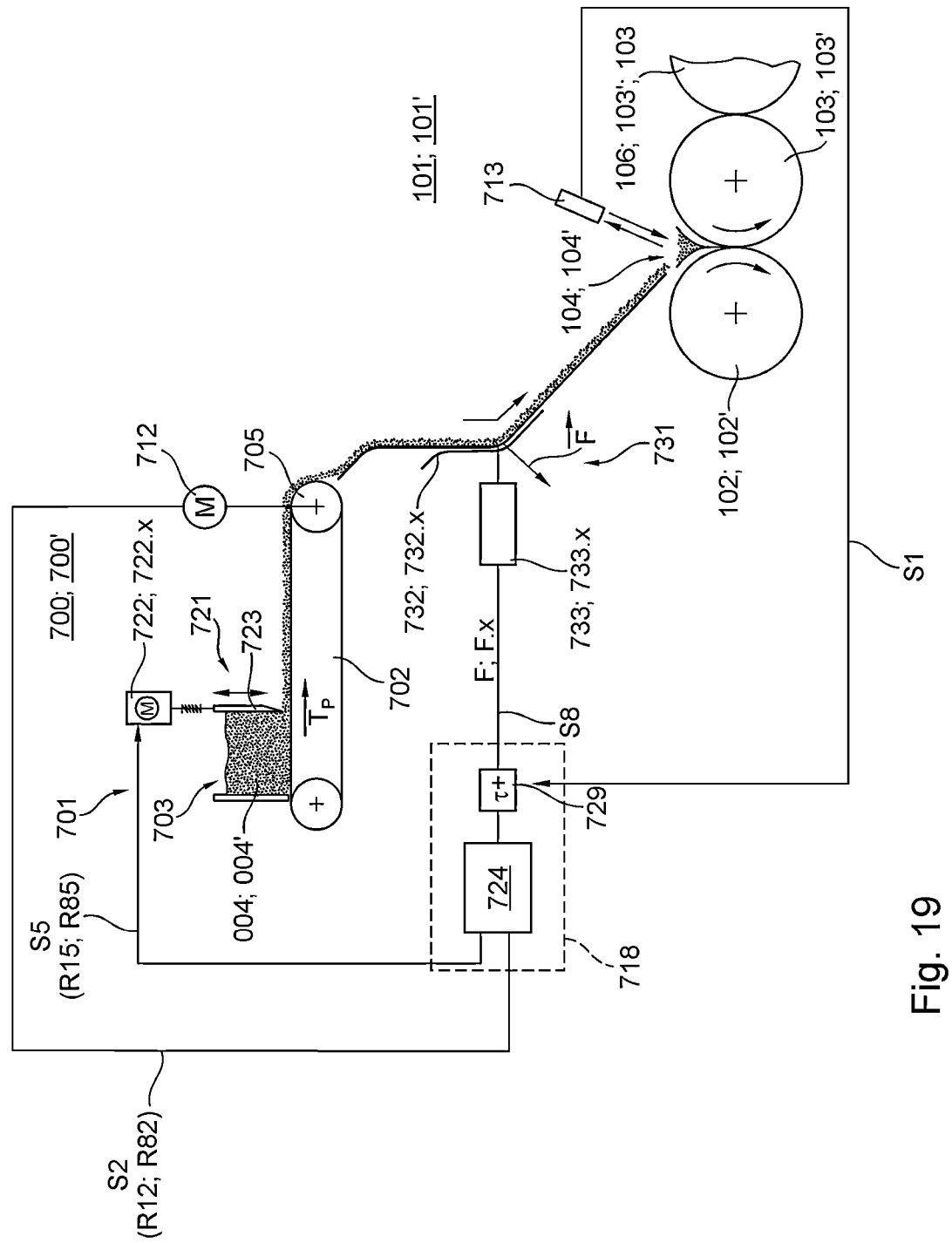
FIG. 19 a schematically represented application unit comprising a sensor system provided in the drop path in a second embodiment.

For the above-described embodiments and variant embodiments of the powder feed device 700 (for example, in conjunction with FIG. 17) as well as in particular also for embodiments and variant embodiments deviating therefrom, which are set out, for example, in conjunction with FIG. 18 and FIG. 19, for the implementation of the dispensing or metering device 701, generally independently of the above-described sensor systems, sensors 713; 714 or control loops R12; R14; R15; R17; R34; R35; R37, but advantageously in conjunction with one or more of the above-described sensor systems, sensors 713; 714 or control loops R12; R14; R15; R17; R34; R35; R37, a sensor system 726; 731, for example powder stream sensor system 726; 731, comprising, for example, a sensor 728; 733 by which a piece of information about the powder stream, in particular about the magnitude and/or homogeneity, can be made available, is provided which, at at least one point or preferably over the entire width, in particular drop width is directed continuously or at multiple points in a localized manner or in sections at a stream of powder that emerges from the powder feed device 700 and is fed into the roller gap 104; 104' or into the insertion aid 711 possibly arranged thereabove, in particular in a drop section between the or a last conveying device 702 comprised by the powder feed device 700; 700' and the roller gap 104; 104" or a possibly provided insertion aid 711. Such a sensor system 726; 731 or information obtained therefrom can, in a first specific embodiment, supply a variable I; F obtained integrally, that is, in sum over the considered width, for example the entire width or continuous width over a section or width that is interrupted in sections, in particular the drop width of the powder stream, for example measured variable I; F or can, in a second specific embodiment, preferably supply individual values of such a variable I.x; F.x which are spatially resolved in terms of the width.

In a first specific embodiment, a piece of information about the powder stream in the considered region can be obtained via an integral value of the variable I; F, which in the case that the detection does not occur across the entire width can be used, as a first approximation, as a measure for the entire stream. In this way, it is possible for a powder stream, for example, to be guided, for example be kept at a constant level, in a control loop R82; R85, which is explained below, for example, or, for example when, for example, empirically ascertained relationships between the ascertained variable I; F and the magnitude of the throughput are present, the stream of powder can be controlled by open loop or closed loop control in terms of the throughput thereof.

In an advantageous embodiment of this first specific embodiment, a control loop R82; R85 is provided, which comprises an above-described integral powder stream sensor system 726; 731 comprising an above-described sensor 728; 733. The same is connected in such a control loop R82; R85 via a signal connection S8 to a control logic or control circuit comprised by an above-described open-loop and/or closed-loop control device 724, which, in turn, is connected via a signal connection S2; S5; S7 to the control means of one or more drive means 712; 707; 722; 715 of one or more above-described conveying devices or metering units 704; 721 for varying the conveying rate of the conveying device and/or the dispensing rate of the metering device 701. The relevant control logic or control circuit has a signal connection S2; S5, for example, in a control loop R82 relating to the conveying rate via to the drive means 712 driving the conveying device 702 and/or in a control loop R85 relating to the dispensing device 701 to a drive means 722; 722.x of the positioning mechanism 721 arranged upstream from or assigned to the outlet. For a variant embodiment comprising a dispensing device comprising an above-described vibrating conveyor 704, a control logic or control circuit of the open-loop and/or closed-loop control device 724, which is connected, in terms of signaling, to a sensor 728; 733 of the powder stream sensor system 726; 731, can be connected to the vibratory drive 707 in another control loop (not shown) relating to the dispensing device 701 and/or can be connected to the positioning drive 715 for the table slope in a further control loop (not shown) relating to the dispensing device 701. The described control loops R82; R85 relating to the dispensing device 701 and/or the conveying device 702 can be provided individually, as several or collectively, wherein, if several such control loops R82; R85 are provided, preferably a cascading or prioritization of individual control algorithms is provided.

In a second specific embodiment comprising a sensor system 726; 731 which is provided at multiple points in a localized manner or in sections, respective pieces of information about the powder stream in the relevant section or at the relevant measurement site can be obtained across the width by individual, spatially resolved values of an above-described variable I.x; P.x for each individual section or measurement site, which each represent a measure of the powder stream in the relevant section or at the relevant measurement site. In this way, it is likewise possible for a total powder stream to be guided, for example to be kept at a constant level, in a control loop R82; R85, which, for example, is explained above, for example after the sum or mean value has been determined, or, for example when, for example, empirically ascertained relationships between the ascertained variable I; F and the magnitude of the throughput are present, the powder stream can be controlled by open loop or closed loop control in terms of the throughput thereof. Instead of or in addition to this integral assessment and a control based thereon, however, a powder stream can be controlled by open loop or closed loop control for several or all sections or measurement sites in respective control loops R82; R85, at least relative to partial powder streams in other sections or at other measurement sites or, for example, when empirically ascertained relationships between the ascertained variable I.x; F.x and the magnitude of the throughput are present, the relevant powder stream, in particular partial powder stream, can be controlled by open loop or closed loop control in terms of the throughput.

In an advantageous embodiment of this second specific embodiment, a respective control loop R82; R85 is provided for several or all sections or measurement sites with a dedicated, above-described sensor 728.x; 733.x. This sensor 728.x; 733.x is connected, in terms of signaling, in such a control loop R82; R85 to a control logic or control circuit comprised by an above-described open-loop and/or closed-loop control device 724, which, in turn, has a signal connection to control means of several drive means 722.x of a metering unit 721 that can be adjusted in the width in sections or segments so as to vary the dispensing rate from the metering device 701 in sections. Sections or measurement sites comprising dedicated sensors 728.x; 733.x correspond to sections or segments, in particular positioner segments 723.x, of a metering unit 721 that can be adjusted in sections, for example with above-described positioner segments 723.x driven by drive means 722.x, for example flap or slide segments 723.x. A control of the individual positioners 723.x or positioner segments 723.x is carried out in such a way, for example, that an equally large powder stream, for example, is detected by the sensor system 726; 731 in all considered sections. If needed, the control can also be directed at a desired profile, that is, with powder stream in the considered sections which differ across the width.

In an advantageous embodiment (see, for example, FIG. 18 and FIG. 19), the powder feed device 700; 700', as was already set out, for example, above with respect to FIG. 17, comprises a conveying device 702, by which powdered material 004; 004' is conveyed over a conveying width and from there is fed to a roller gap 104; 104 located thereabeneath or a possibly provided insertion aid 711. The feeding itself in particular occurs by the powder stream dropping over a drop path, after the end of the or a last conveying device 702 has been reached, into the roller gap 104; 104' or the insertion aid 711.

In a particularly advantageous embodiment of a powder feed device 700; 700' in one of the embodiments or variants set out above or set out below, the above-described powder stream sensor system 726; 731 is provided in the region of the drop path between the only or downstream last conveying device 701 of the powder feed device 700; 700' and the roller gap 104; 104' or the possibly provided insertion aid 711.

Such a powder stream sensor system 726; 731 is shown, for example, in conjunction with an advantageous embodiment of the dispensing device 701 according to FIG. 18 and FIG. 19, wherein the same reference numerals as those used before in FIG. 17 are used for functionally comparable or identical parts. In contrast to the specific embodiment shown based on FIG. 17, the dispensing device 701 here is shown without a vibrating conveyor 704, but instead with a metering unit 721, which is only schematically depicted in FIG. 17, for example, and relates to the dispensed stream at the outlet of the provision device 703 and by way of which, for example, the free flow cross-section in the provision device 703 or out of the same can be varied. What was described with respect to the powder stream sensor system 726; 731, however, can also be applied to an above-described embodiment comprising a vibrating conveyor 704 or any other specific embodiment in which the stream of powder is or can be fed from the conveying device 702 over a drop section to the roller gap 104; 104' or an insertion aid 711 possibly provided thereabove.

In conjunction with the above-described control loop R85 comprising the powder stream sensor system 726; 731 based on an integral value for the variable I; F, the metering unit 721 can be designed with a positioner 723; 723.x which is continuous across the width or segmented, wherein for the latter case, for example, an identical adjustment of the positioners 723.x takes place when controlled via a single integral value of the variable I; F. If an insufficient powder stream or an undesirable decrease in the powder stream is determined based on the information provided via the variable I; F, the continuous positioner 723 is or the positioner segments 723.x are opened wider for greater material through-put, and vice versa. It is also possible for a certain throughput to be controlled when an above-described relationship exists.

As an alternative or in addition, it is also possible to control the speed of the conveying device in a control loop R82 based on the integral value for the variable I; F by appropriately activating the drive means 712.

In conjunction with the above-described control loop R85 comprising the powder stream sensor system 726; 731 of a control in individual sections based on individual values for such a variable I.x; P.x, the metering unit 721 comprises positioners 723.x formed in sections by positioner segments 723.x. The positioner segments 723.x or the positioning drives 722.x thereof are, for example, adjusted via respective control loops R82; R85 corresponding to the specified control task, based on respective individual values for the variables I.x; P.x at the relevant sections or measurement sites. It is possible, for example, to set a profile that is uniform across the width or possibly a specified profile having powder streams that differ across the width. When an above-described relationship is present, it is also possible to set a profile having a throughput that is uniform or varies across the width. One or more further circuit elements 729, such as a dead-time element 729, can be provided in the particular control loop R82; R85.

In a first advantageous embodiment of the powder stream sensor system 726 (see, for example, FIG. 18), it is based on a measurement using electromagnetic radiation, in particular light in the UV, IR or visible wavelength range, in particular in the form of a photoelectric sensor 726. For this purpose, a radiation source 727, for example a light source 727, is provided, for example, on one side of the drop path, and a sensor 728; 728.x, in particular a radiation receiver 728; 728.x, is provided on the other side. A radiation intensity I; I.x that is recorded at the sensor 728 is used here as the variable I; I.x supplying information about the powder stream. For the case of an integral determination and evaluation within the above meaning by means of only one value for the variable I, a single radiation source 727, for example, in particular a directed light source 727, and/or a single radiation receiver 728, for example a photodiode 728 or a phototransistor 728, can be provided. For the second case, which allows a control in individual sections based on individual values for such a variable I.x; P.x, an extended radiation or light source 727.x, for example in the form of a light barrier 726, a plurality of individual light sources 727.x or a light bar 727.x, and a plurality of radiation receivers 728.x, an extended, in particular spatially resolving radiation receiver 728.x or radiation receiver segments 728.x, such as a radiation receiver array 728.x, a photodiode array 728.x or a line camera 728.x, can be provided. By detecting the radiation intensity I; I.x, the constancy of a mass flow can be checked, and when, for example, an empirically ascertained relationship is present, the powder stream can even be controlled by open loop or closed loop control in terms of the throughput thereof, in sections or integrally depending on the design.

In a second advantageous embodiment of the powder stream sensor system 731 (see, for example, FIG. 19), it is based on the use of a force measurement, in particular on a measurement of the force acting on a sensor 733; 733.x designed as a force transducer 733; 733.x due to the impulse of the falling powder particles. A value for a force F; F.x recorded at the sensor 733; 733.x. is used here as the variable F; F.x supplying information about the powder stream. If an integral determination and assessment within the above meaning by means of value for the variable I is carried out, a single force transducer 733 can be provided, on which the powder stream acts over the entire width or a sub-section representative of the width. For the second case of a control in individual sections based on individual values for such a variable F.x, a plurality of individual force transducers 733.x, for example in the form of a, for example piezoelectrically operating, force transducer array 733.x, can be provided.

The action on the force transducer or force transducers 733; 733.x can generally be arbitrarily implemented in such a way that an impulse of the material 004; 004' dropping across the width or a sub-section in the powder stream is transmitted to the relevant force transducer 733; 733.x. In the advantageous embodiment shown here, a deflecting element 732; 732.x, for example a deflecting plate 732; 732.x, which is situated in the drop path of the section to be considered and is functionally connected to an assigned force transducer 733; 733.x; is provided for the or each section to be considered, that is, over the entire width, a representative sub-section or several individual sub-sections.

The deflecting plate 732; 732.x can be designed in the form of a diverting panel 732; 732.x so that, even though an impulse can be transmitted, the material 004; 004' does not continue to flow to the roller gap 104; 104' or an insertion aid 711 provided thereabove. The deflecting element 732; 732.*x* can be pivotably or elastically mounted and/or supported against the force transducer 733; 733.*x*, so that the powder stream increases the force F; F.*x* recorded by the force transducer 733; 733.*x*, for example when the load from the powder stream grows. The measuring principle is based on an impact with a change in direction, wherein the physical relationship F=m×a (force=mass×acceleration) and the change in direction during the impact form the basis for a resulting force F. By detecting the force F, the constancy of a mass flow can be checked, and when, for example, an empirically ascertained relationship is present, the powder stream can even be controlled by open loop or closed loop control in terms of the throughput thereof.

Figure 20:
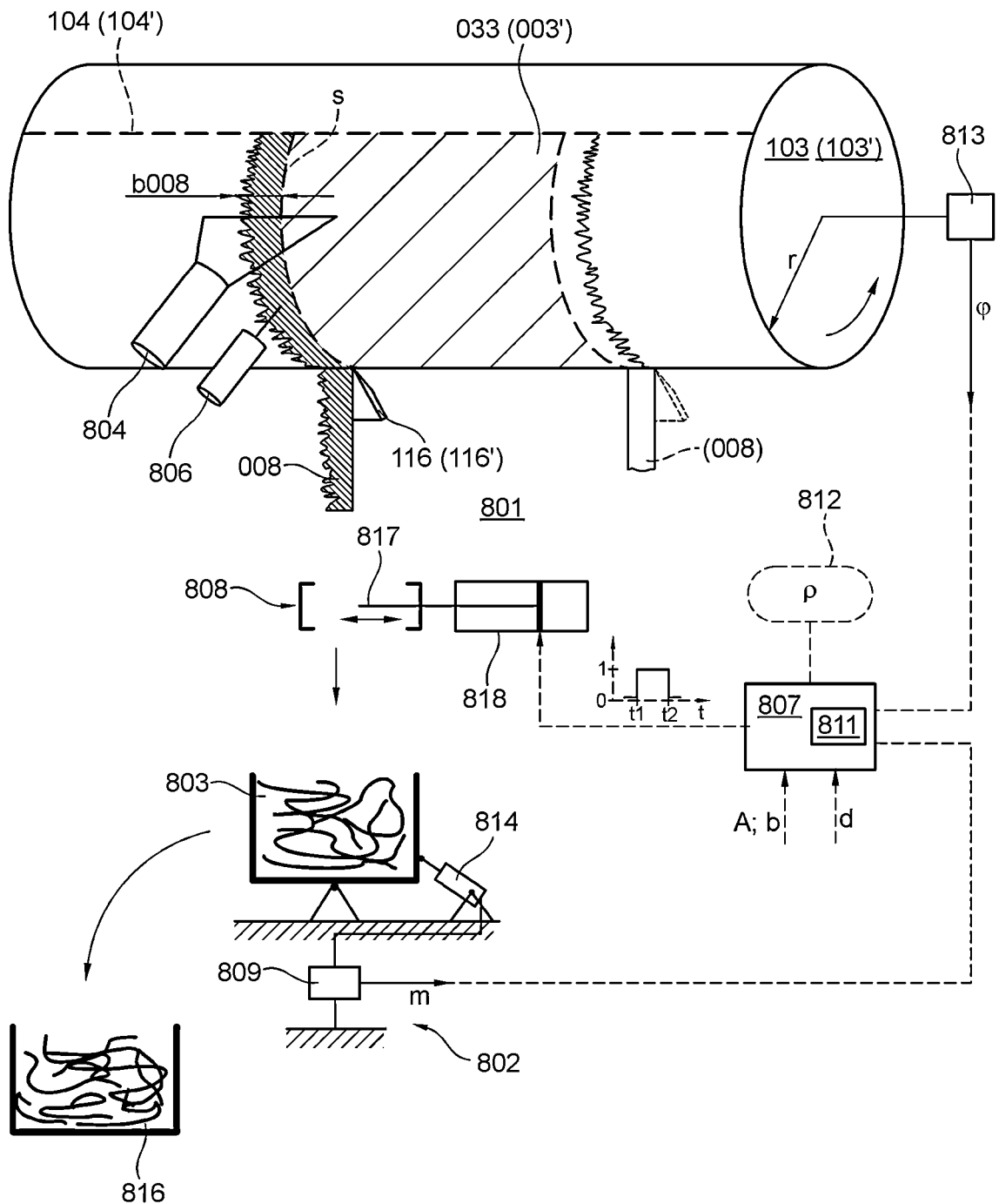
FIG. 20 a schematic representation of one exemplary embodiment of a device for determining the density of a material layer conveyed on an outer cylindrical surface of a roller.

Generally independently of, but advantageously in particular in conjunction with one of the above-described embodiments, variants, configurations, specific embodiments or designs of the coating device 100; 100\* and/or one of the above-described embodiments or variants for the powder feed device 700; 700\* and/or one of the designs and/or configurations for the machine described in greater detail below, a measuring system 801 or device for determining the density p of a material layer 003; 003' that is conveyed on an outer cylindrical surface of one of the rollers 103; 103' of the application unit 101; 101', as is shown by way of example, for example, in FIG. 20, is provided. In conjunction with an above-described coating device 100; 100\* and/or an above-described powder feed device 700; 700\*, such a measuring system 801 could be conceptually expanded.

The measuring system 801 or device comprises a or the above-described removal device 114; 114'; 116; 116', which can be placed or is placed against at least a part of the usable working width of the roller 103; 103', for example the width of the outer cylindrical surface, which is effective for the film formation, during rotation for removing at least a part of the material layer 003; 003' at one point of the circumference of the roller 103; 103'. The removal of at least the part of the material layer 003; 003' which is relevant for determining the density p is carried out by the removal device 114; 114'; 116; 116' during the rotation of the roller 103; 103' over an angular range $\Delta\varphi$, for example, also angular interval $\Delta\varphi$, between a first and a second angular position $\varphi 1$; $\varphi 2$, wherein, if more than one revolution is to be carried out, a value greater than 360° must be used for the second angular position $\varphi^2$ corresponding to the traveled angular difference. The part of the material layer 003; 003' which is relevant for the determination of the density p can result from the removal during one, more than one or a part of a full revolution. Analogously to the relation to an angular range $\Delta\varphi$ relevant for the removal or to the relevant angular interval $\Delta\varphi$, hereafter where the relation to the angular position p or the angular range $\Delta\varphi$ is not mandatory or a direct relation to the time t is explicitly excluded, a time interval $\Delta t$ having a first point in time t1 shall be understood to mean the start of the removal at, for example, a first angular position $\varphi 1$ and a second point in time t2 shall be understood to mean the end of the removal at, for example, a second angular position $\varphi 2$.

Generally, the material layer 003; 003' can be removable or removed for sampling purposes by a, for example, above-described removal device 114; 114' extending across the width of the cylindrical roller surface, which is effective for the film formation, over the entire width across a certain length or a certain angular range $\Delta\varphi$. This applies, in particular, for example, in the case of an application unit 101; 101' by which a material layer 003; 003' that is interrupted by free sections is applied to the carrier substrate 006.

In a, for example, above-described and advantageous embodiment in which, for example, a material layer 003; 003' that is uninterrupted over a multitude or plurality of revolutions of the above-described laminating roller 103; 103' is applied to the carrier substrate 006, however, a removal device 116; 116' is provided, which can be placed or is placed against the outer cylindrical surface for the removal of only a part 008; 008' of the material layer 003; 003', in particular a material strip 008; 008', which is formed in the edge region, that is, in a region that, viewed in the axial direction, is located at an end of the material layer 003; 003', by an edge strip 008; 008', at a point of the circumference of the roller 103; 103' on only a part of the usable working width. The material strip 008 is separated along a cutting line s extending in the circumferential direction and lifted off the material surface. The edge strip 008; 008' can involve the use of the edge trimming that is used to preserve a straight edge.

The measuring system 801 or device furthermore comprises a weighing unit 802, on which a removed, in particular defined and/or determinable part 008; 008' of the material layer 003; 003' previously conveyed on the roller 103; 103' can be or is collected. For this purpose, the removed part of the material layer 003; 003' used at least for the determination of the density p is collected, for example, in a weighing receptacle 803 mounted on a scale 809, for example a weighing pan 803, and the mass m thereof is thus determined. For example, a dead time can be or have been considered, which takes into account the path of the removed part of the material layer 003; 003' used for the determination of the density p from the point where it is peeled off to the weighing unit 802.

Generally, an embodiment is conceivable in which, during operation of the coating device 100; 100\*, an edge strip 008; 008' is continuously removed and collected on the weighing unit 802 or in the appropriately dimensioned weighing receptacle 803, wherein the mass m of the part 008; 008 of the material layer 003; 003' which is removed over the angular range $\Delta\varphi$ relevant for the determination of the density ρ is ascertained by determining a difference between the mass m recorded at the point in time t2 of the end and the point in time t1 of the start of the determination process by the weighing unit 802.

In an advantageous embodiment, which is shown, by way of example, in FIG. 20, for example, in which, for example during the operation of the coating device 100; 100\*, likewise an edge strip 008; 008' can be or has been continuously removed and possibly received by a collecting device 117; 117 and possibly is or can be discharged via the same, a separation device 808 actuated by way of, for example, a drive means 818, is provided by which, for example over a time interval $\Delta t$ which is defined and/or correlates with the removal in the relevant angular range $\Delta\varphi$, for example over a dead time, the or a part 008; 008' of the material layer 003; 003' which is removed for the determination of the density ρ in the relevant angular range $\Delta\varphi$ can be fed to the weighing unit 802 intended specifically for this purpose, in particular the weighing receptacle 803. The separation device 808 can be designed as a diverting unit 808 in the form of a switch 808 comprising a switch point 817 actuated, for example, by a drive means 818 or in the form of a diverter 808 comprising a slide 817 or base 817 actuated, for example, by the drive means 818. In a modification comprising, for example, a material layer 003; 003' that is interrupted by free sections, a number of material layer sections to be used, for example, for the determination can have an edge region 008 separated in the above-described manner by such a separation device 808, wherein, for example, possibly other edge regions 008 are received in a collecting device 117; 117'. The sample material of the removed material layer 003; 003' which is received on or in the weighing receptacle 803 can, for example, be emptied, in particular poured, into a, for example, larger material receiving system 816, for example a receptacle 816, for example after a determination cycle, by way of a drive means 814, for example a tilt drive 814.

Furthermore, a measuring device 806 is provided, by way of which a thickness d, for example layer thickness d, of the material layer 003; 003' conveyed on the roller 103; 103' can be determined. In a first approximation, the thickness d003, for example layer thickness d003, generally at any location over the width b003' of the material layer 003; 003' and/or at a point in time of a stationary operation of a device comprising the rollers can be incorporated as such a thickness, preferably however a thickness d008 or layer thickness d008 of the material layer 003; 003' in the material strip 008; 008' to be removed. Such a measuring device 806 is preferably based on a contactless measurement and is, for example, designed as an ultrasound-based, an inductive or a capacitive measuring device 806 comprising a corresponding measuring head.

The determination of the density ρ is carried out, for example, in data processing means 811 which are provided for this purpose and, for example, are provided in a control unit 807 controlling the process for the determination of the density ρ, for example according to: $\rho = m/V = m/(A \cdot d)$.

In the simplest case involving, for example, a sufficiently straight side edge of the material layer 003; 003' that is conveyed on the roller 103; 103' and a width 008 of the material strip 008; 008' to be removed or removed which is known via the axial position of the removal device 116; 116', it is possible, using a piece of information about an angular range Δφ which is passed over during the sampling process of the part 008; 008' of the material layer 003; 003' which is relevant for the determination of the density ρ and a radius r of the roller 103; 003', to directly ascertain a measure for the surface area A and, together with the layer thickness, a measure for the volume V of the removed part 008; 008' of the material layer 003; 003' which is relevant for the determination of the density ρ. The known width b008 can be incorporated as the width b in the determination of the density ρ and, in a good approximation, the radius of the roller 103; 103' in the region of the usable outer cylindrical surface itself or a radius that has been upwardly revised, for example to a small extent, for example by the mean layer thickness d008, can be directly incorporated as the radius r. When the width b is known, the surface area A for the above relationship is ascertained, for example, according to: $A = b \cdot 2r\pi \cdot \Delta\varphi/360°$.

If, for example, no sufficiently straight side edge of the material layer 003; 003' conveyed on the roller 103; 103' is present and/or a width b008 of the material strip 008 to be removed is not known, a sensor system 804, for example an optically operating sensor 804, can be provided, for example, by which that the width b; b008 of the edge strip 008; 008' to be removed or the width b; b008 or of the side edge over the angular range Δφ to be considered can be ascertained and, for example, an average width can be determined therefrom, wherein in the latter case the average width is used as the width b in the above relationship.

In an advantageous alternative for the case of an unknown and/or varying width b008 of the material strip 008, a sensor system 804 can be provided with appropriate evaluation means, by which the surface area A is directly ascertained, for example, integrated over the course of the rotational movement, when the position of the cutting line s is known, taking into consideration the rotational movement over the angular range Δφ or a corresponding time interval Δt as well as an above-described radius r.

The sensor system 804 or the optically operating sensor 804 can, for example, be formed by a camera 804, in particular a line camera 804.

A piece of information representing the respective current angular position p of the roller 103; 103' or the information about an angular range Δφ which is passed over during the sampling process of the part 008; 008' of the material layer 003; 003' which is relevant for the determination of the density ρ can be fed to the data processing means 811, for example via a signal connection from an angular position encoder 813, which, for example, is indirectly or directly coupled to the axis of the rotation of the roller, or via a signal connection from a drive controller indirectly or directly specifying the angular position of the roller 103; 103'.

The density ρ of a material layer 003; 003' conveyed on an outer cylindrical surface of an above-described roller 103; 103' is thus determined by rotating the roller 103; 103' carrying the material layer 003; 003' on the outer cylindrical surface thereof about the axis of rotation R103; R103' thereof, by removing from the outer cylindrical surface the material layer 003; 003' over the entire or a part 008; 008' of the width b003'; b008 during the rotation by a removal device 114; 114'; 116; 116' over an angular range Δφ at a point of the circumference between where the material layer 003; 003' is received and where it is transferred downstream to a further roller 103; 103' or to, for example, an above-described carrier substrate 006, by ascertaining the mass m of the part 008 of the material layer 003; 003' which has been removed over the angular range Δφ by weighing, by determining a layer thickness d; d003; d008 of the material layer 003; 003', preferably in the region to be removed, by way of a measuring device 806 even before the removal, by determining a surface area A of the material layer 003; 003' removed or to be removed in the angular range Δφ on the roller in, for example, one of the above-described ways, and finally obtaining a value for the density of the material layer 003; 003' conveyed on the roller 103; 103' from the surface area A, the mass m and the layer thickness.

The ascertained value for the density ρ can, for example be displayable via a display device 812, for example a display 812, and/or be used in a control unit controlling the coating device 100; 100\*.

By means of an above-described device for determining the density ρ or a corresponding method, the density ρ and thus a quality of the material layer 003; 003' designed, for example, in the above manner as a powder composite film 003; 003' and/or active material layer 003; 003', for example in the form of a dry film 003; 003', can be checked during production, in line or in a specifically provided run, and possibly, if necessary, counter-measures can be taken if a deviation from a target value or permitted target range occurs. These measures can be, for example if the ρ density is too low, an increase in a pressure, for example via the above-described line force or a reduction in the gap width b104 in an above-described roller gap 104; 104' or, for example, if the density is too high, for example a decrease of a pressure, for example via the above-described line force or an increase in the gap width b104 in a roller gap 104; 104', for example if the density ρ is too low, a reduction of a gap width. Instead of or in addition, a modification of the powder composition and/or of a temperature at, for example, one of the rollers 102; 102'; 103; 103' involved in the formation of the material layer and/or a modification of an above-described speed differential between the rollers 102; 102'; 103; 103' involved in the formation of the material layer are also possible.

A machine for producing, in particular in an inline process, a multi-layer product (see, for example, FIG. 3, FIG. 10, FIG. 15 or FIG. 16), which on at least one side of a carrier substrate 006 comprises an above-described dry film 003; 003' made of a powder mixture, preferably comprises a substrate infeed 200, by which the carrier substrate 006 can be fed to the machine on the input side, a first substrate path section 300, via which the carrier substrate 006 can be fed to an application stage 100; 100* for applying the dry film 003; 003' to at least one side of the carrier substrate 006, and a second substrate path section 400, via which the carrier material 006 provided on at least one side with the dry film 003 can be fed to a product receiving system 500, by which the product can be combined into product bundles, for example into reels or piles.

In a particularly preferred embodiment, the application stage 100; 100* is designed in an above-described embodiment, design, configuration, specific embodiment or variant for the above-described device 100; 100*. All embodiments, designs, configurations, specific embodiments of the first group of exemplary embodiments are to be able to take the place of the application stage 100 shown by way of example in FIG. 3, and all of the second group are to be able to take the place of the application stage 100* shown by way of example in FIG. 10, FIG. 15 or FIG. 16. In the exemplary embodiments for the machine shown in FIG. 15 and FIG. 16, it is also possible for embodiments, designs, configurations, specific embodiments or variants of the first group to be used as variants for the application stage 100, that is, comprising separate application devices 101; 101'.

In an advantageous embodiment, the substrate infeed 200 is formed by a substrate unwinder 200, in particular a reel changer 200, preferably by a reel changer 200 comprising several reel spots and/or qualified for a non-stop reel change. Advantageously, it can comprise a substrate guide element 202 designed as a roller 202 that is positively driven by a motor, in particular a draw roller 202, and/or a substrate guide element 203 in the form of a dancer roller 203, which, for example, is spring-preloaded transversely to the substrate path at a lever or a guide.

At the substrate unwinder 200, the carrier substrate web 006 is unwound and fed, at the unwinding location, on the input side, to the substrate path leading through the machine.

For the case of a draw roller 202 that is comprised by the substrate unwinder and, for example, structurally assigned thereto (see, by way of example, in FIG. 3 or FIG. 10, for example), this draw roller can be comprised by a drawing unit 207, in particular infeed unit 207, which, for example, in addition to the draw roller 202 comprises a drive means that drives the draw roller 202, in particular independently of other draw rollers, and can be controlled by closed loop or open loop control in terms of the speed, in particular a drive motor, for example in the form of a servo drive motor, and/or comprises pressure rollers that can be placed against the draw roller 202 to increase the friction. The roller 202 or the drive means, depending on the web tension conditions and/or web tension requirements that exist in front of and after the roller 202, can also be operable or operated as a generator or so as to block the forward feed of the carrier substrate web 006, for example so as to build or maintain a certain and/or desired web tension in the substrate path section 300 that follows and extends, for example, up to a next clamping or web feed point or in a part of the substrate path section 300 formed by a following substrate path segment.

For example, still structurally assigned to the substrate path in the reel unwinder 200 or already assigned to the first substrate path section 300, a substrate guide element 208; 307 can be formed as a measuring roller 208, for example a web tension measuring roller 208; 307 (shown by way of example for all embodiments in FIG. 16, for example) in the substrate path, by which, for example, the web tension or at least a variable representing the web tension can be ascertained so as to use the same, for example, for controlling the web tension, for example via the conveying speed of individual units 100; 100*, 600 or one or more web guide elements 202; 308; 401; 502, which are in particular positively driven by a motor.

The substrate infeed 200 designed as a reel changer 200 advantageously comprises a reel drive, which is driven mechanically independently of the remainder of the machine and/or by an individual motor, and/or a lifting device for supporting a reel loading and/or reel unloading process.

Still located in the substrate path segment attributable to the substrate infeed 200 and/or in the following first substrate path 300, in an advantageous embodiment a device for the lateral web edge control 204 (shown by way of example for all embodiments in FIG. 15, for example), in particular a sensor system detecting a web edge and a control element effectuating a lateral offset of the carrier substrate, for example a turner bar pair that can be pivoted about an axis extending perpendicularly to the transport direction $T_S$, can be provided. In a particularly advantageous embodiment, the web edge controller 204 is combined with a gluing device 206, for example a gluing table 206.

Instead or in addition, in an advantageous embodiment a spreader, in particular a single-element or multi-element web guide element having a convexly extending outer cylindrical surface, is provided still in the substrate path segment of the substrate infeed 200 and/or in the first substrate path 300.

In an advantageous refinement, a one-piece or multi-piece pretreatment station 302, in particular a cleaning and/or deionizing station 302, is provided in the first substrate path 300, by way of which the carrier substrate 006 is or can be freed from superficial impurities, for example dust or cut-off residue, and/or electric charge carriers, on one side or both sides in a contactless or contacting method.

A measuring station 303, in particular comprising a sound-based or radiation-based measuring device 303, is provided in the first substrate path 300, in particular downstream from a possibly provided cleaning operation, by way of which the material thickness of the carrier material 006 can be checked for the thickness and/or homogeneity in the thickness and/or for impurities and, for example in the event of impermissible deviations from a target specification, an optical and/or an acoustic warning signal and/or an error signal is transmitted to a machine controller and/or a control console.

For all embodiments of the machine, in an advantageous embodiment a substrate guide element 208; 307 can be designed as a measuring roller 307 (shown by way of example for all embodiments in FIG. 15 and FIG. 16, for example) in a substrate path segment that is structurally assigned to the reel changer 200 and/or in a substrate path section of the first substrate path 300 following the same, by which, for example, the web tension can be ascertained so as to use it, for example, for controlling the web tension, for example, via the conveying speed of individual units 100; 100*; 600 or of one or more web guide elements 202; 308; 401; 502 which are, in particular, positively driven by a motor. It is possible for only one of the two measuring rollers 208; 307 to be provided or advantageously for both measuring rollers 208; 307 to be provided, wherein the latter case, for example, the downstream measuring roller 307 is used for ascertaining purposes and/or for control, as described below, of the web tension in the substrate path segment arranged upstream from the first or only application point.

In an advantageous refinement, for example a pretreatment station 304 designed as an application station 304 is provided in the first substrate path 300, by which a binder and/or a primer can be applied to one side or both sides of the carrier material 006. In this case, a dryer, which is not shown, for example a hot air or radiation dryer, can preferably be provided directly downstream from the application station 304.

In a particularly preferred embodiment, generally considered alone, but advantageously in conjunction with one or more of the other variant embodiments of the machine, a thermal pretreatment station 306, in particular a temperature control station 306, for example an infrared radiation source 306, can be provided in the substrate path immediately upstream from the application stage 100; 100*, that is, for example, downstream from the last substrate guide element 301; 307 cooperating with the carrier substrate web 006, by which the carrier material 006 can preferably be heated to above the ambient temperature, in particular to above 60° C., preferably to at least 80° C. This can, for example, be of particular advantage for activating a cohesion-supporting or cohesion-inducing agent 007; 007' that is provided on or applied to the carrier substrate 006. Generally independently thereof, but advantageously in conjunction with such a temperature control station 306, a sensor 311 for ascertaining the temperature of the carrier substrate web 006, for example a temperature sensor 311, in particular a temperature sensor 311 operating in a contactless and/or radiation-based manner, can be provided. The sensor 311, for example as a temperature sensor 311, together with the possibly provided temperature control station 306, can be an integral part of a control loop for controlling the temperature of the carrier substrate web 006.

Instead of a draw roller 202 attributable to, or a drawing unit 207 attributable to, the substrate unwinder 200, or possibly in addition thereto, a draw roller 308 or a drawing unit 309 can be provided in the substrate path section 300 that follows the substrate unwinder 200 and/or leads to the point of the first or only dry film application, that is, to the first or only laminating gap 107; 107'. If only one draw roller 202; 308 or only one drawing unit 207; 309 is provided in the substrate path between where the unwinding from the reel 201 takes place and where the entry into the first or only laminating gap 107; 107' takes place, such a draw roller 202; 308 or such a drawing unit 207; 309 can generally structurally be assignable or assigned to the substrate unwinder 200, a substrate path section 300 extending between the substrate unwinder 200, in particular where the unwinding takes place, and the application stage 100; 100*, in particular the first or only application point, or can structurally be assignable or assigned also to the application stage 100; 100* on the input side. What is essential here is that such a draw roller 202; 308 or such a drawing unit 207; 309 is arranged upstream from the first application point, that is, the first or only laminating gap 107; 107', in the substrate path, for example so as to build or maintain a certain and/or desired web tension in the following substrate path section or in a part of the substrate path section formed by a following substrate path segment. Corresponding to the drawing unit 207 that was already described above, the drawing unit, for example in the addition to the draw roller 308, comprises a drive means that drives the draw roller 308, in particular independently of other draw rollers, and that can be controlled by closed loop or open loop control in terms of the speed, for example in the form of a servo drive motor, and/or pressure rollers that can be placed against the draw roller 308 to increase the friction. Depending on the web tension conditions and/or web tension requirements that exist in front of and after the roller 308, the roller 308 or the drive means can also be operable or operated as a generator or so as to block the forward feed of the carrier substrate web 006, for example so as to build or maintain a certain and/or desired web tension in the substrate path section that follows and extends, for example, up to a next clamping or web feed point or in a part of the substrate path section formed by a following substrate path segment.

In an advantageous embodiment, an above-described calender 600 or an above-described calendering unit 600 comprising two rollers 601; 602, in particular calendering rollers 601; 602, forming a gap, for example calendering gap between each other, is provided in the second substrate path 400, in particular in the substrate path immediately downstream from the application stage 100; 100*, of which, for example, at least one, preferably both, can be heated, in particular can be heated in such a way that the outer cylindrical surfaces thereof, for example, at an ambient temperature of 25° C., can be brought to at least 80° C., advantageously to at least 100° C., preferably to at least 120°, and/or between which a compression with a preferably adjustable line force of at least 500 N/mm, advantageously at least 700 N/mm, preferably a line force between 500 N/mm and 3000 N/mm can be applied. The product strand 002 coated at least on one side can be guided through the calendering gap for the purpose of further compacting the dry film 003; 003', using pressure and/or an increased temperature in relation to the ambient temperature.

Generally independently of, but advantageously in conjunction with one or more of the other variant embodiments of the machine, in a particularly advantageous embodiment a cooling unit 402, for example comprising one or more partially wrapped temperature-controlled cooling rollers 402.1; 402.2, is provided in the second substrate path 400 downstream from the application stage 100; 100*, and if a calendering unit 600 is provided, downstream therefrom, by which a product strand 002 that is guided through can be cooled, for example, by at least 20° C., in particular by at least 50° C.

Generally independently of, but advantageously in conjunction with one or more of the other variant embodiments of the machine, in an advantageous refinement an inspection device 403; 403.1; 403.2, which is in particular based on an optical and/or acoustic measurement, for example comprising one sensor 403.1 that is directed toward one side and one sensor 403.2 that is directed toward the other side, is provided in the second substrate path 400, by which the product surface can be checked for defects or imperfections, for example for the completeness of the surface and/or thickness of the applied dry film 003; 003'. As is shown in FIG. 15, for example, the inspection device 403; 403.1; 403.2 can be provided in the substrate path downstream from the calendering unit 600 or, as is shown in FIG. 16, for example, in the substrate path downstream from the application stage 100; 100', but upstream from the calendering unit 600. In the first case, defects caused by the calendering process can be recognized, however, in the second case, defects that may be caused in the application stage 100; 100' are determined as early as possible. The inspection device 403 can preferably comprise a camera, for example a line camera, on each side, preferably serving as the sensors 403.1; 403.2, by which the respective surface is recorded or optically scanned, and defective or missing spots are evaluated by way of a downstream evaluation unit.

Generally independently of, but advantageously also together with other variant embodiments of the machine, in particular, however, in conjunction with an inspection device 403; 403.1; 403.2 provided at the substrate path, a device for defect marking 412 is provided in an advantageous refinement, which can be formed, for example, by a printing device, for example an ink jet print head, or an injection device, wherein the latter, for example, can introduce a physical marking means, for example a so-called marking flag or a marking label, into or apply the same to the carrier substrate web 006.

For all embodiments of the machine, in an advantageous embodiment at least one substrate guide element 409 can be designed as a measuring roller 409 in the second substrate path 400, by which, for example, the web tension can be ascertained so as to use it, for example, for controlling the web tension, for example, via the relative conveying speed of individual units 100; 100*; 600 or of one or more web guide elements 202; 308; 401; 502 which are, in particular, positively driven by a motor. Preferably, at least one substrate guide element 409 is designed as a measuring roller 409 at least in the substrate path segment of the second substrate path section 400 which is arranged downstream from the application stage 100; 100*, in particular the point of the last or only application, and arranged upstream from a possibly provided calendering unit 600, in particular the point of a possibly occurring calendering process, in particular preferably, however, both in the described substrate path segment and in the substrate path segment arranged downstream from the calendering unit 600 that is provided in an advantageous embodiment. Instead of or in addition, a substrate guide element 507, which is structurally assigned to the product winder 500, can be designed as a measuring roller 507 that is arranged downstream from the calendering unit 600 in the substrate path.

So as to be able to ensure that the substrate moves optimally through the application stage 100; 100*, in an advantageous embodiment a substrate guide element 401, which is designed as a draw roller 401 that is positively driven by a motor, is provided in the second substrate path 400, preferably immediately downstream from the application stage 100; 100*, but upstream from a possibly provided calendering unit 600. This draw roller can be comprised by a drawing unit 411, which, for example in addition to the draw roller 401 itself, comprises a drive means that drives the draw roller 401, in particular independently of other draw rollers, and that can be controlled by closed loop or open loop control in terms of the speed, for example in the form of a servo driven motor, and/or pressure rollers that can be placed against the draw roller 401 to increase the friction. Depending on the web tension conditions and/or web tension requirements present upstream and downstream from the roller 401, the roller 401 or the drive means can generally also be operable or operated as a generator or so as to block the forward feed of the carrier substrate web 006, however here is operated or operable so as to build and/or maintain a web tension on the upstream substrate path segment by way of a motor, that is, so as to convey the carrier substrate web 006 in the transport direction $T_S$ or with a lead compared to, for example, the speed at a next draw roller 202; 301 upstream and/or the circumferential speed of the last or only laminating roller 107; 107' or of the pair of laminating rollers 107; 107'.

As an alternative or in addition, in a preferred embodiment a web tension equalizing and/or control device 406 (for example, shown by way of example for all embodiments in FIG. 15), comprising, for example, a dancer roller 407, which is spring-preloaded transversely to the substrate path, for example, at a lever or a guide, is provided in the second substrate path 400 downstream from the application stage 100; 100*, possibly between the application stage 100; 100* and a calendering unit 600 provided in an advantageous embodiment, by which, for example, fluctuations in the web tension can be equalized and/or the conveying speed of an upstream or downstream unit 100; 100*; 600 or of one or more in particular motor-driven web guide elements 202; 308; 401; 502 can be controlled, in particular via the movement of the dancer roller 407.

For all of the embodiments and variants of the machine described here, one embodiment is particularly advantageous in which a measuring station 408 for ascertaining the product strand thickness, in particular the total thickness, is provided in the substrate path arranged downstream from the application stage 100; 100*, and if a calendering unit 600; 600* is provided in the substrate path, downstream from this only or last calendering unit 600; 600*, prior to the combination into the product bundle 501 in the product receiving system (for example, shown by way of example for all embodiments in FIG. 15 and FIG. 16).

Instead of or in addition to the above-described cooling unit 402 in the second substrate path section 400, such a or a further cooling unit 402; 504 can also be provided in the substrate path segment attributable to the product receiving system 500 or at the frame thereof. Such a cooling unit 504, can, for example, be formed by a substrate guide element 504 designed as a cooling roller 504. As an alternative, such a cooling unit 504 attributable to the second substrate path section 400 or structurally to the product receiving system 500 can also be formed by one or more consecutively partially wrapped temperature-controlled cooling rollers 504.1; 504.2.

In a refinement, for example downstream from the possibly provided cooling unit 504, sensor 508 for ascertaining the temperature of the product 002, in particular of the product strand 002, can be in the substrate path downstream from the possibly provided calendering unit 600, however at the latest upstream from the delivery, for example upstream from a winding operation in the product winder 500. The sensor 508, for example as a temperature sensor 508, is in particular designed to be a contactless and/or radiation-based operating temperature sensor 311 and/or can, together with the possibly provided cooling unit 504, be an integral part of a control loop for controlling the temperature.

In an advantageous embodiment, the product receiving system 500 is designed as a product winder 500, in particular in the form of a reel changer 500.

The product winder 500 is preferably qualified for a non-stop reel change and/or comprises an above-described substrate guide element 502 designed as a draw roller 502 that is positively driven by a motor and/or a substrate guide element 503 in the form of a dancer roller 503, which, for example, is spring-preloaded transversely to the substrate path at a lever or a guide.

So as to be able to ensure that the substrate moves optimally between the possibly provided calendering unit 600 and where the winding on the product winder 500 takes place, in an advantageous embodiment a substrate guide element 401; 502 designed as a draw roller 401; 502 that is positively driven by a motor can be provided in the second substrate path 400 or in a substrate path segment attributable to the product winder 500. This draw roller can be comprised by a drawing unit 411; 506, which, for example in addition to the draw roller 401; 502, comprises a drive means that drives the draw roller 401; 502, in particular independently of other draw rollers, and that can be controlled by closed loop or open loop control in terms of the speed, for example in the form of a servo drive motor, and/or pressure rollers that can be placed against the draw roller 401; 502 to increase the friction.

In a particularly advantageous embodiment of a machine comprising, for example, a calendering unit 600, in particular for the stable and trouble-free inline continuous operation, at least one positively driven draw roller 202; 308; 401 and/or at least one measuring roller 208; 307; 409 for ascertaining a web tension are provided both in a first substrate path segment, which is located between the unwinding location from the substrate reel 201 in the substrate unwinder 200 and the entry into the only or first laminating gap 107; 107' of the application stage 100; 100*, and in a second substrate path segment, which is located between the exit location of the carrier substrate web, which by then has been provided with the dry film 003; 003' at least on one side, out of the only or downstream last laminating gap 107; 107' of the application stage 100; 100* and, for the embodiment comprising a calendering unit 600; 600*, the entry into the calendering gap between the two calendering rollers 601; 602. In an advantageous refinement for the embodiment comprising the calendering subassembly 600; 600*, a positively driven draw roller 502 and/or a measuring roller 409; 507 for ascertaining a web tension are also provided in a third substrate path segment, which is located between the exit location of the carrier substrate web 006, which has been provided with the dry film 003; 003' at least on one side, out of the calendering gap and the winding location onto the product roll 501 in the product winder 500.

Preferably a web tension control device, which is not shown here, is provided, which on the input side are connected in each case to the or a measuring roller 208; 307; 409 provided in the first as well as the or a measuring roller provided in the second above-described substrate path segment and, on the output side are connected in each case to a drive controller, controlling the roller drives, of the or a draw roller 202; 308; 401 provided in the first as well as the or a draw roller provided in the second above-described substrate path segment, and which in particular comprises data processing means and/or electronic circuit means, which are equipped to build and/or to maintain a respective specified web tension and/or a web tension difference specified for the two substrate path segments by appropriate activation of the drive controller of the drive of one or more of the draw rollers 202; 308; 401 in each of the two substrate path segments. In a refinement, the web tension control device, on the input side, can additionally be connected in each case to the or a measuring roller 409; 507 provided in the third above-described substrate path segment and, on the output side, to a drive controller, controlling the drive of the relevant draw roller 502, of the or a draw roller 502 provided in the third above-described substrate path segment and, for example, can likewise be controlled by the same with respect to a specified web tension and/or a specified web tension difference relative to the upstream substrate path segment.

Generally speaking, in particular also for the above-described embodiment of the machine without a calendering unit downstream from the application stage 100; 100*, what was said above regarding the draw rollers 202; 308; 401 and measuring rollers 208; 307; 409, regarding the signal connections and regarding the web tension control device, is to be transferred or applied to an embodiment comprising at least one measuring roller and/or at least one draw roller 202; 208; 307; 308 in the first substrate path segment between where the unwinding takes place and the point of the initial application by the application stage 100; 100*, and at least one measuring roller and/or at least one draw roller 409; 507; 401; 502 in a substrate path segment between where the only or last point of the dry film application by the application stage 100; 100* is left and where the winding in the reel winder 500 takes place.

Fluctuations in the web tension, for example, can be equalized and/or compensated by an above-described dancer roller 203; 407; 503 and a control loop comprising the same, and, for example, integrated in an above-described web tension control device, and/or a conveying speed of an upstream or downstream unit 100; 100*; 600 or of one or more, in particular motor-driven, web guide elements 202; 308; 401; 502, such as the drive of an upstream substrate unwinder 200 or downstream substrate winder 500 or an upstream or downstream draw roller 202; 308; 401; 502 can be controlled, in particular via the movement of the dancer roller 407. The dancer roller is spring-preloaded transversely to the substrate path, for example at a guide or at a lever, in particular pneumatically or elastically preloaded with a force against the effective direction of the web tension of the substrate web 006 wrapping around the roller in a loop-like manner (or of the product strand 002).

An above-described draw roller 203; 308; 401; 502 comprises, for example, a drive motor that can be controlled by closed loop or open loop control in terms of the speed, in particular a servo motor, and/or cooperates with one or more pressing elements, for example pressure rollers, for example for improving the conveying behavior, and/or can, depending on the position in the substrate path, for example for generating or maintaining an upstream web tension, be operated as a motor or, for example for generating or maintaining a downstream web tension, be operated as a generator, for example with braking action, and/or is comprised by a control loop, for example as a control element, which controls the web tension, and for example, is integrated into an above-described web tension control device.

As an alternative to the embodiment of the machine comprising a product receiving system 500 designed as a roll winder 500, in a particularly advantageous embodiment a cross-cutting device can be provided in the second substrate path 400 or at the input of the product receiving system 500, by which a product strand 002 produced in the machine can already be cross-cut into product sections 001. The product receiving system 500 is designed, for example, as a stack former, in particular as a multi-stack former consecutively forming multiple stacks.

In an above-described machine and/or device 100; 100*, for example, a web-format carrier substrate 006 is provided continuously, and preferably on both sides, with a dry film 003; 003' having a smaller width in relation to the carrier substrate width, so that an uncoated edge of the carrier substrate 106 remains on both sides.

Although the disclosure herein has been described in language specific to examples of structural features and/or methodological acts, it is to be understood that the subject matter defined in the appended claims is not necessarily limited to the specific features or acts described in the examples. Rather, the specific features and acts are disclosed merely as example forms of implementing the claims.

The invention claimed is:

1. A device (100; 100*) for coating a carrier substrate (006) with a powdered material (003), the device comprising;
a first application unit (101), which comprises a first roller (102; 102') and a second roller (103; 103') which form a first gap (104; 104') in a nip between respective outer cylindrical surfaces thereof, wherein a dry powder mixture (004) is conveyed through the first gap (104; 104') in order to form a first dry film (003'),
a first counter-pressure roller (103'; 106) which, together with the second roller (103; 103'), forms a second gap (107; 107') through which a carrier substrate (006) to be coated is guided for having the first dry film (003')-formed in the first gap (104; 104') applied to a first side of the carrier substrate (006), and
the first gap (104; 104') between the first and second rollers (102; 102'; 103; 103') being adjustable based on a position-based positioning drive (109; 109'), wherein the position-based positioning drive (109, 109') is selectively set to provide at least one of a constant or defined gap width,
characterized in that the second gap (107; 107') between the counter-pressure roller (106; 106'; 103'; 103) and the second roller (103; 103') of the first application unit (101; 101') is adjusted based on a force-based positioning drive (111; 111') by being set to at least one of a constant or defined compression force or line force.

2. The device according to claim 1, characterized in that a second application unit (101') is provided in a path of the carrier substrate (006), the second application unit (101') comprising a first roller (102; 102') and a second roller (103; 103') which form a first gap (104; 104') of the second application unit (101') in a nip between respective outer cylindrical surfaces thereof, wherein the dry powder mixture (004) is conveyed through the first gap (104; 104') of the second application unit (101') in order to form a second dry film (003').

3. The device according to claim 2, characterized in that a second counter-pressure roller (106') is provided which, together with the second roller (103'; 103) of the second application unit (101'; 101), forms a second gap (107') of the second application unit (101'), which differs from the second gap (107) of the first application unit (101; 101') and is spaced apart in the path of the carrier substrate (006), and through which the carrier substrate (006) to be coated is guided, and to a second side of which the dry film (106) formed in the first gap (104; 104') of the second application unit (101'; 101) is applied, and that the first gap (104'; 104) between the first and second rollers (102'; 102; 103'; 103) of the second application unit (101'; 101) is adjustable based on a position-based positioning drive (109'; 109), that is selectively settable to at least one of a constant or defined gap width, and that the second gap (107'; 107) between the second counter-pressure roller (106'; 106; 103; 103') and the second roller (103; 103') of the second application unit (101'; 101) is adjustable based on a force-based positioning drive (111; 111'), that is selectively settable to at least one of a constant or defined compression force or line force.

4. The device according to claim 2, characterized in that the second roller (103; 103') of the second application unit (101'; 101), together with the second roller (103; 103') of the first application unit (101; 101') form a shared second gap (107) in a nip between the respective outer cylindrical surfaces thereof, wherein the shared second gap (107) serves as a two-sided laminating gap (107) and through which the carrier substrate (006) to be coated is guided for having the second dry film (003') formed in the first gap (104; 104') of the second application unit (101'; 101) applied to a second side of the carrier substrate (006), that the shared second gap (107) is adjustable by a positioning drive (111; 111') thereof at least in a force-based manner, and that the first gap (104'; 104) between the first and second rollers (102'; 102; 103'; 103) of the second application unit (101'; 101) is adjustable based on a position-based positioning drive (109'; 109) that is selectively settable to at least one of a constant or defined gap width.

5. The device according to claim 1, characterized in that the gap width of the first gap (104; 104') is selectively settable via position-based drive means or via at least one-sided stop means, which limit a placement position toward the nip and are adjustable in terms of a position thereof.

6. The device according to claim 1, characterized in that the first gap (104; 104') between the first and second rollers (102; 102'; 103; 103') of the first application unit (101; 101') is at least one of:
selectively adjustable in a position-based or force-based manner based on a combined positioning drive (109, 111; 109', 111'),
selectively settable to at least one of a constant or defined gap width, or
selectively settable toward at least one of a constant or defined compression force or line force; and/or
that one of the first or second rollers (102; 102'; 103; 103') involved in the first gap (104; 104') is mounted so as to be selectively adjustable in a position-based or force-based manner by a combined positioning mechanism (112; 113; 112, 113).

7. The device according to claim 1, characterized in that the second gap (107; 107') between the second roller (103; 103') of the first application unit (101'; 101) and the counter-pressure roller (106; 106'; 103'; 103) cooperating with the second roller (103; 103') is at least one of:
selectively adjustable in a position-based or force-based manner based on a combined positioning drive (109, 111; 109', 111'),
selectively settable to at least one of a constant or defined gap width, or
selectively settable toward at least one of a constant or defined compression force or line force; and/or
that one of the second roller (103; 103') or first counter-pressure roller (103', 106) involved in the second gap 107; 107') is mounted so as to be selectively adjustable in a position-based or force-based manner by a combined positioning mechanism (112; 113; 112', 113').

8. The device according to claim 6, characterized in that the combined positioning drive (109; 109'; 111; 111') is formed by a force-based positioning drive (111; 111') comprising a positioning mechanism (112; 112'; 113; 113'), in an adjustment path of which a positionable stop is selectively introduced for limiting a roller position.

9. The device according to claim 6, characterized in that the combined positioning mechanism (109; 109'; 111; 111') is formed by a positioning drive (109; 109'; 111; 111') that comprises, as the drive means, a motor that is operated selectively in a closed loop position-controlled or open loop position-controlled or closed loop moment-controlled or open loop moment-controlled manner.

10. The device according to claim 1, characterized in that the first roller (102; 102') is mounted so as to be adjustable in a direction having at least one movement component toward the second roller (103; 103') and/or away therefrom by way of a bearing mechanism (113; 113'; 112; 112') and the position-based positioning drive (109; 109').

11. The device according to claim 1, characterized in that the counter-pressure roller (106; 106'; 103'; 103) is mounted so as to be adjustable in a direction having at least one movement component toward the second roller (103; 103') involved in forming the second gap (107) and/or away therefrom by way of a bearing mechanism (113; 113'; 112; 112') and/or the force-based positioning drive (111; 111').

12. The device according to claim 1, characterized in that the first roller (102; 102') together with the second roller (103; 103') are mounted so as to be movable as a pair in a direction having at least one movement component toward the counter-pressure roller (106; 106') and/or away therefrom by way of a shared bearing mechanism (112; 112'; 113; 113') and/or a shared at least force-based positioning drive (111; 111'), and additionally the first roller (102; 102') is mounted so as to be adjustable in a direction having at least one movement component toward the second roller (103; 103') and/or away therefrom by way of a bearing mechanism (113; 113'; 112; 112') and/or at least the position-based positioning drive (109; 109').

13. The device according to claim 1, characterized in that one of the first roller (102; 102') or the second roller (103; 103') to be adjusted is movable into a defined position by the position-based positioning drive (109; 109'), wherein an adjustment path of the first roller (102; 102') or the second roller (103; 103') is limited by a stop, which defines an end position and against which the first roller (102; 102') or the second roller (103; 103') to be adjusted is placed by the position-based positioning drive (109; 109').

14. The device according to claim 1, characterized in that the at least one of the constant or defined compression force or line force is selectively settable by the force-based positioning drive (111; 111') in such a way that the line force is maintained at a constant level by the force-based positioning drive (111; 111'), even if the dry film thickness fluctuates, by repositioning at least one of the second roller (103; 103') or the counter-pressure roller (103; 106').

15. The device according to claim 1, further comprising a filling and/or supply chamber (126) having a varied or variable width for receiving the powder mixture (004; 004') to be fed into the first gap (104; 104'), wherein the filling and/or supply chamber (126) is provided in a region of a wedge-shaped space above the first gap (104; 104') between the first and second rollers (102; 103; 102'; 103').

* * * * *